United States Patent [19]
Saito et al.

[11] Patent Number: 5,845,116
[45] Date of Patent: Dec. 1, 1998

[54] DISTRIBUTED COMPUTING SYSTEM

[75] Inventors: Masahiko Saito; Takanori Yokoyama; Masaru Shimada; Kunihiko Tsunedomi, all of Hitachi; Tomoaki Nakamura, Hitachinaka, all of Japan

[73] Assignee: Hitachi, Ltd., Tokyo, Japan

[21] Appl. No.: 421,249

[22] Filed: Apr. 13, 1995

[30] Foreign Application Priority Data

Apr. 14, 1994 [JP] Japan .................................... 6-075610

[51] Int. Cl.⁶ .................................................. G06F 9/46
[52] U.S. Cl. ........................................... 395/673; 395/675
[58] Field of Search .................................. 395/650, 700, 395/800, 673, 675

[56] References Cited

U.S. PATENT DOCUMENTS

| | | | |
|---|---|---|---|
| 4,796,178 | 1/1989 | Jennings et al. | 364/200 |
| 5,168,566 | 12/1992 | Kuki et al. | 395/676 |
| 5,193,186 | 3/1993 | Tamaki et al. | 395/650 |
| 5,504,899 | 4/1996 | Raz | 395/650 |
| 5,522,070 | 5/1996 | Sumimoto | 395/676 |

FOREIGN PATENT DOCUMENTS

| | | | |
|---|---|---|---|
| 0366344 | 5/1990 | European Pat. Off. | G06F 9/46 |
| 5-128077 | 5/1993 | Japan | G06F 15/16 |
| 5-324358 | 12/1993 | Japan | G06F 9/46 |

*Primary Examiner*—Lucien U. Toplu
*Assistant Examiner*—Alice Park
*Attorney, Agent, or Firm*—Antonelli, Terry, Stout & Kraus, LLP

[57] ABSTRACT

A distributed computing system, having a plurality of computers that differ from each other in terms of performance, load, and type, uniformly manages local priority schemes adapted in the respective computers by utilizing the concept of "urgency" or "time limit". Each of the computers includes a priority level conversion procedure for performing a conversion between an urgency level and a priority level of processing in accordance with the performance and the load of the computer, and a priority level changing procedure for changing a priority level of a program, which executes the processing, in accordance with a priority level indicated by the priority level conversion procedure.

6 Claims, 35 Drawing Sheets

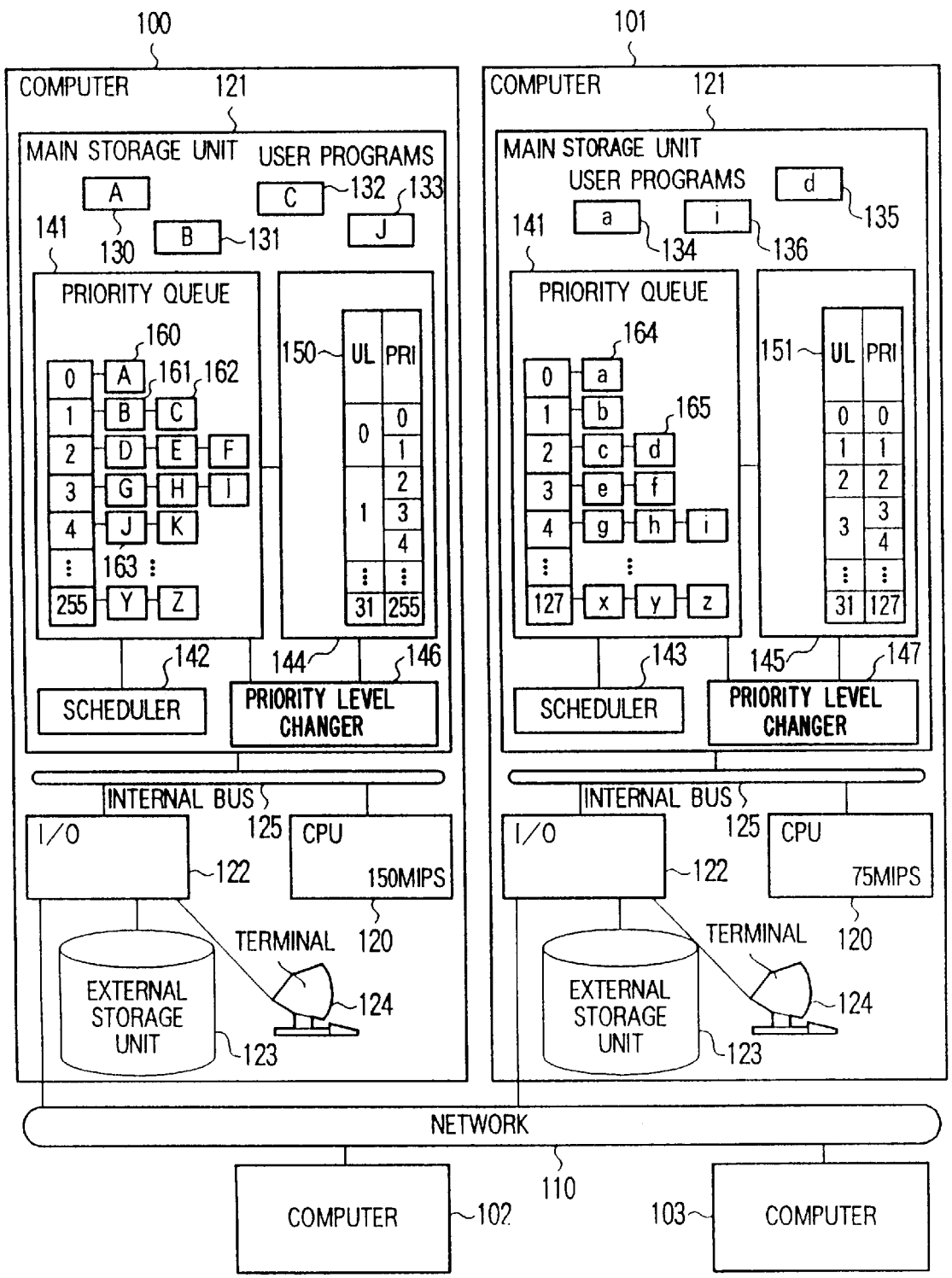

FIG. 2

```
int to_urgency[256];  /* priority -> urgency */
```
~170

```
struct {
    int start;  /* start of range */
    int end;    /* end of range */
} to_priority[32];  /* urgency -> priority */
```
~171

PRIORITY LEVEL CORRESPONDENCE TABLE    172

| | UL | PRI | |
|---|---|---|---|
| to_urgency[0]=0 → | 0 | 0 | ← to_priority[0].start=0 |
| to_urgency[1]=0 → | | 1 | ← to_priority[0].end=1 |
| to_urgency[2]=1 → | | 2 | ← to_priority[1].start=2 |
| to_urgency[3]=1 → | 1 | 3 | |
| to_urgency[4]=1 → | | 4 | ← to_priority[1].end=4 |
| to_urgency[5]=2 → | | 5 | ← to_priority[2].start=5 |
| to_urgency[6]=2 → | 2 | 6 | |
| to_urgency[7]=2 → | | 7 | ← to_priority[2].end=7 |
| | ⋮ | ⋮ | |
| to_urgency[255]=0 → | 31 | 255 | ← to_priority[31].end=255 |

FIG. 3

URGENCY LEVEL → PRIORITY LEVEL

```
priority = SPEED/LOAD * urgency * urgency ;
if (priority > 255) priority = 255 ;
```
~180

PRIORITY LEVEL → URGENCY LEVEL

```
urgency = sqrt(priority * LOAD/SPEED) ;
if (urgency > 31) urgency = 31 ;
```
~181

NOTE  Sqrt(x) REPRESENTS SQUARE OF X
LOAD REPRESENTS LOAD , AND SPEED
PERFORMANCE

FIG. 4

```
func (urgency, arg1, arg2, ···) ;
```
~190

```
func (arg1, arg2, ···, urgency) ;
```
~191

FIG. 8

```
for (u = 0 ; u < 31 ; u++) {
    to_priority[u].end -- ;                              ~240
    to_priority[u+1].start -- ;                          ~241
    to_urgency[to_priority[u+1].start] ++ ;              ~242
    change_all_priority (to_priority[u+1].start, -1) ;   ~243
}
```
~230

```
for (u = 0 ; u < 31 ; u++) {
    to_priority[u].end ++ ;                              ~244
    to_priority[u+1].start ++ ;                          ~245
    to_urgency[to_priority[u].end] -- ;                  ~246
    change_all_priority (to_priority[u].end, 1) ;        ~247
}
```
~231

FIG. 13

COMPUTED LOAD INFORMATION TABLE 302

| URGENCY LEVEL | COMPUTER 100 | COMPUTER 101 | ... |
|---|---|---|---|
| 0 | 3 | 1 | ... |
| 1 | 8 | 1 | ... |
| 2 | 7 | 2 | ... |
| 3 | 16 | 5 | ... |
| ... | ... | ... | ... |
| 31 | 7 | 3 | ... |

LOAD AMOUNT TABLE 306

| URGENCY LEVEL RANGE | COMPUTER 100 | COMPUTER 101 | ... |
|---|---|---|---|
| 0 | 3 | 1 | ... |
| 0~1 | 11 | 2 | ... |
| 0~2 | 18 | 4 | ... |
| 0~3 | 34 | 9 | ... |
| ... | ... | ... | ... |
| 0~31 | 241 | 71 | ... |

LOAD/PERFORMANCE VALUE TABLE 308

| URGENCY LEVEL RANGE | COMPUTER 100 | COMPUTER 101 | ... |
|---|---|---|---|
| 0 | 0.30 | 0.33 | ... |
| 0~1 | 1.10 | 0.67 | ... |
| 0~2 | 1.80 | 1.33 | ... |
| 0~3 | 3.40 | 3.00 | ... |
| ... | ... | ... | ... |
| 0~31 | 24.10 | 23.67 | ... |

FIG. 15

COMPUTER LOAD INFORMATION TABLE 302

| URGENCY LEVEL | COMPUTER 100 | COMPUTER 101 |
|---|---|---|
| 0 | 3 | 1 |
| 1 | 7 | 2 |
| 2 | 7 | 2 |
| 3 | 16 | 5 |
| ... | ... | ... |
| 31 | 7 | 3 |

LOAD AMOUNT TABLE 306

| URGENCY LEVEL RANGE | COMPUTER 100 | COMPUTER 101 |
|---|---|---|
| 0 | 3 | 1 |
| 0~1 | 10 | 3 |
| 0~2 | 17 | 5 |
| 0~3 | 33 | 10 |
| ... | ... | ... |
| 0~31 | 240 | 72 |

LOAD/PERFORMANCE VALUE TABLE 308

| URGENCY LEVEL RANGE | COMPUTER 100 | COMPUTER 101 |
|---|---|---|
| 0 | 0.30 | 0.33 |
| 0~1 | 1.00 | 1.00 |
| 0~2 | 1.70 | 1.67 |
| 0~3 | 3.30 | 3.33 |
| ... | ... | ... |
| 0~31 | 24.00 | 24.00 |

FIG. 22
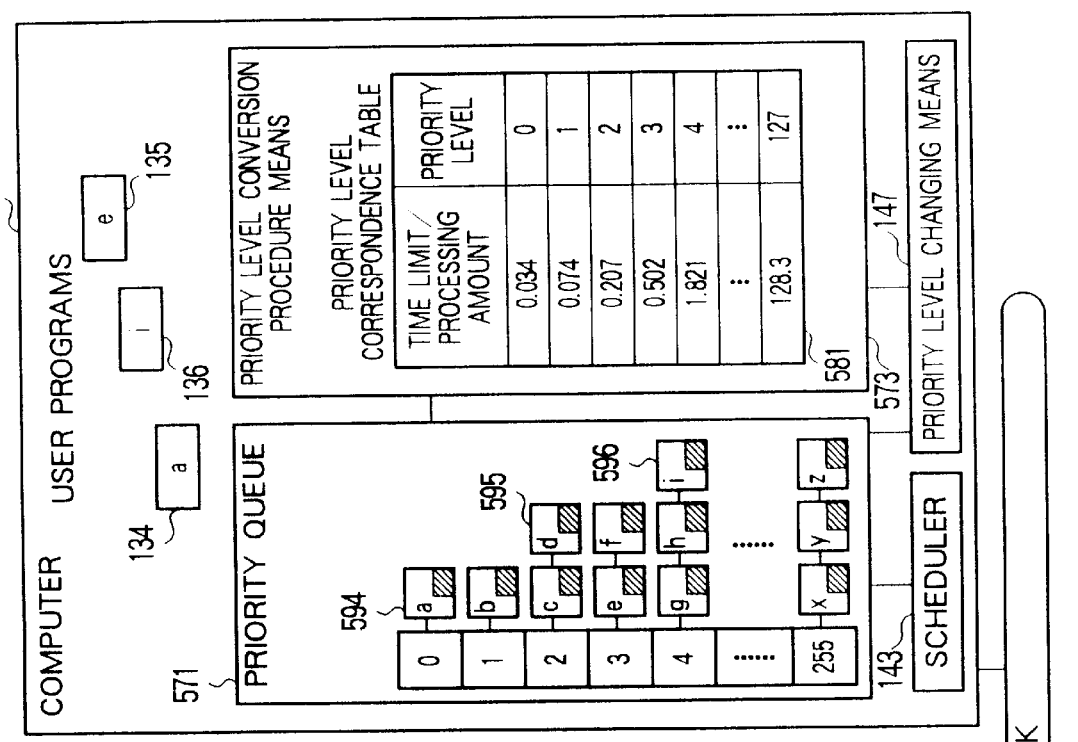
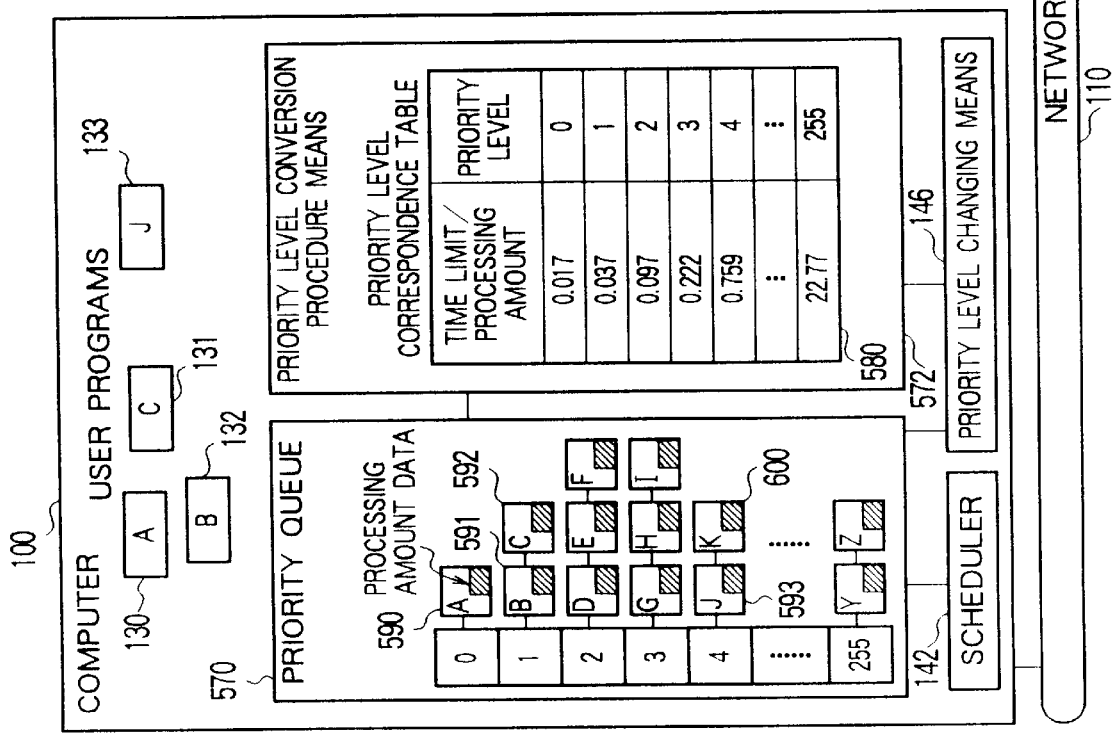

FIG. 23

```
double to_time [256] ;   /* priority -> time limit */
```
~610

FIG. 24

```
to_priority (timelimit)
double timelimit ;
{
    int i = 0 ;
    int j = 255 ;
    int middle ;
    while (i < j) {
        middle = (i + j) / 2 ;
        if (timelimit < to_time [middle])
            j = middle ;
        else if (timelimit >= to_time [middle+1])
            i = middle + 1 ;
        else
            return middle ;
    }
}
```
~620

FIG. 25

```
func (timelimit, arg1, arg2, ···) ;
```
~630

```
func (arg1, arg2, ···, timelimit) ;
```
~631

FIG. 32

COMPUTER 100

| COMPUTER LOAD INFORMATION TABLE | | LOAD AMOUNT TABLE | | LOAD/PERFORMANCE VALUE TABLE | |
|---|---|---|---|---|---|
| TIME LIMIT/ PROCESSING AMOUNT | LOAD | TIME LIMIT RANGE | LOAD AMOUNT | TIME LIMIT RANGE | LOAD/ PERFORMANCE VALUE |
| −0.05 | 3 | 0~0.05 | 3 | 0~0.05 | 0.30 |
| −1.00 | 8 | 0~1.00 | 11 | 0~1.00 | 1.10 |
| −3.00 | 7 | 0~3.00 | 18 | 0~3.00 | 1.80 |
| −9.00 | 16 | 0~9.00 | 34 | 0~9.00 | 3.40 |
| ⋮ | ⋮ | ⋮ | ⋮ | ⋮ | ⋮ |
| −200 | 7 | 0~200 | 241 | 0~200 | 24.10 |

370, 380, 382

COMPUTER 101

| COMPUTER LOAD INFORMATION TABLE | | LOAD AMOUNT TABLE | | LOAD/PERFORMANCE VALUE TABLE | |
|---|---|---|---|---|---|
| TIME LIMIT/ PROCESSING AMOUNT | LOAD | TIME LIMIT RANGE | LOAD AMOUNT | TIME LIMIT RANGE | LOAD/ PERFORMANCE VALUE |
| −0.05 | 1 | 0~0.05 | 1 | 0~0.05 | 0.33 |
| −1.00 | 1 | 0~1.00 | 2 | 0~1.00 | 0.67 |
| −3.00 | 2 | 0~3.00 | 4 | 0~3.00 | 1.33 |
| −9.00 | 5 | 0~9.00 | 9 | 0~9.00 | 3.00 |
| ⋮ | ⋮ | ⋮ | ⋮ | ⋮ | ⋮ |
| −200 | 3 | 0~200 | 71 | 0~200 | 23.67 |

COMPUTER 100

| COMPUTER LOAD INFORMATION TABLE | | LOAD AMOUNT TABLE | | LOAD/PERFORMANCE VALUE TABLE | |
|---|---|---|---|---|---|
| TIME LIMIT/ PROCESSING AMOUNT | LOAD | TIME LIMIT RANGE | LOAD AMOUNT | TIME LIMIT RANGE | LOAD PERFORMANCE VALUE |
| −0.05 | 3 | 0~0.05 | 3 | 0~0.05 | 0.30 |
| −1.00 | 7 | 0~1.00 | 10 | 0~1.00 | 1.00 |
| −3.00 | 7 | 0~3.00 | 17 | 0~3.00 | 1.70 |
| −9.00 | 16 | 0~9.00 | 33 | 0~9.00 | 3.30 |
| ⋮ | ⋮ | ⋮ | ⋮ | ⋮ | ⋮ |
| −200 | 7 | 0~200 | 240 | 0~200 | 24.00 |

370, 380, 382

COMPUTER 101

| COMPUTER LOAD INFORMATION TABLE | | LOAD AMOUNT TABLE | | LOAD/PERFORMANCE VALUE TABLE | |
|---|---|---|---|---|---|
| TIME LIMIT/ PROCESSING AMOUNT | LOAD | TIME LIMIT RANGE | LOAD AMOUNT | TIME LIMIT RANGE | LOAD PERFORMANCE VALUE |
| −0.05 | 1 | 0~0.05 | 1 | 0~0.05 | 0.33 |
| −1.00 | 2 | 0~1.00 | 3 | 0~1.00 | 1.00 |
| −3.00 | 2 | 0~3.00 | 5 | 0~3.00 | 1.67 |
| −9.00 | 5 | 0~9.00 | 10 | 0~9.00 | 3.33 |
| ⋮ | ⋮ | ⋮ | ⋮ | ⋮ | ⋮ |
| −200 | 3 | 0~200 | 72 | 0~200 | 24.00 |

371, 381, 383

DISTRIBUTED COMPUTING SYSTEM

BACKGROUND OF THE INVENTION

The present invention relates to a distributed computing system having a plurality of computers connected to a network for cooperatively executing a plurality of programs, and more particularly to the configuration and method for such a distributed computing system which utilizes priority to realize real-time characteristics.

For ensuring real-time characteristics in a conventional computer system consisting only of a single computer (including a multi-processor type computer), there has been utilized an approach of controlling the order of programs to be processed based on the priority of the programs. "Operating Systems-Design and Implementation" by A. S. Tanenbaum, published by Prentice-Hall, Inc. pp. 82–84, (1987) describes an example of such processing order control using the priority of the programs.

Also, JP-A-2-113362, for example, describes a control scheme in which priority information is added to each message, when communicated between processing nodes in a distributed computing system, such that the messages are processed in the order of priority starting from the message with the highest priority level (this system is hereinafter called the "prior art 1").

Another conventional scheme is also described in JP-A-5-35701. This scheme specifies a tolerable processing pending time when a processing request is issued in a distributed computing system having a plurality of processors, examines a scheduled processing pending time of each processor, and assigns the processing request to a processor whose scheduled processing pending time is shorter than the tolerable processing pending time. If no processors satisfy the tolerable processing pending time, the processing request is assigned to the processor with the shortest scheduled processing pending time. Processing requests assigned to the respective processors are processed beginning with basically the oldest one (this system is herein-after called the "prior art 2").

Further, as described, for example, in JP-A-5-35701, when processing requests are issued, a tolerable processing pending time as well as a priority level, similar to the prior art 1, are added to each request such that the processing requests, after assigned to processors, are processed by the respective assigned processors in the order of the priority level (this method is hereinafter called the "prior art 3").

In a distributed computing system in which a plurality of computers are managed by respective operating systems associated therewith, the priority of programs is separately managed in each of the computers. Therefore, the priority of programs to be executed by the respective computers cannot be managed uniformly in the whole distributed computing system. Particularly in a distributed computing system having computers which differ in performance and load, the urgency represented by the priority of a computer may differ from the urgency represented by the priority of another computer. More specifically, in comparison of a high-performance computer with a low-performance computer, the former can complete processing faster than the latter even if they execute the same processing having a priority level set to zero. Similarly, between a heavily loaded computer and a lightly loaded computer, the meaning given by their respective priority levels will be different from each other.

Moreover, in a distributed computing system having a plurality of different kinds of computers, the priority scheme itself may be different from one computer to another. For example, a computer having a priority level range from 0 to 255 is not compatible with a computer having a priority level range from 0 to 127 with respect to the value set to the priority level. Similarly, the same priority level cannot be used in a computer which regards priority level 0 as the highest rank as well as in a computer which regards priority level 255 as the highest rank.

The prior art 1 simply transmits a message together with a priority level without considering the difference in performance, load, and type among individual computers in a distributed computing system. Therefore, if a message is sent to a low-performance computer or a heavily loaded computer, it is probable that the processing is not executed at a desired speed, possibly resulting in failing to ensure the real-time characteristics.

Further, in the prior art 1, when a plurality of computers are requested to execute programs, a reverse phenomenon may occur, i.e., a request with a lower priority level is completed faster than a request with a higher priority level. For example, assume that processing A with priority level 5 is requested to a computer A, while processing B with priority level 1 to a computer B (assume also that a higher priority is represented by a smaller priority level). In this event, the processing B should have been completed faster than the processing A, for conforming to the original intention. However, if the performance of the computer B is lower than that of the computer A, or if the computer B is more heavily loaded than the computer A, it is possible that the processing A with lower priority be completed faster than the processing B with higher priority.

Furthermore, since the prior art 1 does not consider a situation in which processing requests concentrate on a single computer, particularly, a situation in which processing requests with higher priority levels concentrate on a single computer, the computer which has received a large number of requests with higher priority levels presents difficulties in ensuring the real-time characteristics.

The prior art 2, in turn, may be used to ensure the real-time characteristics to certain extent for individual processing requests, provided that the scheduled processing pending time can be correctly calculated for the respective processors. However, this system may fail to satisfy a time limit condition for a processing request with a short tolerable processing pending time which is newly issued after a certain number of processing requests have already been assigned to respective processors. For example, even in a situation where, if a processor was able to process a newly issued processing request prior to processing requests with a long tolerable processing pending time which have already been assigned to processors, the time limit condition would be satisfied for all of the processing requests, the system of the prior art 2, which assigns processing requests in order, occasionally fails to satisfy the time limit condition for the newly issued processing request. In other words, the prior art 2 is incapable of immediately processing a highly urgent processing request which is issued in a relatively heavily loaded situation. Thus, the prior art 2 has a problem that strict real-time characteristics cannot be ensured.

The prior art 3, on the other hand, is a system which involves: (1) selecting a processor which meets a tolerable processing pending time in assigning a processing request to a processor; and (2) executing processing requests in the order of the priority levels accompanied to the respective requests in each of the processors. According to the prior art 3, the disadvantage of the prior art 2 can be solved to some degree by setting a high priority level to a newly issued processing request with a short tolerable processing pending time. However, since this system preferentially processes a newly assigned processing request with a high priority level, it may fail to satisfy a processing pending tolerable time of an already assigned processing request with a low priority level which was determined that its tolerable processing pending time would be satisfied. For example, assume that, in a situation where a processing request A with a tolerable processing pending time set to one minute and with priority level 5 has been assigned to a processor A, determined that the tolerable processing pending time thereof would be satisfied, a processing request B with a tolerable processing pending time set to 30 seconds and with priority level 1 is newly assigned to the processor A. In this event, the processing request B is tolerable processed prior to the processing request A. This preferential execution may result in failing to satisfy the tolerable processing pending time of the processing request A which has already been assigned to the same processor and for which the tolerable processing pending time should have been ensured to be satisfied.

Also, in the prior art 3, when different processing requests with the same tolerable processing pending time but with different priority levels are assigned to a plurality of processors, a reverse phenomenon similar to that of the prior art 1 can occur due to the difference in load amount and performance among the assigned processors, where processing requested with a lower priority level can be completed faster than processing requested with a higher priority level.

SUMMARY OF THE INVENTION

It is therefore an object of the present invention to solve the problems associated with the above-mentioned real-time characteristics and to realize more strict real-time characteristics in a distributed computing system.

It is another object of the present invention to provide a distributed computing system possibly including different computers in performance, load, and type, which is capable of realizing more strict real-time characteristics by uniformly managing local priority schemes adapted in the respective computers.

The present invention employs either of the following two concepts for uniformly managing the local priority schemes adapted in respective computers which belong to a distributed computing system:

(1) urgency of processing: a common relative value employed in the whole system for indicating how fast processing is to be completed; and (2) time limit on processing: an absolute value indicating how fast processing is preferably completed.

Means for the uniform management of the local priority schemes in respective computers in a distributed computing system, in accordance with the present invention, will hereinafter be described separately for the case where urgency of processing is utilized and for the case where the time limit on processing is utilized.

(A) Means for Management with Urgency of Processing

To achieve the above object, according to one aspect, the present invention is characterized by priority level determining means for determining a priority level suitable for executing a program in consideration of at least one of the performance and the load of each computer and an urgency level of processing executed by the program.

Specifically, the priority level determining means has the following five means as its components which operate in cooperation with each other to enable the management of a distributed computing system for achieving the above objects utilizing the urgency of processing:

(1) priority level conversion means for performing a conversion between an urgency level and a corresponding priority level of processing in accordance with the performance and the load of a computer;

(2) priority level changing means for changing the priority level of a program which executes the processing in accordance with a priority level indicated by the priority level conversion means;

(3) computer selection means for determining a computer suitable for executing the program in consideration of at least one of the performance and the load of each computer and the urgency level of the processing executed by the program;

(4) program selection means, operative when a plurality of programs performing the same operation exist and processing is requested to one of these programs, for determining a program having an optimal priority level from the plurality of programs performing the same operation, in consideration of at least one of the performance and the load of each computer and the urgency level of the processing; and (5) processing forward means for forwarding newly requested processing to a program indicated by the program selection means.

(B) Means for Management with Time Limit of Processing

To achieve the above object, according to another aspect of the present invention, the present invention is characterized by priority level determining means for determining a priority level suitable for executing a program in consideration of at least one of the performance and the load of each computer and a time limit and processing amount of processing executed by the program.

Specifically, the priority level determination means has the following eight means as its components which operate in cooperation with each other to enable the management of a distributed computing system for achieving the above objects utilizing the time limit of processing. It should be noted however that all of the following eight means need not be provided simultaneously:

(1) priority level conversion means for performing a conversion between a set limit and a processing amount of processing and a priority level in accordance with the performance and the load of a computer;

(2) priority level changing means for changing the priority level of a program which executes a program in accordance with a priority level indicated by the priority level conversion means;

(3) communication time prediction means for predicting a communication time with another computer;

(4) computer selection means for determining a computer suitable for executing a program in consideration of at least one of the performance and the load of each computer as well as a set of a time limit and a processing amount of processing executed by the program;

(5) program selection means, operative when a plurality of programs performing the same operation exist and processing is requested to one of these programs, for determining a program having an optimal priority level from the plurality of programs performing the same operation, in consideration of at least one of the performance and the load of each computer and a set of the time limit and the processing amount of the processing;

(6) processing forward means for forwarding newly requested processing to a program indicated by the program selection means;

(7) processing time prediction means for predicting a processing time required for the program to complete processing currently in execution, in accordance with the performance, load, processing amount of the computer; and (8) time limit setting means, operative when a predicted processing time does not satisfy the time limit imposed to the processing, for newly setting a time limit from an elapsed time from the time the processing was requested until passing of the imposed time limit.

The operation carried out by the means for solving the above-mentioned problems will be described separately for the case where the urgency of processing is utilized and for the case where the time limit of processing is utilized.

(A) Management with Urgency Level of Processing

The priority level determining means determines a priority level suitable for executing a program in consideration of at least one of the performance and the load of each computer and the urgency level of processing executed by the program. This enables the processing to be completed at substantially the same speed irrespective of the difference in performance of the respective computers, by giving a low priority level to the program when executed on a high-performance computer and by giving a high priority level when executed on a low-performance computer. Similarly, the processing can be executed at substantially the same speed also irrespective of the difference in load of the respective computers by giving a high priority level to a heavily loaded computer and by giving a low priority level to a lightly loaded computer. Since the priority level is determined in each computer based on the urgency of processing in consideration of the performance and the load of each computer, it is possible to avoid a reverse phenomenon where processing with a lower urgency level is completed earlier than processing with a higher urgency level. Stated another way, more strict real-time characteristics can be ensured as compared with the prior art techniques. The five means constituting the priority level determining means have the following functions, respectively.

The priority level conversion means has a priority level correspondence table which is utilized for the conversion between an urgency level and a corresponding priority level of processing. The contents of the priority level correspondence table are modified in accordance with variations in performance, load, and type of computers.

The priority level changing means changes the priority level of a program in accordance with a priority level indicated by the priority level conversion means. The priority level conversion means in cooperation with the priority level changing means ensure that processing having the same urgency level is executed at substantially the same speed by any of the computers which may be different in performance and load.

The computer selection means refers to computer information area composed of a computer performance information table and a computer load information table, selects a computer, to which a program with a specified urgency level is assigned, so as to equally distribute the load to the computers in the system, and has the selected computer execute the program. The computer performance information table shows the performances of the respective computers, while the computer load information table shows loads on the respective computers for each urgency level. When a load on any computer varies, this varying amount is reflected to the computer load information table. This prevents a multitude of processing with a high urgency level from concentrating on a single computer, thus making it possible to ensure more strict real-time characteristics in the respective computers.

The program selection means employs a program location database which contains information on programs performing the same operation to select a program having an urgency level coincident with a specified urgency level from a group of programs performing the same operation. A processing request is then sent to the selected program. The program location database stores priority levels or urgency levels of programs performing the same operation and the identifiers of computers on which these programs run. Thus, even if the above-mentioned priority level changing means is not employed, it is possible to prepare a plurality of programs with different urgency levels, request a program with the most suitable urgency level selected from these programs to execute processing, and have the requested program execute the processing at a desired speed.

When a program currently executing processing is requested to execute other processing, the processing forward means inquires of the program selection means the locations of other programs performing the same operation as the requested program, and forwards the processing request to a program which was specified as a result by the program selection means. Thus, the new processing requested to the currently executing program can be executed by another program capable of executing the processing at substantially the same speed (with the same urgency level) without waiting for the completion of the currently executed processing by the requested program, thus ensuring more strict real-time characteristics.

(B) Management with Time Limit of Processing

The priority level determining means determines a priority level suitable for the execution of a program in consideration of at least one of the performance and the load of each computer as well as a set of a time limit and a processing amount of processing executed by the program. In this way, a set of the time limit and the processing amount of the processing are converted to a local priority level defined in each computer in accordance with the performance and the load of the computer, and the processing is executed with the converted priority level. Thus, it is possible to execute newly requested processing with a shorter time limit prior to previously assigned processing with a longer time limit. Also, since the time limit of processing can be converted to a local priority level in a computer in accordance with the performance and the load of the computer, if an elapsed time is approaching to a time limit of processing already assigned to a computer, the time limit of the processing is made shorter and a corresponding priority level is again determined in accordance with the shortened time limit to the processing, whereby newly requested processing will not hinder the execution of previously assigned processing. Stated another way, more strict real-time characteristics can be ensured as compared with the prior art techniques. The eight means constituting the priority level determination means have the following functions, respectively.

The priority level conversion means has a priority level correspondence table, indicating the correspondence between a time limit per unit processing amount and a priority level, which is employed to perform a conversion between a set of a time limit and a processing amount of processing and a corresponding priority level. The contents of the priority level correspondence table are modified in accordance with variations in performance, load, and type of computers.

The priority level changing means changes the priority level of a program in accordance with a priority level indicated by the priority level conversion means. The priority level conversion means in cooperation with the priority level changing means enable processing to be executed with a local priority level of each computer corresponding to a time limit imposed to the processing. It is therefore possible to execute processing with a shorter time limit prior to other processing with a longer time limit, thus ensuring more strict real-time characteristics for each processing in the distributed computing system. If even processing with a long time limit is left unexecuted in order to preferentially execute other processing with a short time limit, the elapsed time approaches the time limit of the processing that is left unexecuted. In this event, the priority level of the processing is corrected to a larger value in accordance with the shortened available time to the processing, so that the processing can be executed with the corrected priority level.

The communication time prediction means has a communication time table for holding a communication time with each computer and informs a time required for a communication with a certain computer when so requested. In this way, the time limit of processing can be more strictly set if the communication time between computers is not negligeable.

The computer selection means refers to a computer information area composed of a computer performance information table and a computer load information table, selects a computer, such that the load or processing with a specified time limit per unit processing amount is equally distributed to computers, and has the selected computer execute a program. The computer performance information table shows the performances of the respective computers, while the computer load information table shows loads on the respective computers for each urgency level. When a load on any computer varies, this varying amount is reflected to the computer load information table. This prevents a multitude of processing with a short time limit from concentrating on a single computer, thus making it possible to more strictly ensure the real-time characteristics in the respective computers.

The program selection means employs a program location database which contains information on programs performing the same operation to select a program, having a time limit per unit processing amount coincident with specified one, from a group of programs performing the same operation. A processing request is then sent to the selected program. The program location database stores either priority levels or urgency levels of programs performing the same operation and the identifiers of computers on which these programs run. Thus, even if the above-mentioned priority level changing means is not employed, it is possible to prepare a plurality of programs with different time limits, request a program with the most suitable time limit selected from these programs to execute processing, and have the requested program execute the processing at a desired speed.

When a program currently executing processing is requested to execute other processing, the processing forward means inquires of the program selection means the locations of other programs performing the same operation as the requested program, and forwards the processing request to a program which was specified as a result by the program selection means. Thus, the new processing requested to the currently executing program can be executed by another program capable of executing the processing at substantially the same speed without waiting for the completion of the currently executed processing by the requested program, thus ensuring more strict real-time characteristics.

The processing time prediction means calculates a time required to complete a program from a remaining processing amount to be executed by the program and a time limit per unit processing amount of the program.

The time limit setting means determines a new time limit for processing from a time limit of the processing specified upon requesting the processing and an elapsed time from the execution of the processing has been started. The time limit setting means, in corporation with the processing time prediction means, determines whether the time limit of the processing is satisfied if a program is executed with a current priority level. If it is determined that the time limit is not satisfied, a shorter time limit may be set. By the use of the newly set time limit, the priority level conversion means and the priority level changing means can give a higher priority level to the program, and forward the processing to another program performing the same operation which can satisfy the new time limit to have this program execute the processing. In this way, the processing can be managed to satisfy the originally given time limit.

BRIEF DESCRIPTION OF THE DRAWINGS

FIG. 1 is a diagram showing the configuration of a distributed computing system according to a first embodiment of the present invention;

FIG. 2 shows a data structure of a priority level correspondence table which indicates the correspondence between the urgency level and the priority level;

FIG. 3 shows another example for implementing a priority level conversion means;

FIG. 4 shows a form of a program for issuing a processing request with a specified urgency level;

FIG. 8 shows a program for modifying the priority level correspondence table in accordance with an increase or decrease in load;

FIG. 13 shows examples of a computer load information table, load amount table, and load/performance value table in the third embodiment of the present invention;

FIG. 15 shows other examples of the computer load information table, load amount table, and load/performance value table in the third embodiment of the present invention;

FIG. 22 is a diagram showing the configuration of an eighth embodiment of the present invention;

FIG. 23 shows a data structure of a priority level correspondence table indicating the correspondence between the time limit and the priority level;

FIG. 24 shows a program for deriving a priority level from a given time limit;

FIG. 25 shows a form of a program for issuing a processing request with a specified time limit;

FIG. 32 shows examples of a computer load information table, load amount table, and load/performance value table in the tenth embodiment of the present invention;

FIG. 34 shows other examples of the computer load information table, load amount table, and load/performance value table in the tenth embodiment of the present invention;

DESCRIPTION OF THE PREFERRED EMBODIMENTS

Figure 5:
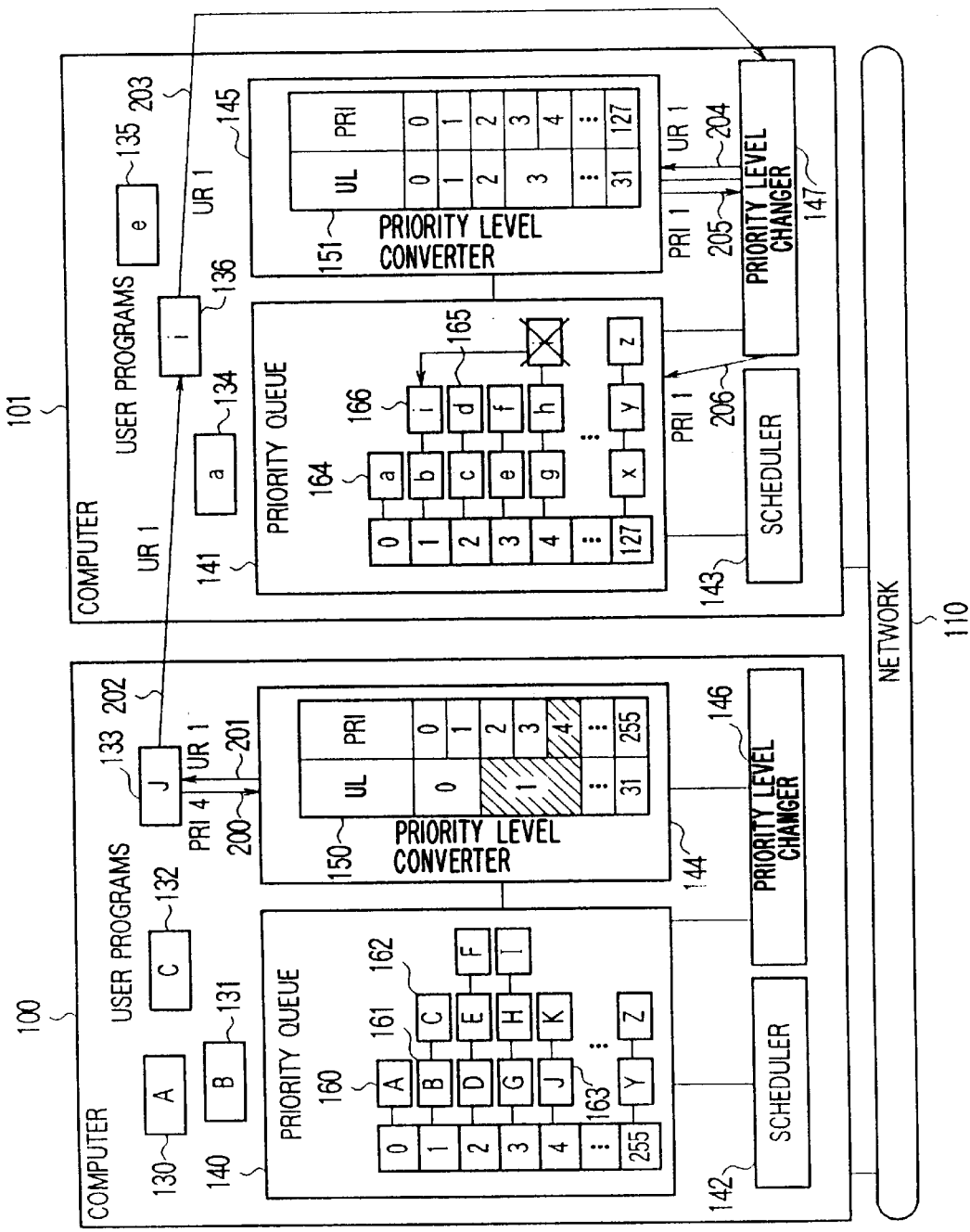
FIG. 5 is a diagram showing a processing flow for performing communications for specifying an urgency level.

The present invention will hereinafter be described in connection with preferred embodiments thereof with reference to the accompanying drawings.

First, a series of embodiments utilizing the concept of urgency will be shown, followed by embodiments utilizing the concept of time limit.

(A) System Utilizing Processing Urgency

FIG. 1 shows the configuration of a distributed computing system according to a first embodiment of the present invention. In this system, a plurality of computers 100–103 are connected to a network 110 such that programs run on the respective computers in cooperation with each other. While only four computers are shown connected in the system of FIG. 1, a number of computers larger than or smaller than this may be employed to constitute a system. The network 110 may include a communication bus, optical fibers, cross-bar coupling network, and so on. Programs on the respective computers communicate with each other through the network 110. Details of the internal configuration are shown only for the computers 101, 101. Each of the computers comprises a central processing unit 120, a main storage unit 121, an input/output control unit 122, and so on, and receives and transmits data through an internal bus 125. These computers may differ from each other in the performance of the central processing unit 120 or the like relation to. The input/output control unit 122 in each computer is generally connected to an external storage unit 123 and a terminal 124, respectively, for receiving and forwarding data from and to the computer. The main storage units 121 contain user programs 130–136, priority queues 140, 141, schedulers 142, 143, priority level conversion procedure means 144, 145, and priority level changing procedure means 146, 147, all of which are processed by the central processing units 120 of the respective computers. Generally, each computer is provided with its own operating system for managing executions of programs and other conditions on the associated computer. The priority queue and scheduler are often included in a part of the operating system. In FIG. 1, the description of the operating system is omitted. The number of user programs and how to locate them to the respective computers may be arbitrarily determined by the user.

When a plurality of programs run in cooperation with each other in a multi-processor type computer system or a distributed computing system as shown in FIG. 1, user programs on respective computers normally manage their processing order by utilizing queues of the operating system or the like. However, the processing urgency may be different from one user program to another. For this reason, each user program is given a local priority level in each computer such that the user programs are put into a queue in accordance with the given priority level for managing the order of executing these user programs. The priority queues 140, 141 constitute the queues for the respective priority level in the computers 100, 101. It is assumed in the embodiment shown in FIG. 1 that the computer 100 has the priority level in the range of 0–255, while the computer 101 has the priority level in the range of 0–127. A queue is formed for each of the priority levels with which the schedulers 142, 143 determine the next program to be executed. The priority queues are composed of program structures (examples of the program structure are shown as blocks 160–166 in FIG. 1), each of which has information on associated user programs. While program structures for programs D, E, F, and so on exist in the priority queues other than the user program 130–136 resident on the main storage unit 121, these are not programs resident on the main storage unit 121 but on the external storage unit 123. The programs D, E, F, and so on can be executed after necessary program data associated therewith are forwarded from the external storage unit 123 to the main storage unit 121.

For requesting the distributed computing system to execute processing, each user of the distributed computing system instructs any of the computers included in the distributed computing system to newly run his or her user program or instructs the system to execute a previously existing program by inputting data through an input means. Each of the programs on the distributed computing system executes its processing while communicating with other programs as required, and returns the results to the user or displays on a terminal of any computer. Stated another way, the inputting to the distributed computing system is equal to inputting a program into the distributed computing system or inputting data for a program through an input means such as a terminal or the like. Also, the outputting from the distributed computing system is equal to outputting the results of a program executed by the distributed computing system as a display on the screen of a terminal or the like.

The schedulers 142, 143 each determine the next program to be executed in accordance with the contents of the priority queues 140, 141, respectively. In this embodiment, the priority queue 140 of the computer 100 includes a program A (user program 130) on a level 0 queue, and a programs B (user program 131) and C (user program 132) on a level 1 queue. In this situation, if the scheduler 142 is adapted to execute programs beginning with the program with the smallest priority level, the programs are executed in the order of A, B, C, D, E, F, . . . with the priority queue thus formed. The priority queues 140, 141 and the schedulers 142, 143 normally form part of the operating systems of the respective computers. The policy as to how to determine the order of executing programs may differ from that described above depending on the type of operating system employed. This embodiment will be described below on the assumption that a smaller priority level value indicates a higher priority rank (i.e., a program with a smaller priority level is executed earlier).

As described above, programs with different urgencies can be uniformly managed in the same computer by giving a priority level to each program in view of the order of executing the programs. However, the local priority schemes are not compatible with each other among computers which differ in performance, load, and type. To deal with this problem, this embodiment introduces "urgency", which is a common concept in the whole distributed computing system, for uniformly managing the global priority scheme in the whole distributed computing system including a plurality of computers which differ from each other in performance, load, and type. The urgency can be regarded as the global priority scheme applicable to the whole distributed computing system. In this embodiment, it is assumed that the urgency can be specified in the range of 0–31. Means provided in this embodiment for introducing the urgency are the priority level conversion procedure means 144, 145 and the priority level changing procedure means 146, 147. The description of the embodiment will hereinafter proceed on the assumption that a smaller value of the urgency indicates a higher urgency rank, just like the priority level as described above is assumed.

The priority level conversion procedure means 144, 145 are means for converting the urgency which is the common data in the distributed computing system to a local priority level which is data inherent to each computer, and vice versa. In this embodiment, the priority level conversion procedure means 144, 145 are provided with priority level correspondence tables 150, 151 which indicate the correspondence between the urgency (UR) and the local priority level (PRI) in each computer. It can be seen from FIG. 1 that in the computer 100, urgency level 0 corresponds to priority level 0 or 1, and urgency level 1 to priority levels 2–4, whereas, in the computer 101 which is inferior to the computer 100 in performance, urgency level 0 corresponds to priority level 0, and urgency level 1 to priority level 1. In this way, a higher priority level is given to the same urgency level in the computer 101 than the computer 100. This ensures that a program having the same urgency will be completed by the two computers 100, 101 which differ in performance at substantially the same speed. The contents of the priority level correspondence tables 150, 151 may be modified depending on the amounts of loads charged on the respective computers, such that the same urgency level corresponds to a higher priority level in a heavily loaded computer than in a lightly loaded computer. The priority level conversion procedure means 144, 145 utilize the respective priority level correspondence tables 150, 151 to convert a given urgency level to a corresponding priority level for the associated computers 100, 101, and a priority level to a corresponding urgency level.

While the priority level correspondence tables 150, 151 can be created based on the array structures shown in FIG. 1, one urgency level may correspond to a plurality of priority levels, so that the conversion from an urgency level to one or a plurality of priority levels cannot be accomplished in an efficient manner. FIG. 2 shows an example of a data structure, written in C-language for the priority level correspondence table 150 in order to efficiently perform the conversion between the urgency level and the priority level. For facilitating the conversion between the urgency level and the priority level, the priority level correspondence table is composed of a combination of two arrays. In this priority corresponding table 150, since a priority level can be uniquely converted to a corresponding urgency level, an array 170 may be used. However, since an urgency level is converted to a plurality of corresponding priority levels, a different data structure is employed for storing the smallest priority level and the largest priority level for each urgency level (array 171). A value indicated by each array element is shown in a data structure 172. When this data structure is used, the conversion between the urgency level UL and the priority level PRI may be made in the following manner.

(1) Conversion from priority level to urgency level u←to_urgency [p]

(2) Conversion from urgency level to priority level p←to_any integer value between priority [u] .start and to_priority [u]. end In this embodiment, the relationship between the urgency level and the priority level is fixed to a one-to-multiplicity relationship. Therefore, while the conversion from the priority level to the urgency level is implemented by a simple array, the correspondence between the urgency level and the priority level may be set in a one-to-multiplicity relationship or a multiplicity-to-multiplicity relationship, if a range of the urgency level is wider as compared with the one shown in this embodiment. If the multiplicity-to-multiplicity relationship is adapted, the array 170 must be reformed into a similar structure to the array 171. With the one-to-multiplicity relationship, a priority level correspondence table for this case can be implemented by replacing the array 170 with the array 171. It should be noted that for changing the range of the priority level or the range of the urgency level, the numbers of elements in the arrays 170, 171 must be changed.

While in the example shown in FIGS. 1, 2, the priority level correspondence tables 150, 151 are utilized to convert the urgency level and the priority level, and vice versa, the conversion may be achieved without utilizing such priority level correspondence tables. FIG. 3 shows the contents of the priority level conversion procedure means 144 which does not utilize a priority level correspondence table. The procedure is written in C-language. The block 180 includes a conversion procedure from the urgency level to the priority level, and the block 181 includes a conversion procedure from the priority level to the urgency level. While this embodiment has selected, as an optimal equation, an equation expressing that a priority level is proportional to a square of an urgency level, it is also possible to empirically derive an optimal relationship for each computer in the distributed computing system and express the derived relationship in the form of a first-order equation or a multiple-order equation. This embodiment employs the computer performance per unit load as a proportional coefficient. Also, it is convenient in this embodiment that a load is represented by a number of programs in the priority queue (a number of executable programs), and the computer performance by the CPU (Central Processing Unit) performance in the unit of 10 MIPS (1 MIPS represents the performance of a CPU which is capable of executing one million instructions per second). By utilizing this conversion procedure, a lower priority rank (a larger value of the priority level) can be set to the same urgency level if the CPU performance per program is higher, while a higher priority rank (a smaller value of the priority level) can be set to the same urgency if the CPU performance per program is lower.

The priority level changing procedure means 146, 147 in FIG. 1 each change the priority level of each program in accordance with the local priority scheme in the associated computer 100, 101 calculated by the priority level conversion procedure means 144, 145, respectively. For example, in FIG. 1, a program J (user program 133) has urgency level 1 and priority level 4. Assuming that the urgency level of this program J is changed from 1 to 0, the priority level conversion procedure means 144 converts the changed urgency level to a corresponding priority level to derive new priority level 0 (or 1). The priority level changing procedure means 146 utilizes this value to change the priority level of the user program to 0. Simultaneously, a program structure 163 for the program J is forwarded to the level 0 queue.

The priority level conversion procedure means 144, 145 and the priority level changing procedure means 146, 147 are both service programs which operate in cooperation with a part or all of the respective operating systems. For building these procedures as such service programs, it is necessary to employ a form such that the priority level changing procedure means 146, 147 request the respective operation systems to change the priority level of a program. Each of the requested operating systems actually changes the priority level of the program as well as forwards the program structure to a queue for the changed priority level.

Next, explanation will be given for a method for requesting processing between computers based on the urgency, using the priority level conversion procedure and the priority level changing procedure described in this embodiment. For requesting processing between computers in a real-time distributed computing system, the system architecture may be simplified by indicating an urgency level desired to particular processing. For adapting this approach, the present invention enables a requesting program to specify an urgency level when it requests processing. FIG. 4 shows an example of a method for specifying an urgency level written in C-language, wherein the block 190 represents a method for specifying an urgency level in the first argument of a processing request, and the block 191 represents a method for specifying an urgency level in the last argument of a processing request. Incidentally, the requesting program need not directly describe how to specify an urgency level, but instead a compiler or translator may be used to translate it into the forms represented by the blocks 190, 191.

FIG. 5 schematically shows a processing flow for issuing a processing request using the above-mentioned urgency level specifying method. Elements 100, 101, 110, 130–136, 140–147, 150, 151, and 160–166 in FIG. 5 are identical to the elements designated the same reference numerals in FIG. 1. Illustration of the computers 102, 103 and details within the computers are omitted in FIG. 5. This embodiment shows a flow executed when a user program 133 issues a processing request to another user program 136. Communications represented by arrows 200–206 describe the flow of the processing steps. In FIG. 5, it is assumed that data written adjacent to each arrow representing a communication indicates important data transmitted by that communication. The user program 133 has priority level 4 (program structure 163) in the priority queue 140. First, the user program 133 requests a conversion from the priority level thereof (4) to a corresponding urgency level to the priority level conversion procedure means 144 (communication 200). In FIG. 5, since priority level (PRI) 4 corresponds to urgency level (UL) 1 in the computer 100, the priority level (PRI) conversion procedure means 144 returns urgency level 1 to the user program 133 as the conversion result (communication 201). Then, the user program 133 requests the user program 136 in the computer 101 to perform processing using the received urgency level 1 in accordance with the urgency level specifying form 190 or 191 (communication 202). The computer 101, upon receiving the communication for specifying urgency level 1, must convert this urgency level 1 to a local priority scheme in the computer 101 and execute the user program 136 with a priority level which results from the conversion. The user program 136 requests the priority level changing procedure means 147 to change the specified urgency level 1 to a corresponding priority level (communication 203). The priority level changing procedure means 147 requests the priority level conversion procedure means 145 to convert the urgency level 1 to a corresponding priority level in the computer 101 (communication 204). In FIG. 5, urgency level 1 corresponds to priority level 1 in the computer 101. The priority level conversion procedure means 145 provides the priority level changing procedure means 147 with priority level 1 as the conversion result to indicate that the user program 136 must be executed with priority level 1 (communication 205). Finally, the priority level changing procedure means 147 forwards a program structure 166 (corresponding to the user program 136), now coupled to a queue for priority level 4, to a queue for priority level 1 in the priority queue 141 (communication 206).

In this way, the local priority levels given to a requesting program and a requested program resident on different computers can be uniformly managed by means of the urgency level which is a common concept in the whole distributed computing system. If the processing requesting program has previously recognized its own urgency level, the conversion from the local priority level in the computer to the common urgency level is not necessary (communications 200, 201). It is also possible to issue a processing request with an urgency level different from its own urgency level simply by directly specifying a desired urgency level.

Figure 6:
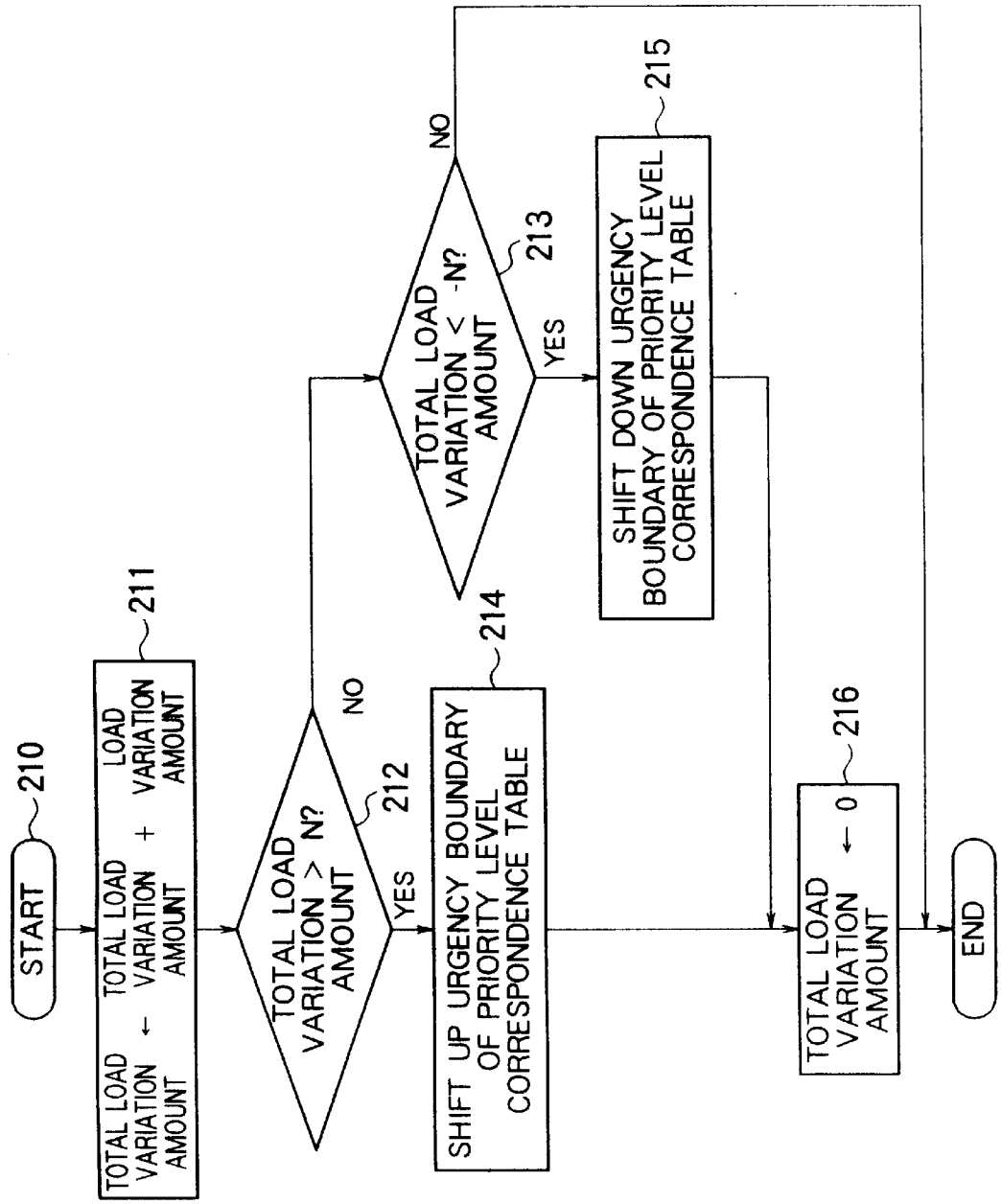
FIG. 6 is a flow chart representing a processing flow for changing the contents of a priority level correspondence table, which indicates the correspondence between the urgency level and the priority level, in accordance with a varying load.

While the priority level correspondence tables 150, 151 shown in FIG. 1 are each assigned in view of the performance of the associated computer 100 or 101, the time required to complete processing actually depends on the amount of load charged to each computer. Therefore, this embodiment modifies the priority level correspondence tables 150, 151 each time a load on the associated computer is varied. FIG. 6 shows a processing flow 210 for modifying the contents of the priority corresponding table.

In this embodiment, when a load on a computer (a number of executable programs) is increased or decreased by a predetermined amount, the contents of the priority level correspondence table is modified. A difference in load between the previous priority level correspondence table and the modified priority level correspondence table is called a "total load variation amount". When a load is varied, the current load variation amount is added to the total load variation amount (step 211). Then, it is determined whether the resulting total load variation amount becomes larger than a positive predetermined value (step 212) or smaller than a negative predetermined value (step 213). If the total load variation amount is larger than the positive predetermined value, it means that the load has been increased by the predetermined amount, so that an urgency boundary in the priority level correspondence table is shifted up (step 214). Conversely, if the total load variation amount is smaller than the negative predetermined value, it means that the load has been decreased by the predetermined amount, so that the urgency boundary in the priority level correspondence table is shifted down (step 215). When the contents of the priority level correspondence tables are modified, the total load variation amount is reset to zero at the final step (step 216). Then, the total load variation amount is again accumulated from zero.

Figure 7:
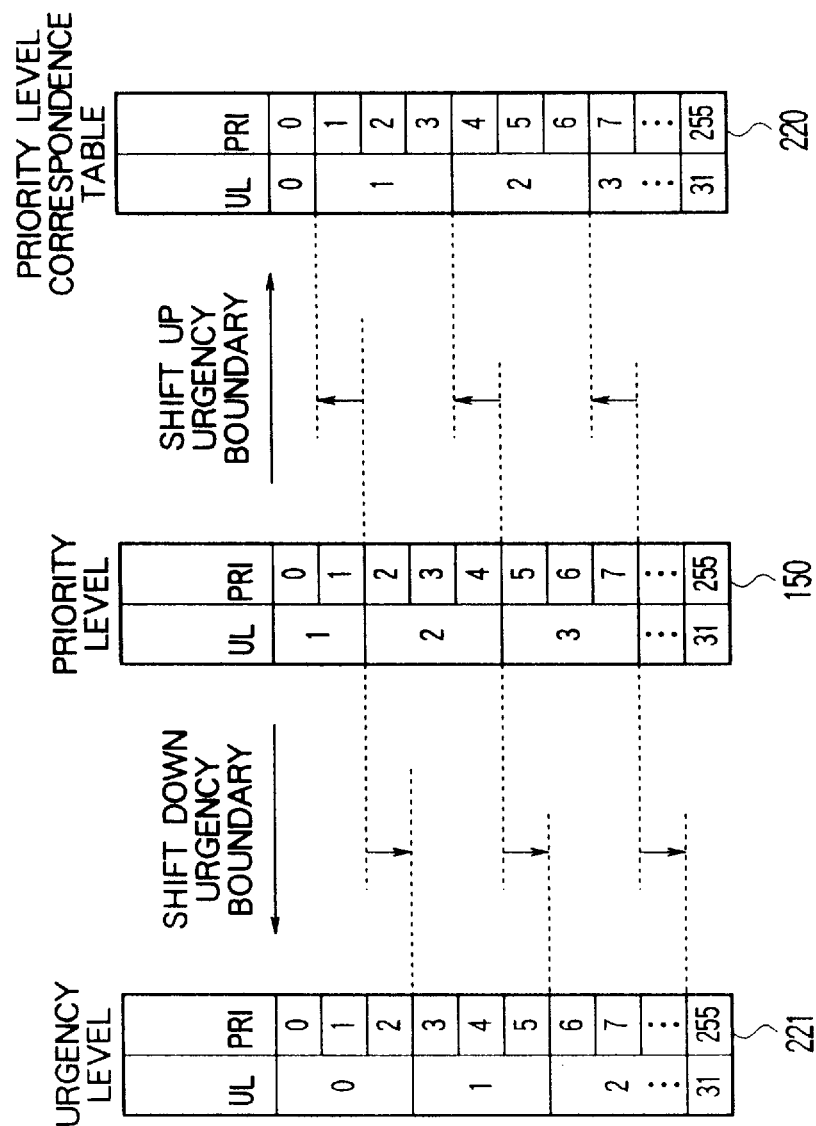
FIG. 7 shows how the priority level correspondence table is modified in accordance with an increase or decrease in load.

The meaning implied in the shifting of the urgency boundary in the priority level correspondence table in the upward or downward direction at step 214 or 213 will be explained with reference to FIG. 7. When an increase in load causes the urgency boundary in the priority level correspondence table 150 to shift upward, a modified priority level correspondence table as 220 is derived. It will be understood from the table 220 that a program with the same urgency level can be assigned a higher priority level as compared with the previous priority level correspondence table 150 before the modification. Conversely, when a decrease in load causes the urgency boundary to shift downward, a modified priority level correspondence table as 221 is derived, whereby a program with the same urgency level is assigned a lower priority level. By thus shifting the urgency boundary upward or downward, even if a program with the same urgency level is to be processed by computers having the same performance (or by the same computer), the program can be executed with a higher priority level when the computer is heavily loaded, and with a lower priority level when the computer is lightly loaded. In this way, a uniform priority management can be accomplished in further consideration of variations in load on each computer in the distributed computing system.

While in this embodiment, the urgency boundary is shifted upward or downward by one priority level, the shifting amount may be changed depending on a load variation amount.

Next, explanation will be given of a procedure for shifting the urgency boundary upward or downward when using the priority level correspondence table defined by the data structures 170 and 171 shown in FIG. 2. FIG. 8 shows examples of the procedure described in C-language. The block 230 represents the procedure for shifting the urgency boundary upward. Since "to_priority [u].end" and "to_priority [u+1].start" in the data structure 171 indicate a lower urgency boundary of the urgency level u, these parameters are decreased to shift the urgency boundary upward (statements 240, 241). The priority level correspondence table includes a portion in which the urgency level viewed from the priority level changes due to the shifting of the urgency boundary. For example, in FIG. 7, the urgency level corresponding to priority level 1 changes from 0 to 1 due to the urgency boundary being shifted upward. For this reason, the contents of the array 170 for converting the priority level to the urgency level must be modified in correspondence to the change in the urgency level. When the urgency boundary is shifted upward, "to_priority [u+1].start" is the portion in which the urgency level changes from the perspective of the priority level. Therefore, the value of "to_urgency [to_priority [u+1].start] is increased for correction (statement 242).

It should be noted herein that a modification to the priority level correspondence table may result in a change in the urgency level set to a program which already exists in the priority queue. For example, in FIG. 7, upward shifting of the urgency boundary causes the urgency level of a program with urgency level 0 and priority level 1 to change from 0 to 1. As a result, this program has urgency level 1 and priority level 1 as its attribute. In this embodiment, since this program is corrected to have urgency level 0, a processing flow shown in FIG. 9, later described, can be introduced into the priority level changing procedure means 146, 147. The flow of FIG. 9 functions to change the priority level of a program having the urgency level changed due to a modification to the priority level correspondence table, such that the program maintains the same urgency level as it had before the priority level correspondence table was modified. In the above example, by decreasing the priority level of all programs having priority number 1 by one such that these programs have priority level 0, the urgency level of these programs is corrected to the value (urgency level 0) they had before the priority level correspondence table was modified. A statement 243 is a function to call the processing flow shown in FIG. 9 from the priority level conversion procedure means 144, 145. In statement 243, the name of the function shown in FIG. 9 is assumed to be "change_all_priority", and arguments to be specified are "to_priority [u+1].start", which is a portion where the correspondence between the urgency level and the priority level has changed, and an increment of the priority level (note that, in statement 243, the increment of the priority level is −1 so that a decrease in the priority level is specified).

Figure 9:
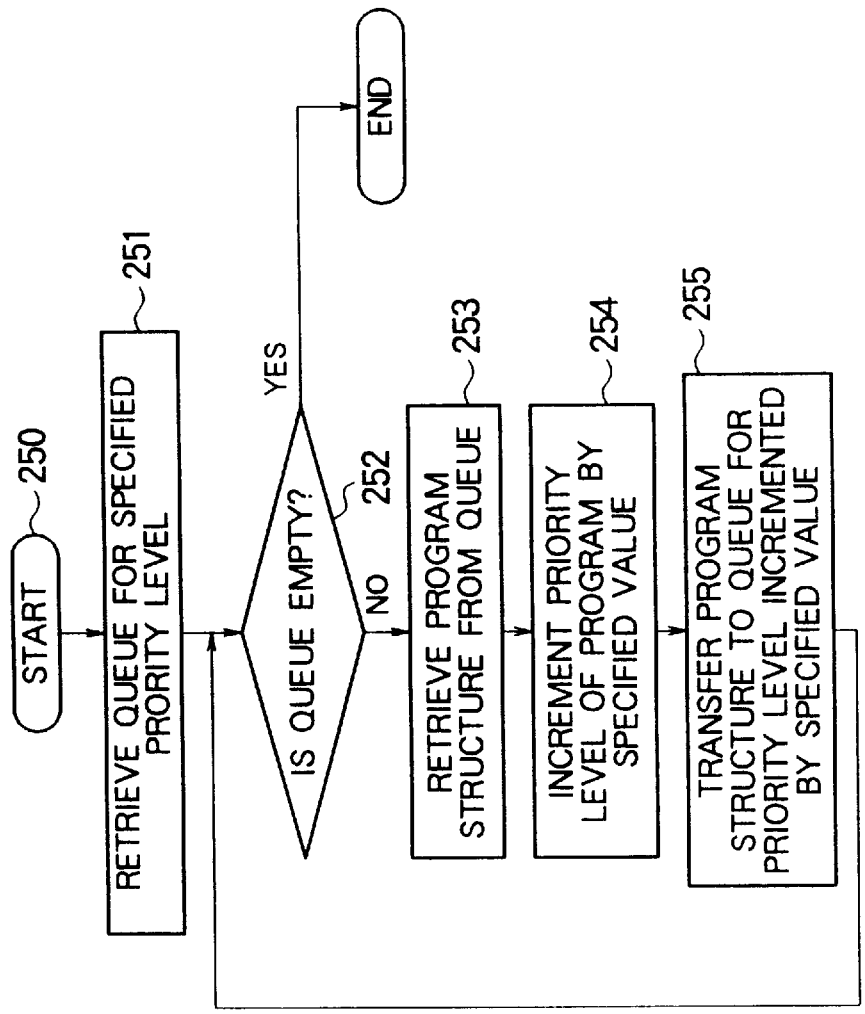
FIG. 9 is a flow chart showing a processing flow for changing a priority level of a program in conformity with a modification to the priority level correspondence table.

FIG. 9 shows, among functions provided in the priority level changing procedure means 146, 147, the processing flow 250 for changing the priority level of all programs having a particular priority level to a different value. First, the flow 250 retrieves a queue corresponding to a specified priority level from the priority queue 140 or 141 (step 251), and examines whether the queue is empty or not (step 252). Unless the queue is empty, a program structure in the queue is retrieved (step 253), and the priority level of the programs is incremented by a specified value (step 254). If the specified value is negative, the priority level is decreased. It should be noted that in this example, a decreased priority level means a higher priority rank. Then, the retrieved program structure is forwarded to a queue corresponding to the priority level increased by the specified value (step 255). If a negative value is added, the resulting priority level will be decreased. Thus, the priority level change, required by statement 243, is accomplished, whereby the priority level of programs can be changed so as to maintain the same urgency level.

Similar to the foregoing description, the block 231 in FIG. 8 represents a procedure for shifting the urgency boundary downward. This downward shifting is carried out by increasing "to_priority [u].end" and "to_priority [u+1].start" in the data structure 171 (statements 244, 245). When the urgency boundary is shifted downward, a portion in which the urgency level changes viewed from the priority level is "to_priority [u].end". Therefore, the value of "to_urgency [to_priority [u].end] is decreased for correction (statement 246). The priority level of programs can be changed by statement 247, as is the case of the procedure 230. In this case, "to_priority [u].end" which is a portion where the correspondence between the urgency level and the priority level has changed, and an increment in priority level (=1) are specified as arguments.

The configuration, operation, and procedures according to the first embodiment have been described with reference to FIGS. 1–9. The first embodiment utilizes the concept of the urgency to enable the distributed computing system to uniformly manage the local priority schemes of a plurality of computers which differ from each other in performance, load, and type. By specifying the same urgency level to these computers, requested processing is expected to be completed at substantially the same speed in any of these computers. Also, since the urgency level is converted to the priority level in consideration of the performance and load of computers, it is possible to avoid a reverse phenomenon in which processing with a lower urgency level is completed earlier than processing with a higher urgency level, even if they are executed on different computers. In summary, the first embodiment ensures, by virtue of the urgency, more strict real-time characteristics in a distributed computing system.

Further, in this embodiment, since the contents of the priority level correspondence tables and priority queues can be modified (as described in connection with FIGS. 6–9), the priority scheme can be managed in accordance with dynamically changing loads on respective computers.

Furthermore, in addition to the two principal effects described above, when processing is requested to two or more computers, the urgency level can be specified to the processing in accordance with the importance thereof. Additionally, it is not necessary to know the performance, load, and type of cooperative computers for specifying the urgency level to the processing.

While a load on a computer is represented by a number of executable programs in the first embodiment, the load may be represented by the sum of a processing amount of executable programs and predicted processing time. The latter way brings about more accurate load calculations for the respective computers to ensure more strict real-time characteristics. Further, while the priority level is determined in consideration of both load and performance of each computer, the determination may be made based on only one of them. Particularly, when a distributed computing system is composed of the same computers, only the load may be taken into consideration. In this way, the conversion between the urgency level and the priority level can be performed in an efficient manner.

Figure 10:
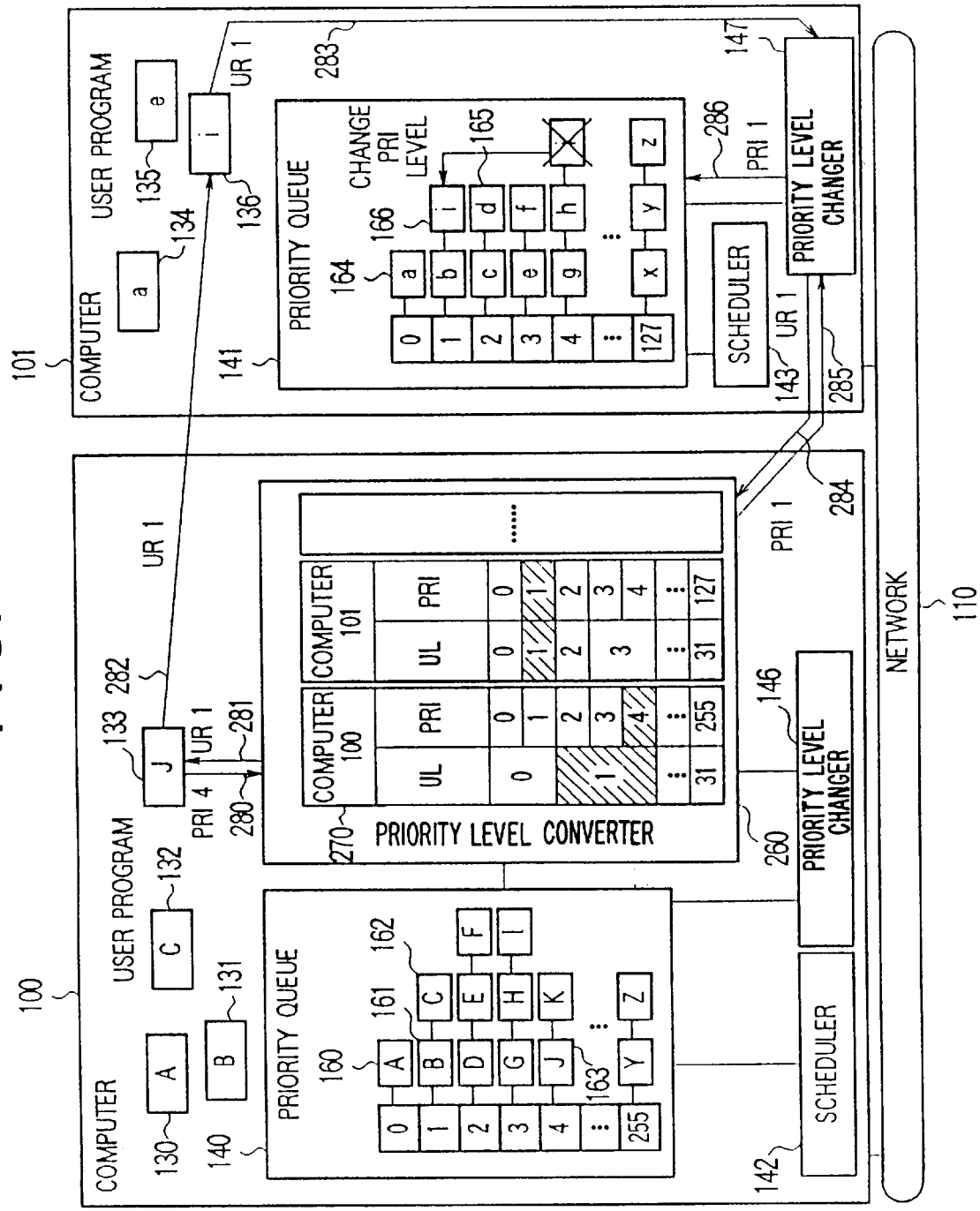
FIG. 10 is a diagram showing a second embodiment of the present invention and a processing flow for performing communications for specifying an urgency level in this embodiment.

Next, the configuration of a distributed computing system according to a second embodiment of the present invention will be described with reference to FIG. 10. The second embodiment shown in FIG. 10 is featured by a priority level conversion procedure means 260 for managing the priority levels of all computers included in a distributed computing system. Elements 100, 101, 110, 130–136, 140–143, 146, 147, and 160–166 are identical to those designated the same reference numerals in FIG. 1. Illustration of computers 102, 103 and details within the computers are omitted in FIG. 10. The priority level conversion procedure means 260 has a priority level correspondence table 270 for representing the correspondence between the priority level and the urgency level for all computers. The data structure of the priority level correspondence table 270 is such that the data structures 170, 171 shown in FIG. 2 are prepared for the number of computers in the distributed computing system. Therefore, modifications to the priority level correspondence table 270 and associated changes in the priority level of programs are performed by the same procedures as those described with reference to FIGS. 6–9.

FIG. 10 also includes illustration of a concept of a processing flow for requesting processing with a specified urgency level. It is assumed in this embodiment that the processing flow represents the steps performed when a user program 133 in the computer 100 issues a processing request to a user program 136 in the computer 101, as in the case of FIG. 5. First, the user program 133 requests the priority level conversion procedure means 260 to convert its priority level to a corresponding urgency level (communication 280). When the user program 133 and the priority level conversion procedure means 260 are resident on different computers from each other, the communication 280 is an inter-computer communication. Since the priority level correspondence table 270 shows that priority level 4 in the computer 100 corresponds to urgency level 1, the priority level conversion procedure means 260 returns urgency level 1 to the user program 133 (communication 281). The user program 133 next issues a processing request to the user program 136 using the received urgency level 1 (communication 282). The computer 101, upon receiving the communication for specifying urgency level 1, converts urgency level 1 to a local priority level in the computer 101, and commands the user program 136 to execute the requested processing with the derived priority level. The user program 136 requests a priority level changing procedure means 147 to change the specified urgency level 1 to a corresponding priority level (communication 283). The priority level changing procedure means 147 requests the priority level conversion procedure means 260 to convert the specified urgency level 1 to a corresponding priority level (communication 284). In this embodiment, urgency level 1 corresponds to priority level 1 in the computer 101. The priority level conversion procedure means 260 returns priority level 1 to the priority level changing procedure means 147 as the conversion result to indicate that the user program 136 must be executed with priority level 1 (communication 285). Since the user program 136 and the priority level conversion procedure means 260 are resident on different computers from each other, the communications 284, 285 are inter-computer communications. Finally, the priority level changing procedure means 147 forwards a program structure 166 in a priority queue 141 to a queue for priority level 1 (communication 286).

It should be noted that if the processing requesting program has previously recognized its own urgency level, the conversion from the local priority level in the computer on which the program is resident to the common urgency level (communications 280, 281) is not necessary, as in the case of FIG. 5. It is also possible that a program issues a processing request with an urgency level different from its own urgency level, simply by directly specifying a particular urgency level.

The foregoing second embodiment is equivalent to the priority level conversion procedure means of the first embodiment described in connection with FIGS. 1–9 collectively located on a single computer, and therefore has an advantage that the priority level correspondence table can be extremely easily managed, in addition to the effects given by the first embodiment. The configuration of the second embodiment is suitable to a concept that a high-performance and highly reliable computer is provided in a distributed computing system for managing the whole system, so that the procedure means related to the priority level management are located collectively on this computer.

Figure 11:
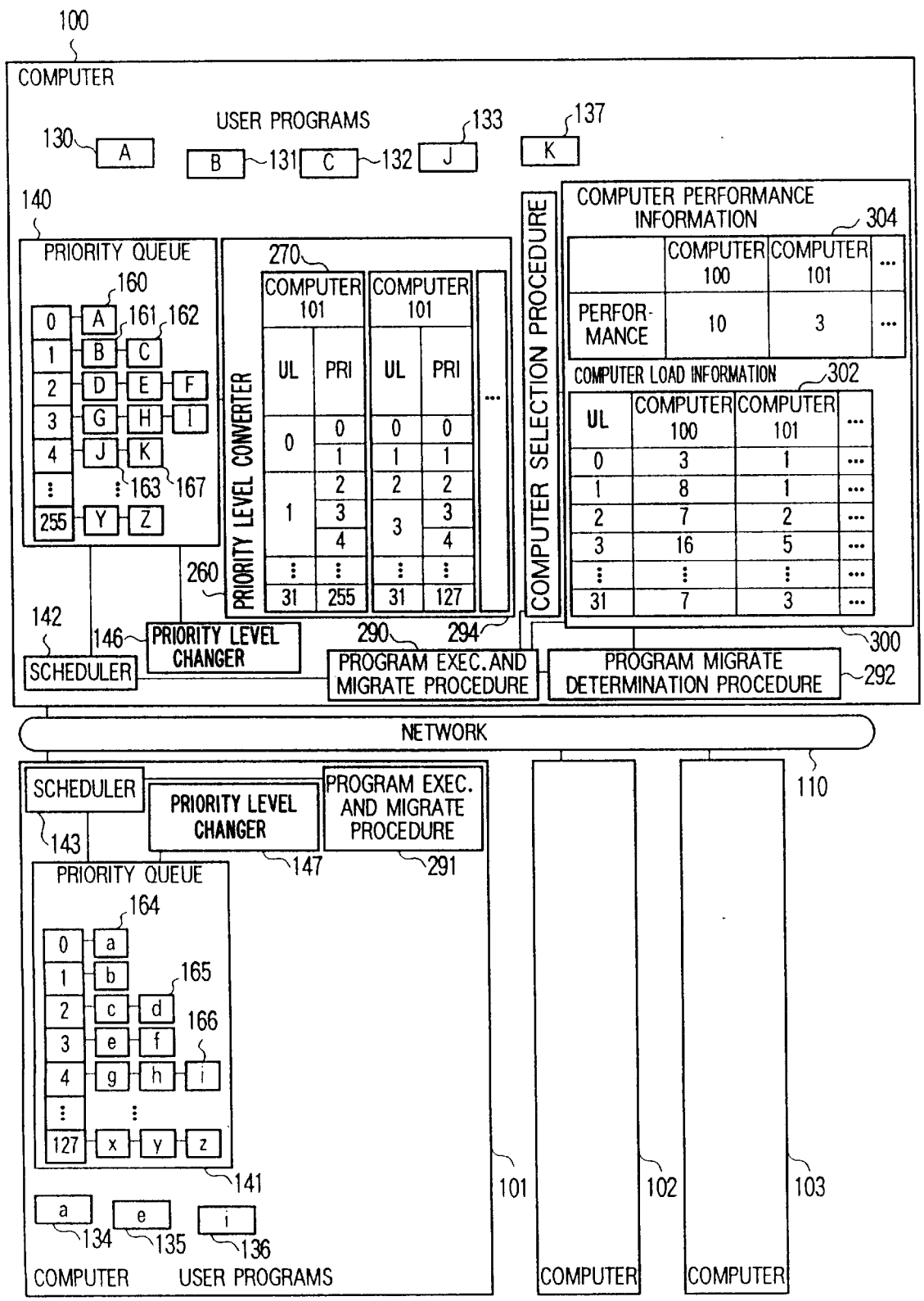
FIG. 11 shows the configuration of a third embodiment of the present invention.

A third embodiment of the present invention will be next described. In a distributed computing system, the distribution of the same amount of programs to respective computers to charge the same load on them is also useful in ensuring the real-time characteristics. However, even if an equal number of programs are distributed to all available computers, it cannot be said that computer resources are efficiently utilized when urgent programs concentrate on one computer and trivial programs concentrate on another computer as a result of the load distribution. Also, concentration of urgent programs on one computer will result in a delay in processing on the computer thus failing to ensure the real-time characteristics. The present invention, however, can accomplish load distribution in view of the importance of each program by the use of the appropriated urgency level. FIG. 11 shows the configuration of a distributed computing system according to a third embodiment for performing such load distribution. Elements 100–103, 110, 130–136, 140–143, 146, 147, and 160–166 in FIG. 11 are identical to the elements designated the same reference numerals in FIG. 1, while a priority level conversion procedure means 260 and a priority level correspondence table 270 are identical to those in FIG. 10. The operations of these elements in FIG. 11 are also similar to those of their counterparts in FIGS. 1 and 10. A user program 137 as well as user programs 130–136 are resident on a main storage unit of a computer 101, so that the user program 137 is managed by a program structure 167 in a priority queue 140.

Program execution and migrate procedure means 290, 291, which serve to initiate a program and migrate a program from the associated computer to another, are normally provided as functions of the operating systems of the respective computers. The initiation of a program involves generating a program structure for the program to be newly executed, registering the program structure in priority queue 140 or 141, and thus bringing the program in an executable condition. The migration or transmission, of a program involves forwarding a program in an executable condition to a computer to another computer, and bringing the forwarded program in an executable condition to the destination computer. This function is also called "process forward" which is often provided as a function of a distributed operating system.

A computer information area 300 is composed of a computer load information table 302 and a computer performance information table 304. The computer load information table 302 stores loads on respective computers, i.e., numbers of programs to be executed by the respective computers for every urgency level. For example, it can be seen from FIG. 11 that a current load on the computer 100 includes three programs with urgency level 0, eight programs with urgency level 1, seven programs with urgency level 2, and so on, while a current load on the computer 101 includes one program with urgency level 0, one program with urgency level 1, two programs with urgency level 2, and so on. The computer performance information table 304 stores the performances of the respective computers. In this embodiment, the performance is represented by a numerical value, wherein 10 MIPS corresponds to one, by way of example. The performance of the computer 100 is ten, and the performance of the computer 101 is three in accordance with this evaluation. The program execution and migrate procedure means 290, 291, after initiating or moving any program, reflect changes possibly caused by their operations to the computer load information table 302. This permits the computer load information table 302 to correctly indicate a load condition of the whole distributed computing system at that time.

A program migrate determination procedure means 292 determines from the computer load information table 302 in the computer information area 300 whether the load is equally distributed to the respective computers in accordance with their performances. If the load is not equally distributed, the means 292 determines to migrate, or transmit, a program so as to achieve the equal distribution of the load. It is assumed in this embodiment that the program migrate determination procedure means 292 is periodically initiated at regular intervals. A computer selection procedure means 294 determines which of computers is assigned to execute a newly requested program, and which computer is selected to be the destination for a program to be migrated, with reference to the computer load information table 302 and the computer performance information table 304 in the computer information area 300.

The operation of this embodiment will be described with reference to FIGS. 11–15. First, the operation performed when a program is newly initiated is explained. When the user inputs a command for specifying a file name of an executable program and its urgency level, the operating system analyzes the command and requests the program execution and migrate procedure means 290 or 291 in the operating system to initiate the program, whereby the initiation of the program is enabled. Explained herein is the case where a command to initiate a program with urgency level 1 is input to the computer 100, and the program execution and migrate procedure means 290 responsively performs the operation associated with the initiation of the program.

Figure 12:
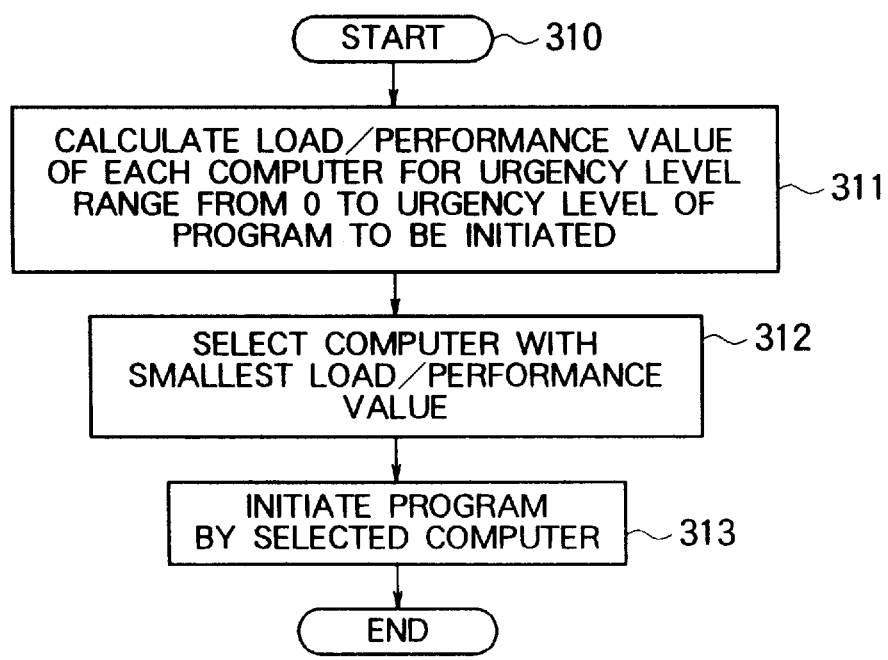
FIG. 12 is a flow chart showing a processing flow for initiating a program in the third embodiment.

A processing flow 310 for initiating a program will be explained with reference to the flow chart of FIG. 12. First, the program execution and migrate procedure means 290 requests the computer selection procedure means 294 to calculate a load/performance value in a range of the urgency level from 0 to the value set to the program to be initiated for all the computers in the distributed computing system (step 311). The load/performance value is calculated by dividing a load amount of a computer by the performance of the same. In this embodiment, the number of executable programs registered in the priority queue in a computer is utilized as a load amount of the computer. The calculation is performed by reading stored values in the computer load information table 302 and the computer performance information table 304 in the computer information area 300. FIG. 13 shows load information, load amounts and the load/performance values for the respective computers placed in the state illustrated in FIG. 11. The computer load information table 302 indicates the number of executable programs with each urgency level. A load amount table 306 indicates the number of executable programs included in each range from urgency level 0 to a particular urgency level (1, 2, 3, . . . , 31), and the load/performance value table 308 stores load/performance values derived by dividing the load amounts by the respective computer performance evaluations. Since the discussion is now in progress for when a program to be newly initiated is of urgency level 1, the load/performance value for urgency level range 0–1 is calculated to be 1.10 for the computer 100 and 0.67 for the computer 101.

Turning back to FIG. 12, the computer selection procedure means 294 next selects the computer having the smallest load/performance value as a computer which is assigned to execute the program to be initiated (step 312). Although the load/performance values for computers designated 102 and subsequent reference numerals are omitted in FIG. 13, assuming that the load/performance value for the computer 101 equal to 0.67 is the smallest, the computer 101 is selected. Finally, the program execution and migrate procedure means 290 performs an operation for commanding the selected computer to initiate the program (step 313). This operation is done such that the program execution and migrate procedure means of the computer which has started the program initiation requests the program execution and migrate procedure means of the selected computer to bring the program into an executable condition. In this example, the program execution and migrate procedure means 291 of the computer 100 requests, through communication, the program execution and migrate procedure means 291 in the computer 101 to bring the program into an executable condition.

Next, explanation will be given of the operation for moving an executable program. In this embodiment, the program migrate determination procedure means 292 is periodically initiated to check whether the load is equally distributed to the respective computers in accordance with their performances. If the distribution is not equally made, the program migrate determination procedure means 292 determines to migrate, or transmit, a program so as to bring about the equal distribution of the load, and then requests the program execution and migrate, or transmit, procedure means 290 to migrate a program. The program execution and migrate procedure means 290, in turn, requests the computer selection procedure means 294 to select a destination computer, and performs the operation associated with the migrate of a program in cooperation with the program execution and migrate procedure means of the selected destination computer. In this embodiment, the above-mentioned load/performance value is utilized for determining whether loads on the respective computers are equally distributed in accordance with their performances.

Figure 14:
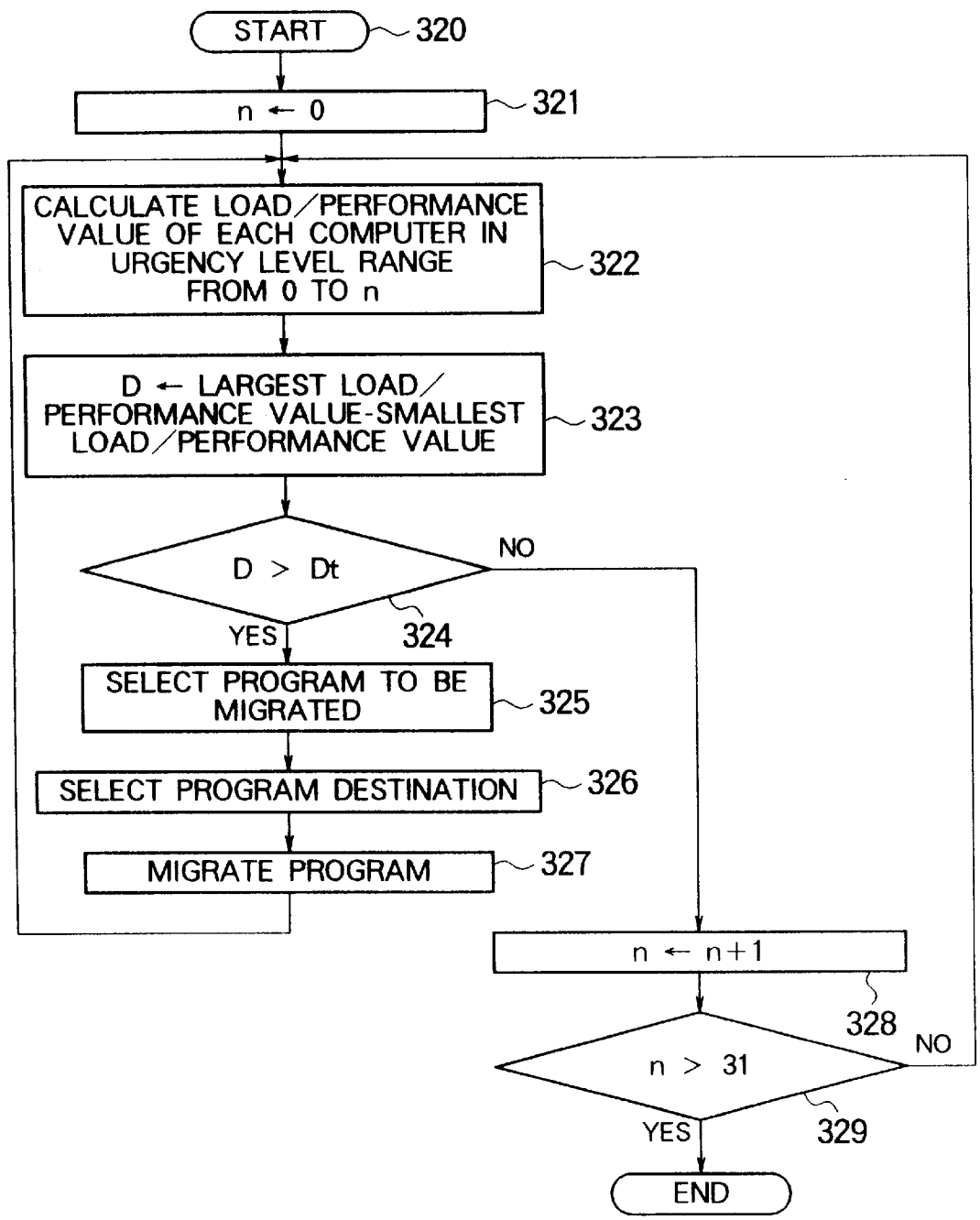
FIG. 14 is a flow chart representing a processing flow for moving a program.

A processing flow 320 for moving a program will be explained with reference to a flow chart of FIG. 14. First, the program migrate determination procedure means 292 substitutes zero into a variable n representative of an urgency level range (step 321). Then, the load/performance values in the range of urgency levels 0–n are calculated for the respective computers (step 322). As described above, the load/performance values calculated for the state shown in FIG. 11 are as shown in the load/performance values in the table 308 in FIG. 11. Next, the difference D between the largest load/performance value and the smallest load/performance value of all the computers is calculated within the specified urgency level range (processing 323). Although the load/performance values for the computers designated 102 and subsequent reference numerals are omitted in FIG. 13, assuming that the load/performance value for the computer 101 equal to 0.33 is the largest and the load/performance value for the computer 100 equal to 0.30 is the smallest when n is zero, the difference D is calculated to be 0.03. Then, it is determined whether this difference value D exceeds a threshold Dt (step 324). Assume in this embodiment that the threshold Dt is set to 0.3, for example. If the difference value D exceeds the threshold Dt, the flow proceeds to step 325, and otherwise to step 328. In this example, since the difference D does not exceed the threshold Dt when n is zero, the flow proceeds to step 328, where n is incremented by one. Next, it is determined whether n exceeds 31 (step 329). The flow is terminated, if n exceeds 31, or jumps back to step 322 if not.

Since n is now set to one, the flow returns to step 322, where the load/performance values are calculated for the respective computers, and the difference value D is next calculated at step 323. Although the load/performance values for the computers designated 102 and subsequent reference numerals are omitted in FIG. 13, assuming that the load/performance value for the computer 100 equal to 1.10 is the largest and the load/performance value for the computer 101 equal to 0.67 is the smallest when n is one, the difference D is calculated to be 0.43. Therefore, the difference D exceeds the threshold Dt when n is one. It is determined that the load is not equally distributed when the difference D exceeds the threshold Dt, so that a program to be migrated is determined (step 325). In this embodiment, the program to be executed last, i.e., positioned at the last of the priority queue is selected from executable programs corresponding to urgency level n in the computer having the largest load/performance value. As shown in FIG. 11, since the priority level range corresponding to urgency level 1 of the computer 100 is 2–4, and the program to be executed last is a program K (program structure 167), this program K is selected to be migrated.

Once the program to be migrated is determined, the program migrate determination procedure means 292 requests the program execution and migrate procedure means of the computer which contains the program to be migrated, to perform the operation for moving the selected program. In this example, the program execution and migrate procedure means 290 of the computer 100 performs the program migrate operation. First, the program execution and migrate procedure means 290 requests the computer selection procedure means 294 to select a destination computer to which the program is to be migrated (step 326 in FIG. 14). A computer selected as the destination in this embodiment is the computer with the smallest load/performance value. Therefore, the computer 101 having the smallest load/performance value when n is one is selected as the destination of the program.

Once the destination is determined, the program execution and migrate procedure means executes the program migrate operation (step 327). In this example, the program execution and migrate procedure means 290 of the computer 100 executes the program migrate operation in cooperation with the program execution and migrate procedure means 291 of the computer 101 which is the destination of the program K. Normally, the program execution and migrate procedure means is provided by the operating system. For moving a program, if the destination computer 101 does not have an executable file for the program to be migrated, the following operation is required to make the program executable. An executable file is forwarded from the computer 100 to the computer 101, a program structure of the migrated program K in the computer 100 is remigrated, or retransmitted, from the priority queue, and a program structure is created and added to the priority queue in the destination computer 101. After the program has been migrated, the computer load condition changed thereby is reflected to the computer load information table 302. In this example, the computer load information table 302 is modified, wherein the number of executable programs with urgency level 1 is seven for the computer 100 and two for the computer 101, as shown in FIG. 15.

After the program has been migrated as described above, the flow returns to step 322 to again calculate the load/performance values for the respective computers. In this case, calculated load amounts and load/performance values are changed as shown in tables 306, 308 in FIG. 15, respectively. Although calculated values for the computers designated 102 and subsequent reference numerals are omitted in FIG. 15, if the difference value D still exceeds the threshold Dt when n is one, the program migrate operation is repeated as described above. If the difference value D is equal to or less than the threshold Dt, the flow proceeds to step 328.

By repeating the foregoing operations until n exceeds 31 (the lowest urgency rank), a number of programs are migrated to accomplish the equal distribution of the load for all urgency levels, i.e., for equally distributing the load to all computers in accordance with their performances.

While the foregoing program migrate is such one that is initiated by the program migrate determination procedure means for the load distribution, the program migration, or transmission may also be performed by a command input by the user. In this case, an urgency level for a program to be migrated is set to n, and steps 326, 327 in FIG. 14 are executed, whereby the program can be migrated to the most lightly loaded computer.

Thus, the distributed computing system according to the third embodiment of the present invention has been described. This embodiment is advantageous in that user programs can be equally assigned to all the computers in accordance with their performances so as to equally distribute the load in the whole distributed computing system, so that the computer resources can be effectively utilized. Since the system of this embodiment evaluates the equal distribution of the load in consideration of both load amounts and performances of the respective computers, the load distribution can be fairly evaluated even if the performance of any computer varies.

Also, according to this embodiment, user programs can be uniformly assigned to the computers in accordance with their respective performances in each of the urgency levels of the programs, so that the real-time processing can be maintained with the uniform urgency in the whole distributed computing system. Particularly, since the load distribution is performed in consideration of the urgency level of each program, it is possible to prevent urgency requiring programs from concentrating on one computer, thus ensuring more strict real-time characteristics.

Further, according to this embodiment, the management of load in the whole distributed computing system is carried out by a single computer in a concentrated manner, so that the determinations of a program to be initiated, a destination for a program to be migrated, and so on can be effectively made without communicating to other computers.

Figure 16:
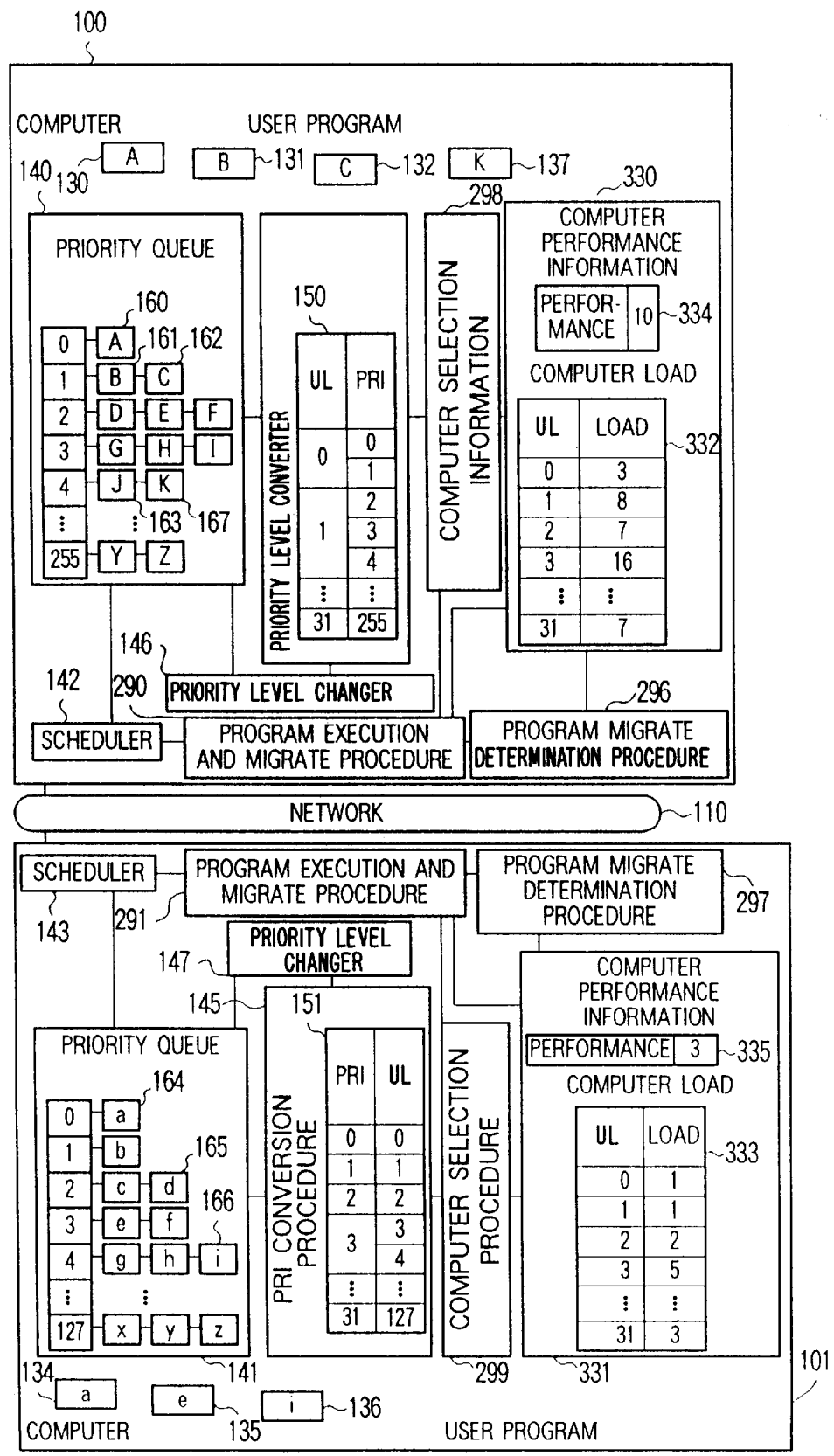
FIG. 16 is a diagram showing the configuration of a fourth embodiment of the present invention.

A fourth embodiment of the present invention will be next described with reference to FIG. 16. This embodiment differs from the third embodiment in that information on the performance and load of each computer is reserved in the computer itself. FIG. 16 shows the configuration of a distributed computing system according to this embodiment.

Elements 100, 101, 110, 130–136, 140–147, 150, 151, and 160–166 in FIG. 16 are identical to the elements designated the same reference numerals in FIG. 1, and the corresponding elements perform similar operations. Computers 102, 103 and details within the computers are omitted in FIG. 16. Further, elements 137, 167, 290, and 291 in FIG. 16 are identical to the elements designated the same reference numerals in FIG. 11, and the corresponding elements perform similar operations.

Computer information areas 330, 331 include information load information tables 332, 333 and computer performance information tables 334, 335, respectively. Program migrate determination procedure means 296, 297 determine, through mutual communications between the computers, whether loads on the respective computers are equally distributed in accordance with their performances. If a load on a computer containing the program migrate determination procedure means is larger as compared with loads on other computers, the program migrate determination procedure means determines to migrate a program in the associated computer so as to bring about the equal load distribution. Specifically, the program migrate determination procedure means 296, 297 execute this operation with reference to the computer load information tables 332, 333 in the computer information areas 330, 331, respectively. When a program to be executed is newly requested, computer selection procedure means 298, 299 determine, through mutual communications between the computers, which computer is assigned to execute the program. Also, when a program is to be migrated from one computer to another, the computer selection procedure means 298, 299 determine, also through mutual communications between the computers, to which computer the program is to be migrated. The computer selection procedure means 298, 299 make these determinations with reference to the computer load information tables 332, 333 and the computer performance information tables 334, 335 in the computer information areas 330, 331, respectively.

In this embodiment, both the operation for newly initiating a program and the operation for moving a program are basically similar to those of the third embodiment described in connection with FIGS. 11–15. However, this embodiment differs from the third embodiment in the following manner. In the third embodiment, the load/performance values for all of the computers in the system are calculated by the program migrate determination procedure means 292 or the computer selection procedure means 294 on the single computer 100. In this embodiment, on the other hand, the load/performance values for the respective computers 100, 101 are calculated by the program migrate determination procedure means 296, 297 or the computer selection procedure means 298, 299 on the respective computers 100, 101, and a computer selection procedure means on a computer which initiates a program or a program migrate determination procedure means on a computer which migrates a program, collects the calculated load/performance values for determining a program to be initiated or a destination to which a program is migrated with reference to the collected load/performance values.

In addition to the advantages of the equal load distribution and ensured real-time characteristics shown in the third embodiment, this embodiment has the following advantages. First, since the load management is distributively performed in each computer so that when a computer initiates or migrates a program, the computer load information has to be changed only in that computer and in a computer on which the initiated program is resident or a computer to which the program is migrated, thus efficiently reflecting state changes to the computer load information.

Additionally, since the computer information table need not be modified even when a computer in the distributed computing system is remigrated or a computer is newly added thereto, the extendibility of the system is improved.

There are several alternatives to the foregoing third and fourth embodiments. First, while in the third and fourth embodiments, the load information indicative of the number of executable programs is stored and evaluated with the urgency used as a criterion for initiating or moving a program, the local priority level in each computer may be stored and evaluated as a criterion in place of the urgency. With this alternative, each computer has to only consider the priority level for processing, so that the conversion between the priority level and the urgency level can be omitted to accomplish efficient management of the system. Also, in this case, the priority level conversion procedure means 260 which manages the correspondence relationship between the urgency level and the priority level or the priority level conversion procedure means 144, 145 may be provided with a function of modifying the correspondence relationship in accordance with loads on the respective computers, as shown in the first embodiment in connection with FIGS. 6–9, whereby the urgency or priority level can be controlled in accordance with the loads on the respective computers.

While in the third and fourth embodiments, the amount of load on a computer is represented by the number of executable programs, the load amount may also be represented by the sum of processing amounts or predicted processing time of executable programs. The latter way is advantageous in that loads on respective computers are more accurately evaluated so that fully equal load distribution can be accomplished.

While the distributed computing system according to the third or fourth embodiment determines a computer on which a program is initiated or to which a program is migrated in consideration of both loads and performances of the respective computers, the determination may be made only in consideration of one of the two parameters. Particularly, in a distributed computing system including the same type of plural computers, only loads on the respective computers may be considered. In this way, the determination can be more easily made, thus improving the efficiency.

Furthermore, while the distributed computing system according to the third or fourth embodiment evaluates an amount of load on a computer based on the number of executable programs with the urgency level ranging from zero to an urgency level given to a program to be initiated or migrated, this evaluation may be made based on the number of executable programs with the same urgency level as that of a program to be initiated or migrated. This evaluation is advantageous in that the time required to calculate the load amount is reduced so that a more efficient operation can be accomplished.

Figure 17:
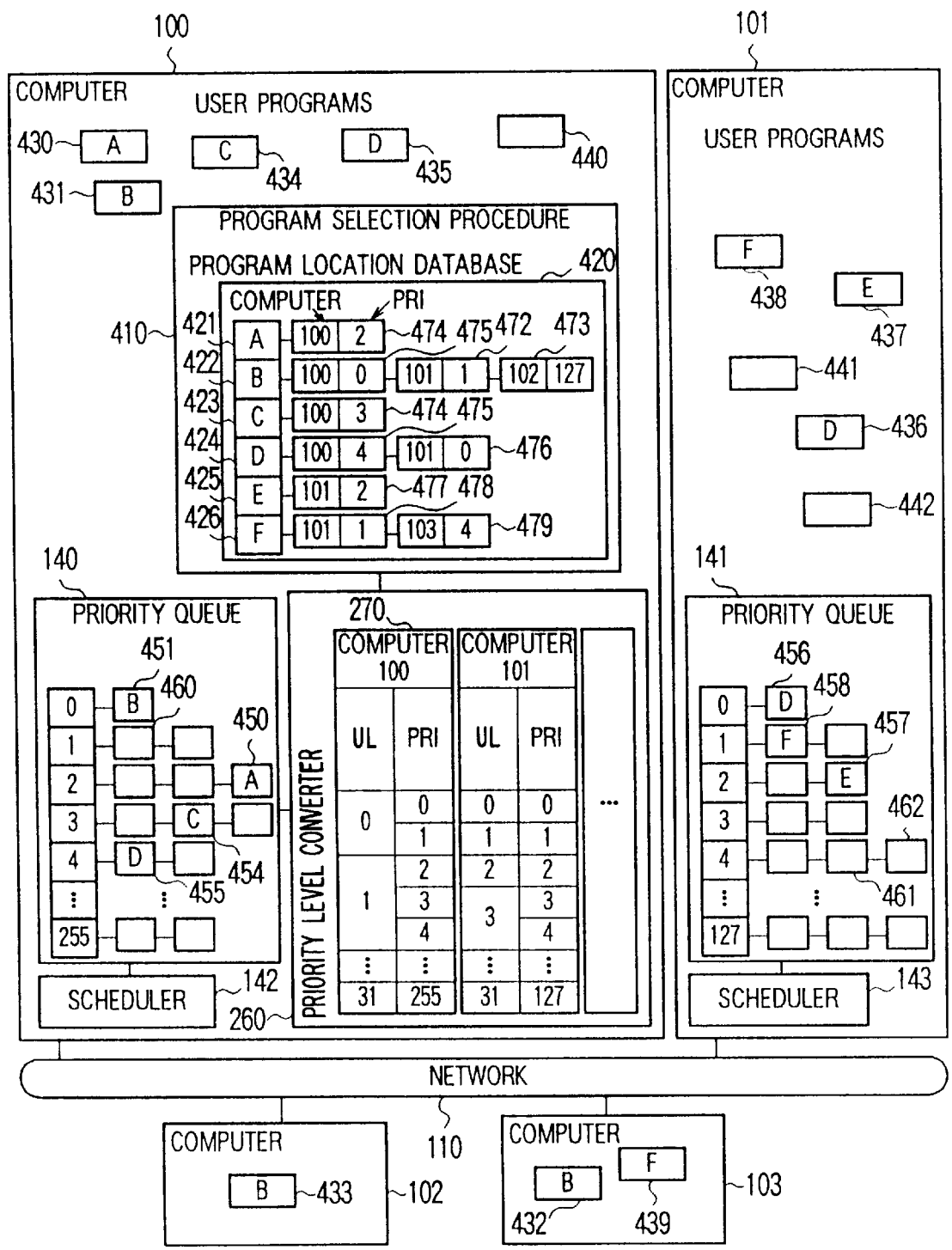
FIG. 17 is a diagram showing the configuration of a fifth embodiment of the present invention.

In the distributed computing system, processing requests may be distributed in such a manner that a plurality of programs involving the same operation are simultaneously executed on a plurality of computers. Conventionally, for distributing processing requests, an idle program (a program which is not executing any operation) is selected from a plurality of programs performing the same operation, and a processing request is issued to the selected program. However, if such a program selection method is implemented in a real-time distributed computing system, a program with a high priority level is not always selected, or it is indefinite whether the operation is completed at a speed desired by the requesting party. FIG. 17 shows a fifth embodiment of the present invention for selecting a program with a priority level desired by the requesting party from a plurality of the same programs and for having the selected program execute requested processing. This embodiment provides a system for simultaneously realizing ensured real-time characteristics for selecting a program operating at a desired speed, and desirable load distribution. This embodiment is implemented by the aforementioned priority level conversion procedure means 260 and a program selection procedure means 410 for determining a target program to which a processing request is issued using the conversion result from the priority level conversion procedure means 260.

In FIG. 17, elements 100–103, 110, and 140–143 are identical to the elements designated the same reference numerals in FIG. 1. Details regarding the hardware of computers 100, 101 are omitted. The priority level conversion procedure means 260 and priority level correspondence table 270 utilize the same procedure and data structure as those employed by their counterparts in FIG. 10. User programs 430–442 are resident on the computers 100, 101. Among them, the user programs 440–442 are not managed by the program selection procedure means 410. Programs free from the management of the program selection procedure means 410 include a unique program in the distributed computing system, a program which individually operates without receiving a processing request, and so on. Each user program is given a priority level and managed in queues for respective priority levels in priority queues 140, 141. Blocks 450, 451, 454–458, and 460–462 represent examples of program structures for the respective user programs and have information on the user programs 430, 431, 434–438, and 440–442, respectively. Program structures corresponding to the user programs 432, 433, 439 are omitted. In the present invention, a plurality of programs performing the same operation are simultaneously executed on a plurality of computers, and a processing requested program is determined in accordance with the urgency level of each program when a processing request is issued. It is assumed in FIG. 17 that the user programs 431–433 are programs performing the same operation (program group B); user programs 435, 436 (program group D) and user programs 438, 439 (program group F) are likewise programs performing the same operation, respectively.

Figure 18:
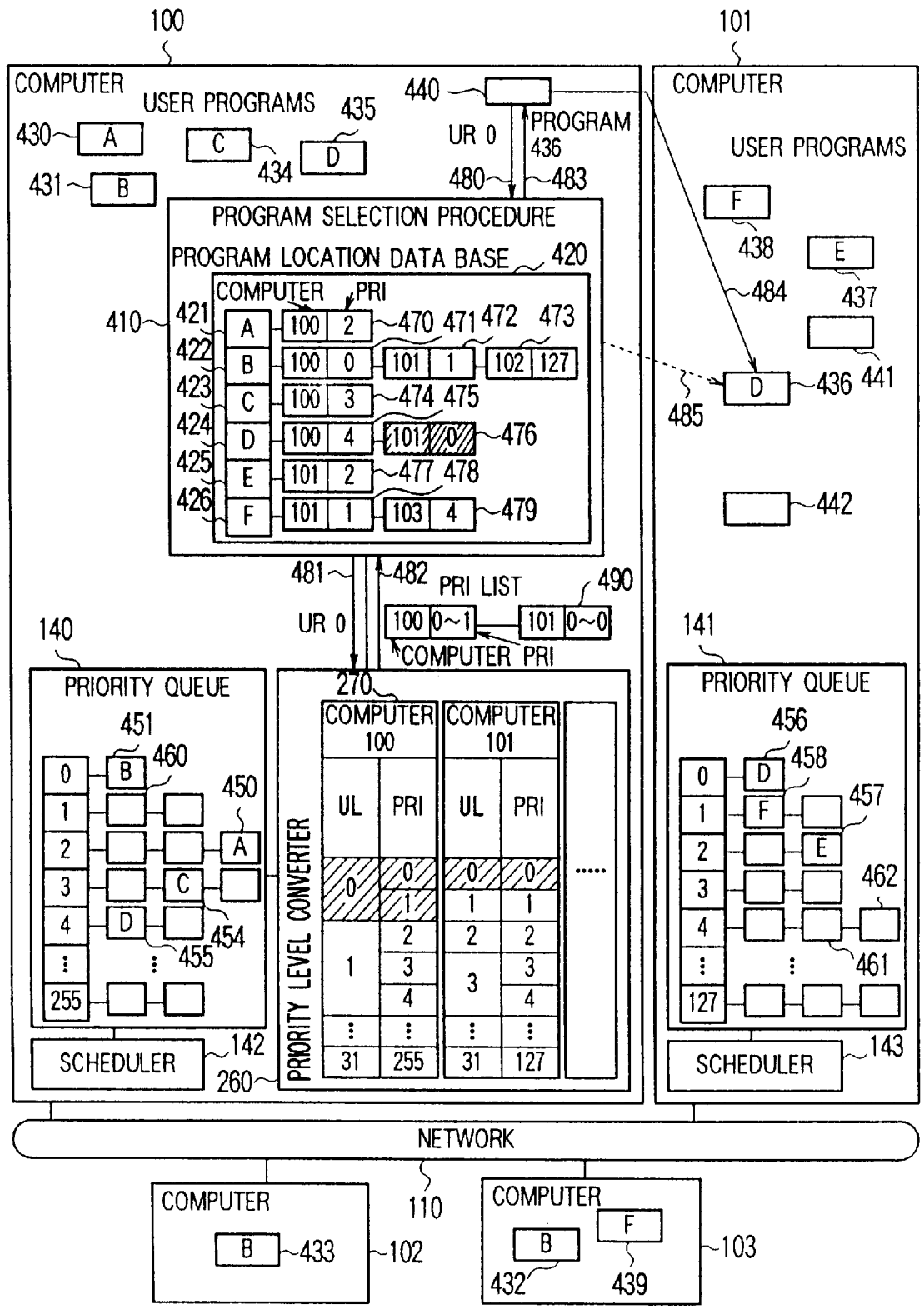
FIG. 18 is a flow chart representing a processing flow for selecting a program in the fifth embodiment of the present invention.

The program selection procedure means 410 manages the computers on which these programs are running and the priority levels of the programs in order to select a program having an optimal priority level. A program location database 420 is provided as a data structure for management which is utilized to select an optimal program. The program location database 420 manages program location information areas 470–479, each for storing the identifier of a computer, on which one of programs performing the same operation is running, and the priority level of the program. An alternative managing method which stores information such as a communication address of a program and so on in the program location information areas may be employed for facilitating a processing request. Among the program location information areas 470–479, those storing information on programs performing the same operation are collected and managed in the form of a program list as 421–426. For example, the program location information areas 471–473 store location information on programs performing the same operation (program group B), so that they are collectively stored as a program list 422. Incidentally, since the program groups A, C, E include only one program, respectively, these groups may be managed without their program lists in the location database 420. When the priority level of any program registered in the program selection procedure means 410 is changed in any computer, when a program is deleted from a certain computer, or when a program to be registered is newly initiated, the program selection procedure means 410 is informed of the identifier of a computer associated with such a program and the priority level of the program in order to modify the contents of the program location database 420, Next, explanation will be given of a method for selecting a processing request destination based on the priority level using the priority level conversion procedure means 260 and the program selection procedure means 410. FIG. 18 shows an exemplary flow of a program selection method. It is assumed in this embodiment that a user program 440 requests a program in the program group D (user program 435 or 436) specifying urgency level 0. First, the user program 440 inquires of the program selection procedure means 410 the location of the program in the program group D corresponding to urgency level 0 (communication 480). Since the program selection procedure means 410 recognizes a computer on which each program is running and the priority level of the program, but not the urgency level of the program, the specified urgency level 0 is passed to the priority level conversion procedure means 260 as it is (communication 481). As a result, a priority level list 490 corresponding to urgency level 0 is provided to the program selection procedure means 410 (communication 482). The contents of the priority level list show a range of the local priority level in each computer corresponding to the specified urgency level. In this embodiment, the program selection procedure means 410 is supplied with a priority level list which indicates that urgency level 0 corresponds to priority levels 0–1 in the computer 100 and to priority level 0 in the computer 101 through communication 482. The program selection procedure means 410 compares the contents of the program location database 420 with the contents of the priority level list 490 to determine a program to which a processing request is sent. In the example shown in FIG. 18, it is only program location information 476 (corresponding to the user program 436) which corresponds to the priority level specified by the priority level list 490 in the program list 424 for the program group D. The program selection procedure means 410 therefore determines that the user program 436 resident on the computer 101 is the destination to which the processing request is sent, and informs the user program 440 of this determination result (communication 483). The user program 440 issues a processing request to the user program 436 informed thereto through communication 483 (communication 484). Alternatively, it is also possible to employ a communication intervening method in which the program selection procedure means 410 transmits communication 480 from the user program 440 directly to the user program 436 (communication 485).

Figure 19:
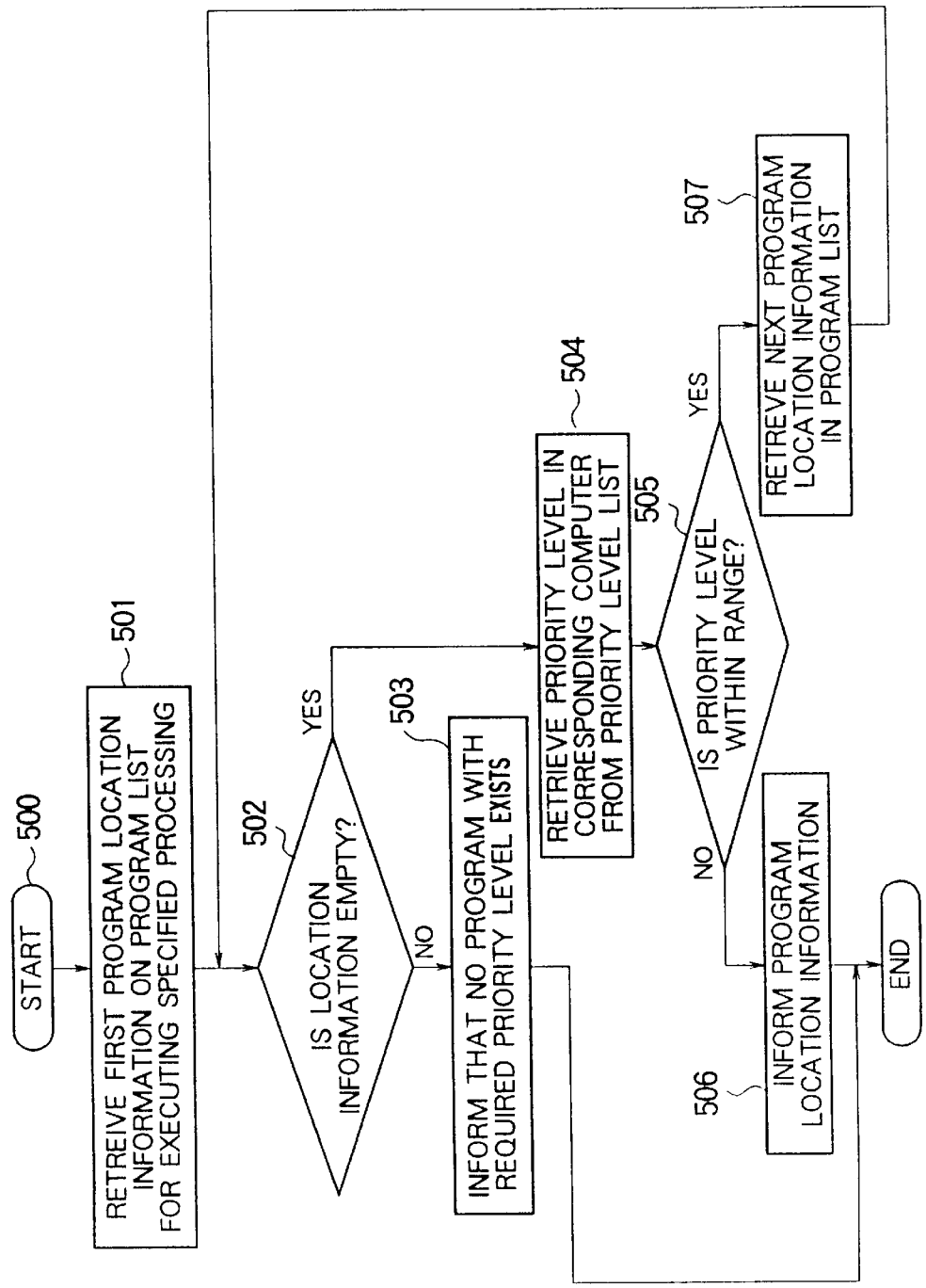
FIG. 19 is a flow chart representing a processing flow for finding a program with a specified priority level.

FIG. 19 shows an example of a processing flow 500 for the program selection procedure means 410 to compare the program lists 421–426 with the priority level list 490 to find a program which has a priority level conforming to the specified priority level range. First, the program selection procedure means 410 accesses the first program location information area indicated by a specified program list (step 501). If the program location information area is empty (if so determined at step 502), the program selection procedure means 410 recognizes that there is no program which has a priority level within the specified priority level range, and informs the processing requesting program of this fact (step 503). If the accessed program location information area is not empty, an entry coincident with the priority level of a computer stored in the program location information area is retrieved from the priority level list 490 (step 504). If the priority level stored in the program location information area is included in the priority level range retrieved at step 504 (if so determined at step 505), the program selection procedure means 410 informs the processing requesting program of a program which has a priority level within the priority level range (step 506). If it is determined at step 505 that the priority level of the program is out of the specified range, the program selection procedure means 410 accesses the next program location information area in the program list (step 507), and repeats the same operations from step 502. By employing the processing flow 500, in the example shown in FIG. 18, the first program location information in an area 475 of the program list 424 for the program group D is first compared with the priority level list 490, and then the second program location information in an area 476 is compared with the priority level list 490. Since the priority level stored in the program location information area 476 lies in the range specified by the priority level list 490, this is selected and informed to the processing requesting program.

With the fifth embodiment of the present invention, a plurality of programs with different priority levels performing the same operation can be distributively located on a plurality of computers in the distributed computing system, thus accomplishing the load distribution, i.e., distribution of processing requests in accordance with the urgency level thereof. Particularly, the effect of this embodiment is expected because even processing requests for the same contents of processing often differ from each other in the urgency depending on requesting programs.

Further, according to the fifth embodiment, by previously setting different priority levels to a plurality of programs performing the same operation, the same contents of processing can be requested with different urgency levels without using the priority level changing procedure means, thus ensuring the real-time characteristics in the same degree as the first embodiment.

Figure 20:
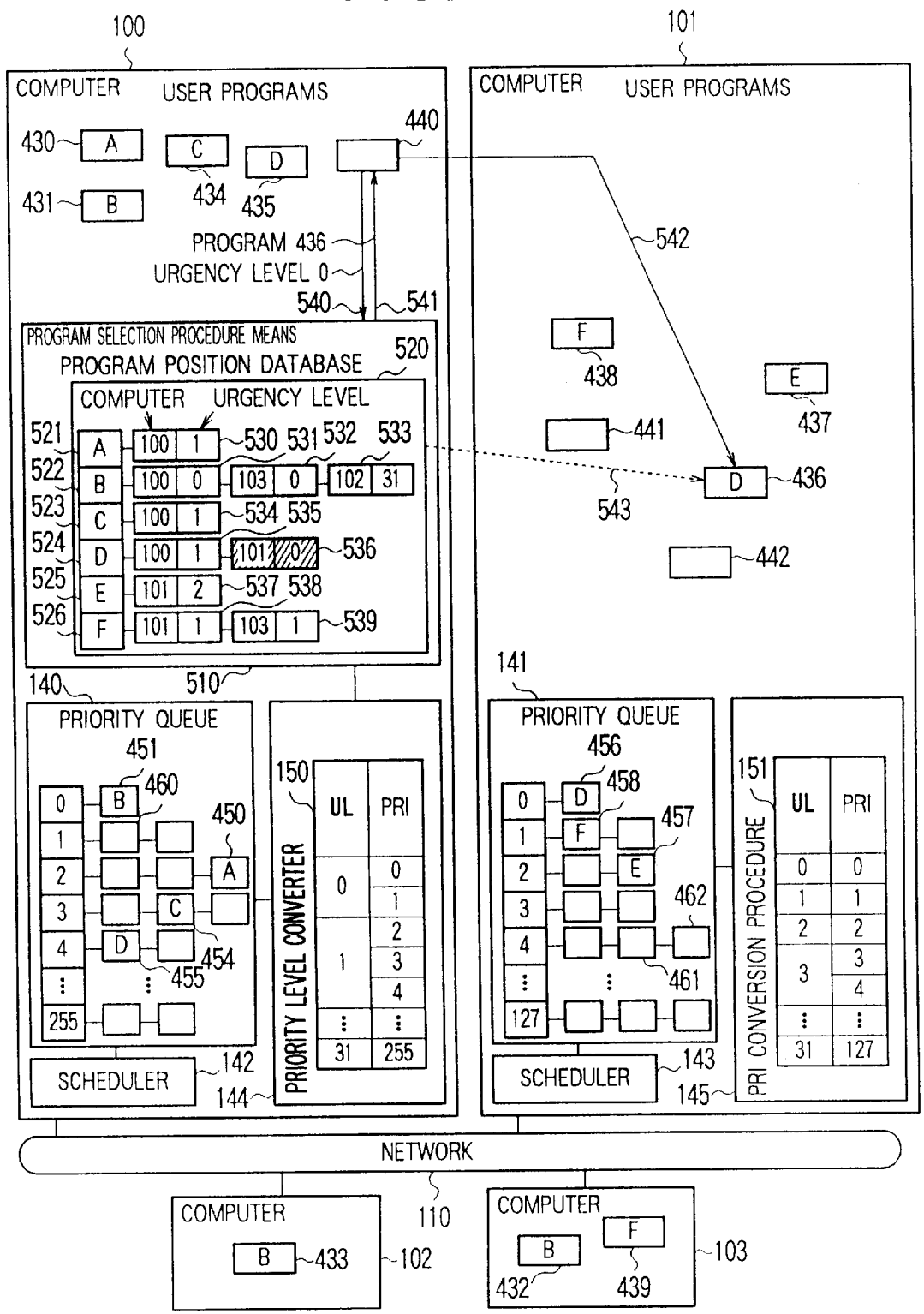
FIG. 20 is a diagram showing the configuration of a sixth embodiment of the present invention and a processing flow for selecting a program in the sixth embodiment.

FIG. 20 shows a sixth embodiment of the present invention which shows a distributed computing system including a combination of priority level conversion procedure means 144, 145 distributively located in each computer and a program selection procedure means 510 which stores the identifiers of computers on which programs performing the same operation are running and the urgency levels of the programs for determining a processing request destination. In FIG. 20, elements 100–103, 110, 140–145, 150, and 151 are identical to the elements designated the same reference numerals in FIG. 1. Details regarding the hardware of the computers are omitted. Also, user programs 430–442 and program structures 450–462 present the same contents as those in FIG. 17. Program structures corresponding to user programs 432, 433, 439 are omitted.

A program selection procedure means 510 manages computers on which the above-mentioned programs are running and the urgency levels of the programs, and determines a program having an optimal urgency level. A program location database 520 is provided as a data structure for management which is utilized to select an optimal program. The program location database 520 manages program location information areas 530–539 each for storing the identifiers of a computer, on which one of programs performing the same operation is running, and the urgency level of the program. Among the program location information areas 530–539, those storing information on programs performing the same operation are collected and managed in the form of program lists 421–426, respectively. While the program location information areas 470–479 in FIG. 17 each store the identifier of a computer on which a program is running and the priority level of the program, the program location information areas 530–539 in FIG. 20 each store the identifier of a computer on which a program is running and the urgency level of the program in place of the priority level. An alternative managing method which stores information such as a communication address of a program and so on in the program location information areas may be employed for facilitating a processing request. When the urgency level of any program registered in the program selection procedure means 510 is changed in any computer, when a program is deleted from an associated computer, or when a program to be registered is newly initiated, the program selection procedure means 510 is informed of the identifier of a computer on which a concerned program is running and the urgency level of the program in order to modify the contents of the program lists. Also, when the correspondence relationship between the priority level and the urgency level changes on any computer, the priority level conversion procedure means 144, 145 inform the program selection procedure means 510 of changes in the corresponding relationship to reflect such changes to the urgency levels stored in the program location information areas 520–529.

FIG. 20 also illustrates a processing flow for selecting a processing request destination based on the urgency using the priority level conversion procedure means 144, 145 and the program selection procedure means 510. It is assumed in this embodiment that a user program 440 issues a processing request to a program in the program group D (user program 435 or 436), as in the case of FIG. 18. First, the user program 440 inquires of the program selection procedure means 510 the location of a program in the program group D corresponding to urgency level 0 (communication 540). Since the program selection procedure means 510 recognizes a computer on which each program is running and the urgency level of the program, it can find out, at the time it is inquired, the location of a program which satisfies the conditions that a program belongs to the program group D and has urgency level 0. In this embodiment, it is only program location information 536 (corresponding to the user program 436) which satisfies the above conditions within the two programs belonging to the program group D. The program selection procedure means 410 therefore determines that the user program 436 resident on the computer 101 is the destination to which the processing request is sent, and informs the user program 440 of this determination result (communication 541). The user program 440 issues a processing request to the user program 436 informed thereto through communication 541 (communication 542). Alternatively, it is also possible to employ a communication intervening method in which the program selection procedure means 510 transmits communication 540 from the user program 440 directly to the user program 436 (communication 543).

In the distributed computing system according to the sixth embodiment of the present invention, in addition to the effects of the fifth embodiment, the program selection can be completed faster than the fifth embodiment because the program selection procedure means 510 does not command the priority level conversion procedure means 144, 145 to convert an urgency level to a corresponding priority level. However, since the program location information areas 530–539 each store the urgency level of an associated program, a change in the correspondence relationship between the urgency level and the priority level due to a varied load on a certain computer may require the urgency levels in the respective program location information areas to be changed. For this reason, the system of the fifth embodiment is advantageous if loads on the computers largely fluctuate with time.

Other than the systems shown in the fifth and sixth embodiments, it is also possible to build a distributed computing system including a combination of the program selection procedure means 510 and the priority level conversion procedure means 260 or a combination of the program selection procedure means 410 and the priority level conversion procedure means 144, 145. It should be noted that since the systems shown in FIGS. 17, 18, 20 do not suppose programs that are executed with their priority levels having been changed, the priority level changing procedure means 146, 147 are not described. However, these systems may be modified to additionally include these procedure means such that the priority levels of programs can be changed.

Figure 21:
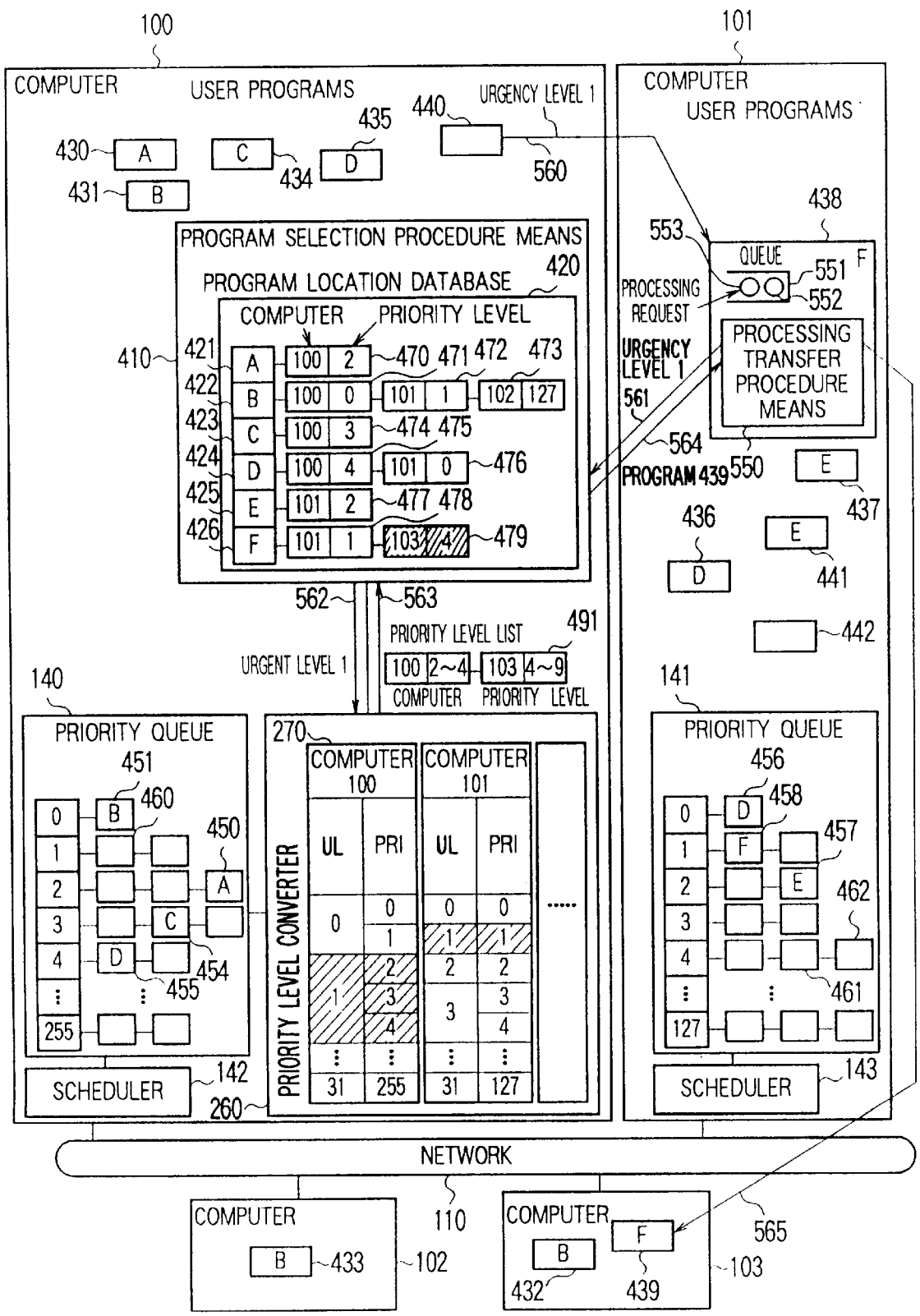
FIG. 21 is a diagram showing the configuration of a seventh embodiment of the present invention and a processing flow for forwarding a processing request in the seventh embodiment.

In a distributed computing system having a plurality of programs which perform the same operation, when a processing request is issued to a program currently executing processing, the newly requested processing may be forwarded to one of the plurality of programs which perform the same operation, whereby the respective programs can be efficiently utilized, and the newly requested processing is promptly executed, resulting in an improvement in the real-time characteristics. A seventh embodiment for accomplishing this processing request forward will be next described with reference to FIG. 21. FIG. 21 shows a distributed computing system which has a function of forwarding a new processing request issued to a program currently in execution to another program which performs the same operation as the originally requested program. In FIG. 21, elements 100–103, 110 and 140–143 are identical to the elements designated the same reference numerals in FIG. 1. Details on hardware of computers 100, 101 are omitted. A priority level conversion procedure means 260 and a priority level correspondence table 270 utilize the same procedure and data structure as those employed by their counterparts in FIG. 10. Elements 410, 420–426, 430–442, and 450–462 show the same contents as those in FIG. 17. Also, program structures corresponding to user programs 432, 433, and 439 are omitted.

In this embodiment, each program is provided internally with a processing forward procedure means 550 and a queue 551 to permit a processing request to be forwarded to another program. The queue 551 is a buffer for storing processing requests issued to an associated program in order. The processing forward procedure means 550 monitors processing requests received into the queue 551 while the associated program is executing requested processing. This means 550 enables processing requests to be distributed between programs to equally distribute the load to all of the computers in the system. A flow of communications 560–565 represents how a processing request is forwarded to another program by the processing forward procedure means. In this embodiment, shown as an example is a process in which a user program 440 issues a processing request with urgency level 1 to a user program 438 (a program in a program group F) (communication 560), and this processing request is forwarded to another program. When processing requests reach the user program 438 which is executing processing, these processing requests are stored into the queue 551. Blocks 552, 553 represent the incoming processing requests. Upon receiving a new processing request 553, the processing forward procedure means 550 inquires of the program selection processing means 410 whether another program having urgency level 1, which is required to accept the processing request 553, exists in the program group F (communication 561). The program selection processing means 410 informs the priority level conversion procedure means 260 of urgency level 1 (communication 562), and receives a priority level list 491 which indicates a range of priority levels corresponding to urgency level 1 (communication 563). In FIG. 21, data corresponding to the computers 101, 102 are omitted in the priority level list 491. By comparing the priority level list 491 with a program list 426 for the program group F, a selection is made for program location information of a program which satisfies the required urgency level. In this event, the program selection procedure means 410 avoids selecting the program location information representing the user program 438 itself. In the example shown in FIG. 21, since program location information 479 (corresponding to a user program 439) is included in the range of priority levels indicated in the priority level list 491, the location of the user program 439 corresponding to the location information is indicated to the processing forward procedure means 550 (communication 564). The processing forward procedure means 550, upon receiving this location information, requests the user program 439 to execute the newly incoming processing 553 (communication 565).

In the seventh embodiment of the present invention, the processing forward procedure means 550 and the queue 551 are placed in each program. Alternatively, they may be disposed external to the program so as to serve as a procedure and a data structure which can be commonly utilized by a plurality of programs. Also, this embodiment is composed of the distributed computing system of FIG. 17 including a combination of the program selection procedure means 410 and the priority level conversion procedure means 260 and the additional processing forward procedure means 550. In addition to this configuration, the processing forward procedure means 550 may also be added to the distributed computing system of FIG. 20 which includes a combination of the program selection procedure means 510 and the priority level conversion procedure means 144, 145 for providing a similar function.

The distributed computing system of the seventh embodiment enables processing requests issued to individual programs to be forwarded to other programs having the same urgency level as the originally requested programs, so that processing requests can be distributed to a plurality of programs without concentrating a large number of processing requests on a particular program. Further, newly requested processing can be executed without waiting for the completion of processing currently being executed, thus further improving the real-time characteristics.

Alternative configurations are possible to the seventh embodiment. While the system of the seventh embodiment forwards processing newly requested to a program during the execution of other processing to another program, a program requested the execution of the new processing may be given a higher urgency level, instead of forwarding the newly requested processing, such that the program is made capable of promptly completing the processing in execution and the newly requested processing. Stated another way, this system gives a higher urgency level to a program which has received a plurality of processing requests in accordance with the number of requests such that desirable real-time characteristics are wholly ensured for the plurality of processing requests. It should be noted that for employing this system, the priority level changing procedure means such as 146, 147 need be disposed on each computer such that the priority level of each program can be changed.

(B) System Utilizing Processing Time Limit

The embodiments so far described in connection with FIGS. 1–21 involve the methods which introduce the urgency level, a concept common to the distributed computing system so as to uniformly manage local priority levels in the respective computers using the urgency. If the urgency level is converted to an absolute numeric value, a processing time limit may be utilized for the uniform management. The processing time limit, when employed, cannot be converted directly to a priority level. Various situations can be considered: for example, although the processing time limit is long, a large amount of processing must be executed; although the processing time limit is short, a small amount of processing only need be executed; and so on. Therefore, the priority level must be determined from the time limit and processing amount. FIG. 22 shows an eighth embodiment of a distributed computing system for uniformly managing the priority level using a set of time limit and processing amount.

In FIG. 22, elements 100, 101, 110, 130–136, 142, 143, 146, and 147 are identical to the elements designated the same reference numerals in FIG. 1. Details regarding the hardware of the computers 100, 101 as well as computers 102, 103 are all omitted. Blocks 570, 571 represent priority queues which constitute program queues prepared for respective priority levels in the respective computers 100, 101 in order to manage the execution order. The priority queue is composed of program structures, examples of which are shown as 590–596. The program structures 590–596 each include processing amount data 600 as part of the data structure. Each program structure is provided with data on a processing amount to be executed by an associated program, to support the conversion from a set including time limit and processing amount to the priority level. Values to be stored as the processing amount may include:

(1) the number of instructions to be executed in a program;
(2) a program size; and
(3) a processing amount of a program executed at the previous time (actual processing time of the program executed at the previous time/computer performance).

These values are all represented by the unit of 1000 instructions (per second) or the like. Practically, the most desirable of the three examples is (1) the number of instructions to be executed in a program, however, it is quite difficult to count the number of instructions. Therefore, a static size of a program and an amount of processing in the previous execution of the program are measured and stored as the processing amount data 600. For providing of good approximation to the number of instructions to be executed in a program, its program size is stored as an initial value of the processing amount data 600, and the data 600 is updated with a processing amount recorded each time the program is executed.

Priority level conversion procedure means 572, 573 are procedures for converting a set of time limit and processing amount to a local priority level in the associated computers 100, 101, respectively. In this embodiment, the priority level conversion procedure means 572, 573 include priority level correspondence tables 580, 581 which indicate the correspondence between a time limit per unit processing amount and a priority level (PRI). The time limit per unit processing amount can be calculated by normalizing the time limit given to a program by a processing amount of the program.

In this embodiment, the priority level correspondence table 580 indicates that the computer 100 can execute a program with priority level 0 in 0.017 milliseconds per the unit processing amount, and a program with priority level 225 in 22.77 milliseconds per unit processing amount. The priority level correspondence table 581, on the other hand, indicates that lower-performance computer 101 takes a longer time to execute the unit processing amount even with the same priority level. Due to the lower performance, for example, the computer 101 executes a program with priority level 0 in 0.034 milliseconds per the unit processing amount, which is longer than the time required by the computer 100 to execute the unit processing amount of a program with priority level 0. The contents of the priority level correspondence tables 580, 581 are modified in accordance with changes in load, such that the same time limit corresponds to a higher priority level for a more heavily loaded computer. The priority level conversion procedure means 572, 573 employ the priority level correspondence tables 580, 581 to convert a set including time limit and processing amount to a corresponding priority level, and vice versa.

The priority level correspondence tables 580, 581 may be implemented by the array structure shown in FIG. 22 without any modification. The structure may be described in C-language as shown by 610 in FIG. 23. With the array created by the statement 610, although a conversion from a priority level to a corresponding time limit per unit processing amount can be easily made, techniques such as binary search are required for a conversion from a time limit to a corresponding priority level since the time limit is a continuous amount (expressed in floating point number). The binary search is described in "Information Processing Handbook" edited by the Institute of Information Processing Engineers and published by Ohm-sha, p. 58, and so on. In this embodiment, it is necessary to give a priority level p which satisfies the following condition to a time limit "time limit":

$$\text{to\_time}[p] <= \text{timelimit} < \text{to\_time}[p+1].$$

Therefore, an algorithm based on the binary search is modified to make a search in accordance with a procedure 620 shown in FIG. 24. The procedure 620 is described in C-language, and a conversion from a time limit to a corresponding priority level can be accomplished by calling the procedure 620 with the time limit per unit processing amount designated as an argument. Methods for the conversion between the time limit per unit processing amount and the priority level may be summarized as follows:
(1) Conversion from Priority Level to Time Limit
    timelimit←to_time[p]
(2) Conversion from Time Limit to Priority Level
    p←to_priority(timelimit).

A processing request may be rejected if a computer fails to satisfy the time limit even when executing with its highest priority.

In the examples shown in FIGS. 22–24, the priority level correspondence tables 580, 581 are utilized to convert a set of time limit and processing amount to a corresponding priority level, and vice versa. Alternatively, the tables may be replaced with equations, as is the case of utilizing the urgency (see FIG. 3).

Next, explanation will given of how to issue a processing request from a computer to another using the priority level conversion procedure means 572, 573 and the priority level changing procedure means 146, 147 shown in this embodiment for specifying a time limit. Similarly to the communications for specifying the urgency, a real-time distributed computing system can be more easily built by communications with a specified processing time limit. In this embodiment, therefore, a requesting program is permitted to specify a time limit upon issuing a processing request. FIG. 25 shows a time limit specifying method which is described in C-language according to the present invention. A statement 630 represents a method for specifying a time limit in the first argument in a processing request, and a statement 631 represents a method for specifying a time limit in the last argument in a processing request. While a set including time limit and processing amount must be determined in order to define a corresponding priority level as described above, since the processing amount can be determined by referring to the processing amount data 600 in the program structure in a requested computer, the time limit only has to be specified upon issuing a processing request.

Figure 26:
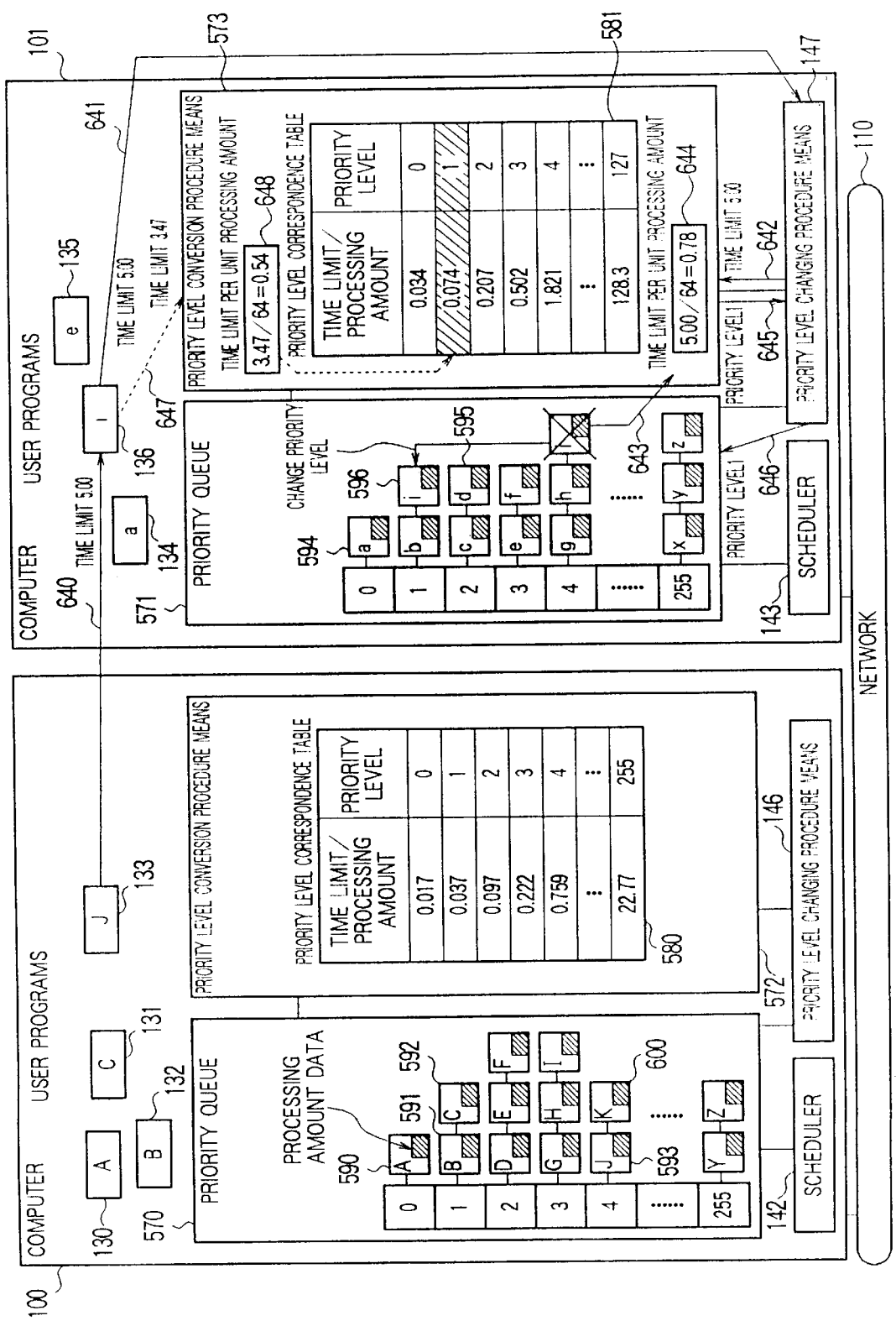
FIG. 26 is a diagram showing a processing flow for performing communications for specifying a time limit in the eighth embodiment.

FIG. 26 schematically shows a processing flow for issuing a processing request using the above-mentioned time limit specifying method. Elements 100, 101, 110, 130–136, 142, 143, 146, and 147 in FIG. 26 are identical to the elements designated the same reference numerals in FIG. 1. Description of computers, 102, 103 and details within the computers are omitted. Also, elements 570–573, 580, 581, 590–596, 600 in FIG. 26 are identical to the elements designated by the same reference numerals in FIG. 22. In this embodiment, the flow in FIG. 26 represents that a user program 133 issues a processing request to a user program 136. If the user program 133 desires to impose a certain time limit to the processing to be executed by the user program 136, the user program 136 makes a time limit specifying communication 630 or 631 (communication 640). It is assumed in FIG. 26 that a time limit of five milliseconds is specified. The computer 101, upon receiving the communication for specifying the time limit, must convert the time limit to a local priority level in the computer 101 and execute the user program in conformity with the priority level resulting from the conversion. The user program 136 requests a priority level changing procedure means 147 to change the specified time limit of five milliseconds to a corresponding priority level (communication 641). The priority level changing procedure means 147 requests a priority level conversion procedure means 573 to convert the time limit to a corresponding priority level (communication 642). The priority level conversion procedure means 573 retrieves processing amount data 600 from a program structure 596 corresponding to the user program 136 (step 643), and determines a priority level from the retrieved processing amount and the specified time limit. The processing amount of the user program 136 is assumed to be 64 thousand instructions. Then, from the time limit of five milliseconds and the processing amount of 64 thousand instructions, 0.78 milliseconds is calculated as a time limit per unit processing amount (calculation 644). Referring to a priority level correspondence table 581, the priority level corresponding to the value derived by calculation 644 is revealed to be one. The priority level conversion procedure means 573 informs the priority level changing procedure means 147 of priority level 1 as the conversion result to notify that the user program 136 must be executed with priority level 1 (communication 645). Finally, the priority level changing procedure means 147 forwards the program structure 596 in a priority queue 571 to a queue for priority level 1 (communication 646).

In the foregoing manner, the priority levels of programs resident on different computers can be uniformly managed based on the common concept of the time limit. Incidentally, it is also possible, as is the case of the distributed computing system utilizing the urgency, that the user program 133 instructs the priority level conversion procedure means 572 to calculate the time limit from its own priority level 4 and processing amount and issues the processing request 640 with this time limit specified.

Similarly to the distributed computing system which utilizes the urgency to manage the local priority levels in the respective computers belonging thereto, the contents of the priority level correspondence table may be modified in accordance with variations in load also when the time limit is utilized for such management. The following two approaches will be explained by way of example, as a method for modifying the correspondence table between the time limit and the priority level:

(1) an approach for changing the time limit in the priority level correspondence table in proportion to varying load; and (2) an approach for changing the time limit in the priority level correspondence table using the difference between an actual execution time and the time limit.

Figure 27:
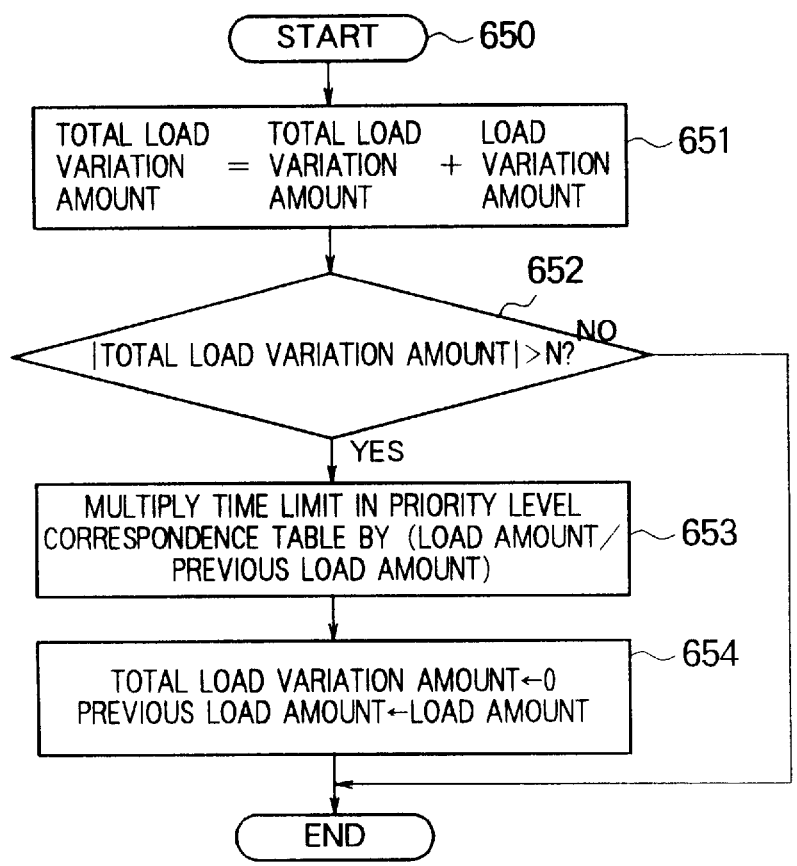
FIG. 27 is a flow chart representing a processing flow for modifying the contents of the priority level correspondence table in accordance with a varying load.

FIG. 27 shows the processing flow of a first approach 650 for modifying the priority level correspondence table. A load amount at the time the priority level correspondence table was modified last time is referred to as the previous load amount, and a subsequent variation amount of the load as the total load variation amount. When the load varies, the current load variation amount is added to the total load variation amount (step 651), and it is determined whether the resulting total load variation amount is equal to or more than a predetermined value irrespective of the changing direction (i.e., it is determined whether the absolute value of the total load variation amount is equal to or more than the predetermined value) (step 652). If the total load variation amount is equal to or more than the predetermined value, the time limit in the priority level correspondence table is corrected in accordance with the ratio of the previous load amount to the current load amount (step 653). When the contents of the priority level correspondence table are modified, the total load variation amount is set to zero, and the previous load amount is set to the current load amount as a final step (step 654), followed by resuming the measurement of the load variation amount.

Figure 28:
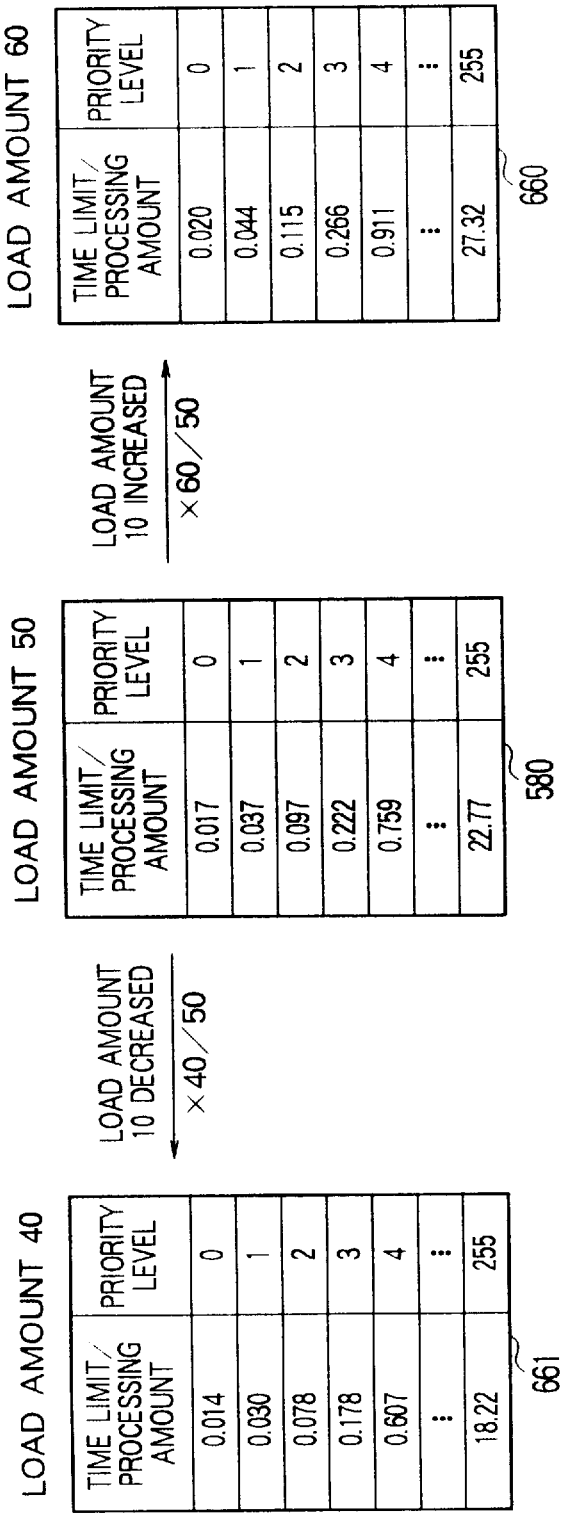
FIG. 28 shows how the priority level correspondence table is modified in accordance with an increase or decrease in load.

FIG. 28 shows tables for explaining the meaning implied in the modification of the priority level correspondence table in accordance with the ratio of the previous load amount to the current load amount, which is performed at step 653 in FIG. 27. It is assumed that the priority level correspondence table 580 has data calculated based on a load amount equal to 50 (the number of executable programs equal to 50), and the priority level correspondence table is modified every time the load is increased or decreased by ten. When the load is increased by ten, the priority level correspondence table is modified as shown in a table 660. Specifically, each time limit value in the table 660 is derived by multiplying the time limit value in the original table 580 with the ratio of the previous load amount 50 to the changed load amount 60. Similarly, when the load is decreased by ten, a priority level correspondence table 661 can be created by multiplying each time limit value in the original table 580 with the ratio of the previous load amount 50 to the changed load amount 40. In this way, the time limit corresponding to the same priority level can be made longer as the load is larger (a longer time is required to complete processing) and shorter as the load is smaller (processing is completed in a shorter time).

Next, a second approach for modifying the priority level correspondence table will be explained again with reference to FIG. 26. In the second approach, after executing the program 136 with the priority level changed to one, the priority level conversion procedure means 573 receives an actual processing time of the user program 136 (communication 647). It is assumed in the example shown in FIG. 26 that the actual processing time is 3.47 milliseconds. Then, an execution time per unit processing time is calculated to be 0.54 milliseconds (3.46/64=0.54) (calculation 648). This value itself is stored as a time limit corresponding to priority level 1 to correct the priority level correspondence table 581 (step 649). It should be noted that for actually correcting the priority level correspondence table, a predetermined value (for example, 0.1 milliseconds) may be added to the calculated value, i.e., 0.54 milliseconds in order to provide a safeguard.

The distributed computing system according to the eighth embodiment has been described above for uniformly managing the local priority levels defined in the respective computers belonging thereto. According to this embodiment, the concept of time limit is utilized to enable the uniform management of the local priority levels in a plurality of computers in the distributed computing system which differ from each other in performance, load, and type. Since the time limit is converted to a corresponding priority level in each computer in accordance with the performance and load of the computer only by issuing a processing request with a specified time limit, it is possible to easily build a real-time distributed computing system.

Further, according to this embodiment, since a program is executed by a computer after the time limit and processing amount thereof have been converted to a corresponding priority level in the computer in accordance with the performance and load of the computer, newly requested processing with relatively a short time limit may be executed prior to previously assigned processing with a long time limit, thus making it possible to realize more strict real-time processing while efficiently taking advantage of a plurality of computers.

Further, in this embodiment, the contents of the priority level correspondence table can be modified so that the priority level can be managed in accordance with dynamic load variations in each computers.

Furthermore, in this embodiment, the time limit can be specified in accordance with the importance of processing when a processing request is forwarded from one computer to another. In addition, for specifying the time limit, it is not necessary to know the performance, load, and type of a requested computer.

While the system of this embodiment represents a load on a computer by the number of executable programs, the load may be represented by the sum of processing amounts or predicted processing time of executable programs. The latter way is advantageous in that loads on respective computers are more accurately evaluated so that more strict real-time characteristics are ensured. Also, while the system of this embodiment determines the priority level in consideration of both the performance and load of each computer, either one may only be considered for determining the priority level. Particularly, with a distributed computing system only including the same type of computers, the load only has to be considered, thus enhancing the efficiency of the conversion between the time limit and the priority level.

Figure 29:
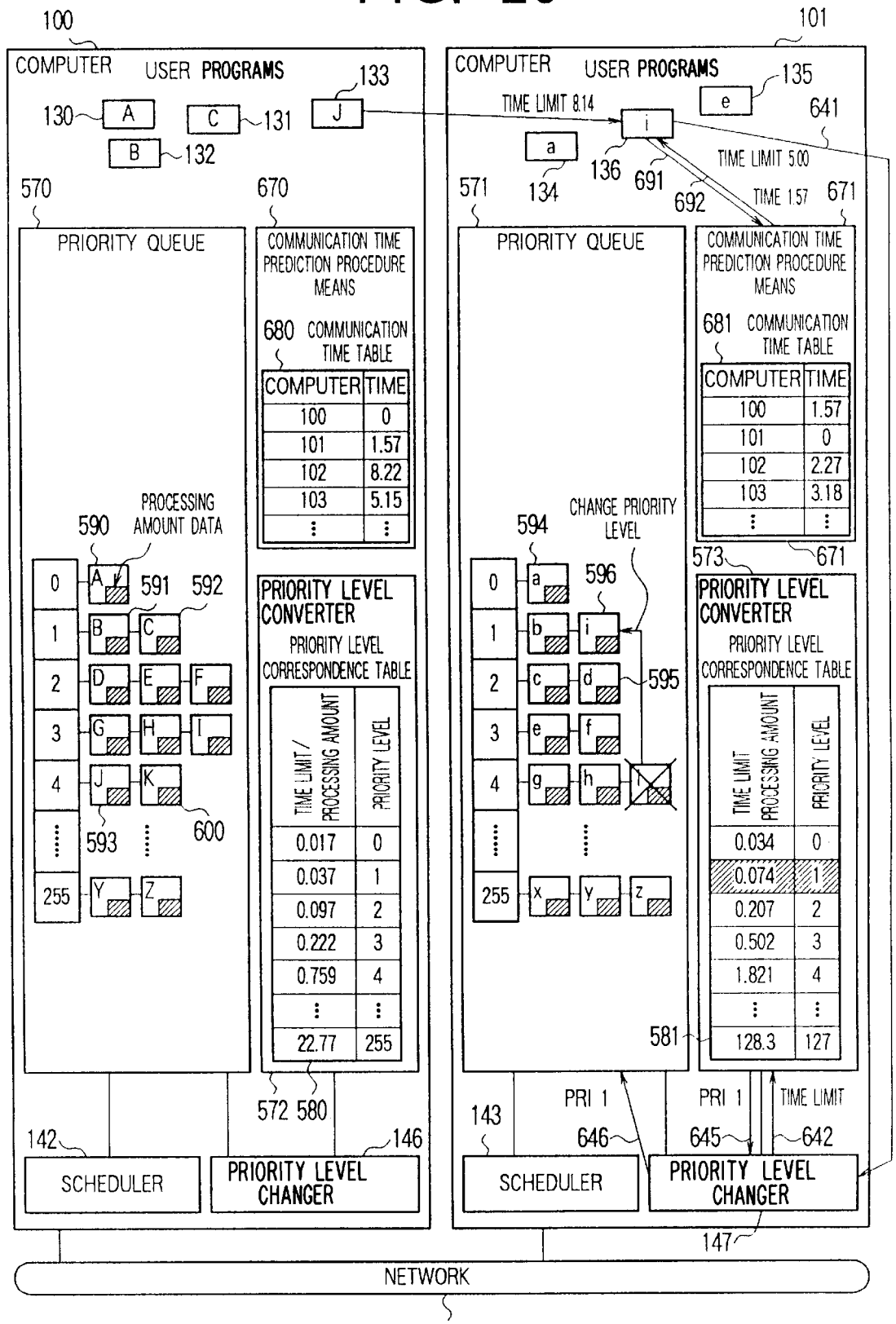
FIG. 29 is a diagram showing a ninth embodiment of the present invention and a processing flow for performing communications for specifying a time limit in consideration of a communication time in the ninth embodiment.

For uniformly managing the local priority levels in computers belonging to a distributed computing system utilizing the time limit, consideration of communication time between computers allows for more accurate priority management. FIG. 29 shows a ninth embodiment of the present invention which considers the communication time between computers for the priority management. Elements 100, 101, 110, 130–136, 142, 143, 146, and 147 in FIG. 29 are identical to the elements designated the same reference numerals in FIG. 1. Computers 102, 103 and details within the computers are omitted. Elements 570–573, 580, 581, 590–596, and 600 in FIG. 29 are identical to the elements designated by the same reference numerals in FIG. 22. Also, the flow of the conversion between the time limit and the priority level in communications 641, 642 and 645–646 are identical to that shown in FIG. 26.

The system of this embodiment is provided with communication time prediction procedure means 670, 671 for predicting the communication time between computers. The communication time prediction procedure means 670, 671 operate independently of priority level conversion procedure means 572, 573, priority level changing procedure means 146, 147, and so on. The communication time prediction procedure means 670, 671 internally have communication time tables 680, 681 such that when the means 670, 671, given a computer identifier, output a communication time between the associated computer and the computer, the identifier of which has been input thereto, from the communication time tables 680, 681, respectively. For setting the communication time tables 680, 681, either of the following two methods may be employed by way of example:

(1) upon activating a computer, the computer communicates with all of the remaining computers for storing execution time for the communications; and (2) the communication table is not set before a communication time prediction is requested. At the time a communication time prediction request is first issued, the computer communicates with a requested computer for storing execution time for the communication.

FIG. 29 also illustrates a flow of communications for issuing a processing request using the communication time prediction procedure means 670, 671. Similarly to FIG. 26, FIG. 29 shows an example in which a user program 133 requests a user program 136 to execute processing with a specified time limit. Assume that the user program 133 desires to impose a time limit of 8.14 milliseconds to the processing to be executed by the user program 136. For this purpose, the user program 133 performs a communication 690 for specifying a time limit in the form shown by 630 or 631 in FIG. 25. This time limit is regarded to include a time required for communications between the computers, viewed from the user program 133. Specifically, the time limit viewed from the user program 136 is derived by subtracting the time required for the inter-computer communications from the time limit of 8.14 milliseconds. The user program 136 inquires of the communication time prediction procedure means 671 a communication time with the computer 100 (communication 691). In response, the communication time prediction procedure means 671 refers to the communication time table 681 and returns the communication time with the specified computer 100 to the user program 136 (communication 692). In exemplary numerical values shown in FIG. 29, the communication time with the computer 100 is 1.57 milliseconds. The user program 136 can find out the time limit imposed thereto by subtracting the communication time from the specified time limit. In this example, by subtracting the communication time (1.57×2= 3.14 milliseconds) from 8.14 milliseconds (the same communication time is required for sending the processing request and for returning the result), five milliseconds is derived as the time limit to the user program 136. The subsequent steps are similar to those in FIG. 26.

In the processing flow described above, the final time limit is calculated by the processing requesting program which subtracts the communication time from the specified time limit. Alternatively, the processing requesting program may have inquired of the communication time prediction procedure means 870 a communication time to previously subtract the communication time from the specified time limit.

With the foregoing ninth embodiment, the time limit utilized in the eighth embodiment can be more accurately converted to a priority level. This is particularly effective if the communication time between computers is too long to be ignored.

In the systems according to the eighth and ninth embodiments, the priority level conversion procedure means 572, 573 are separately disposed on respective computers. Alternatively, the priority level conversion procedure means may be collectively disposed on a single computer, as shown in FIG. 10.

Figure 30:
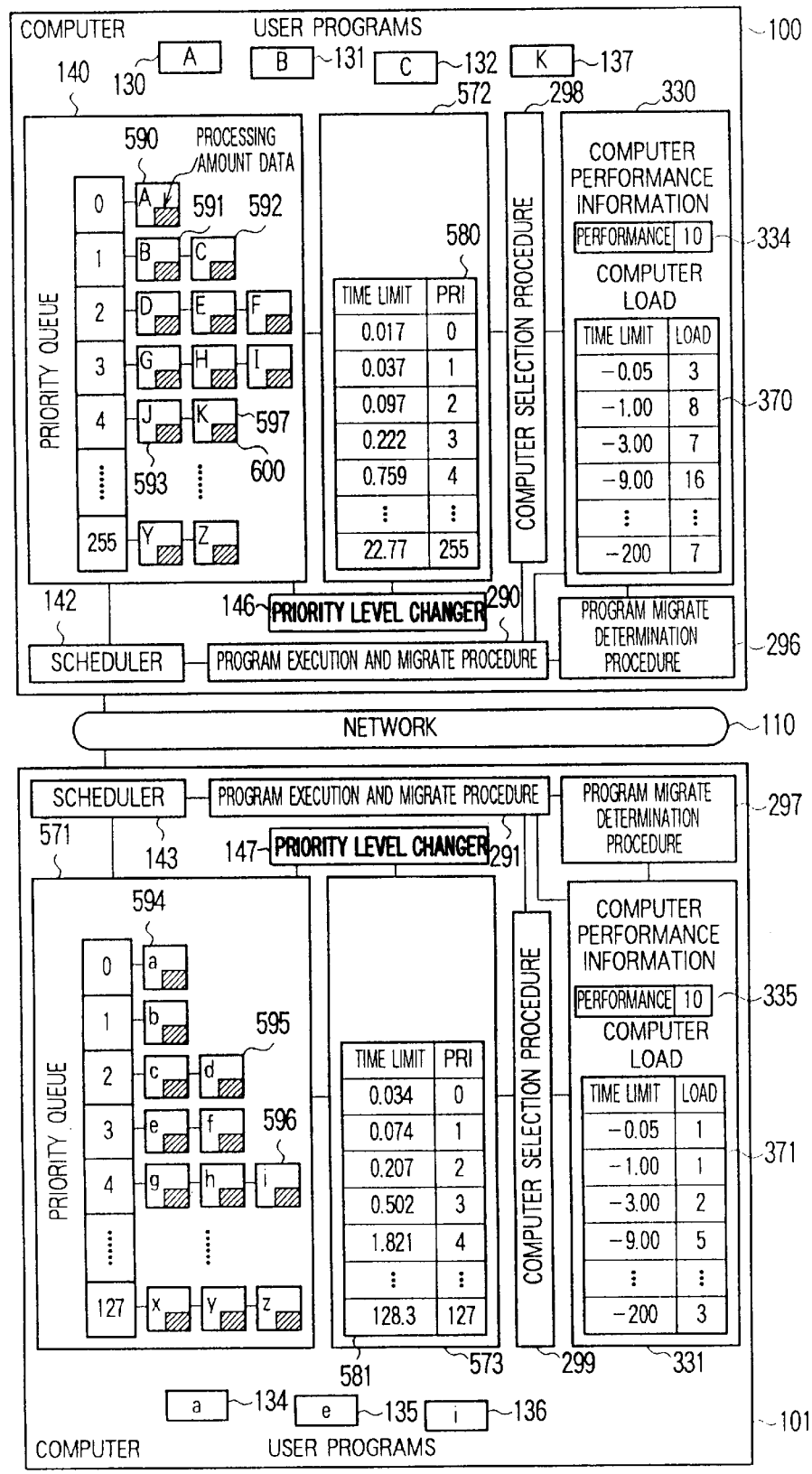
FIG. 30 is a diagram showing the configuration of a tenth embodiment.

Next, explanation will be given for a distributed computing system according to a tenth embodiment for performing the load distribution in view of the importance of each program. In the tenth embodiment, the load distribution is performed based on the time limit to avoid a situation in which programs with short time limits are concentrated on a single computer. FIG. 30 shows the configuration of the distributed computing system according to the tenth embodiment. Elements 100, 101, 110, 130–136, 142, 143, 146, and 147 in FIG. 30 are identical to the elements designated the same reference numerals in FIG. 1. Descriptions of computers 102, 103 and details within the computers are omitted. Also, elements 137, 290, 291 in FIG. 30 are identical to the elements designated the same reference numerals in FIG. 16, and corresponding elements perform similar operations. Priority queues 570, 571, priority level conversion procedure means 572, 573, priority level correspondence tables 580, 581, program structures 590–596, and processing amount data 600 in FIG. 30 are identical to those in FIG. 22. A user program 137 is managed by a program structure 597.

Computer information areas 330, 331 includes computer load information table 370, 371 and computer performance information table 334, 335, respectively. The computer load information tables 370, 371 store loads on respective computers for each time limit per unit processing amount. While in this embodiment, delimiters for the time limit per unit processing amount in the computer load information are not placed at regular intervals, they may be set at regular intervals for facilitating the load distribution.

The operation of the system according to this embodiment will be described with reference to FIGS. 30–34. First, how to initiate a new program will be explained. When the user inputs a command specifying an executable file of a program together with a time limit, the operating system analyzes the command and requests respective program execution and migrate procedure means 290, 291 in the operating systems to initiate the program, whereby the program can be initiated. It is assumed in this example, that the computer 100 receives a command for initiating a program with a time limit set to 50 milliseconds, and the program execution and migrate procedure means 290 responsively performs the operation associated with the initiation of the program. The following description will proceed along this scenario.

Figure 31:
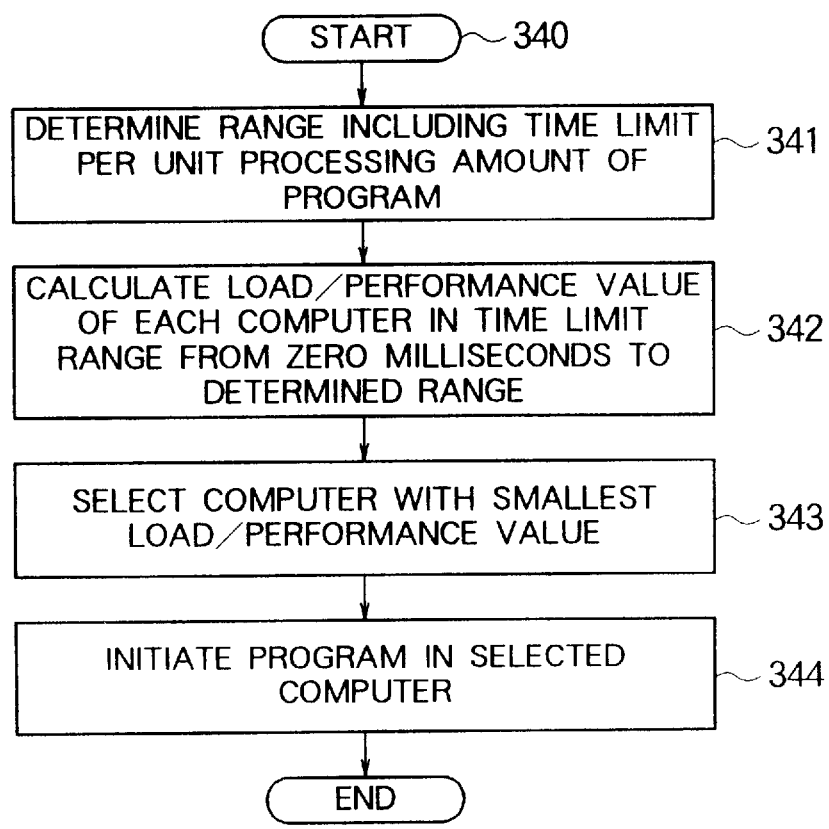
FIG. 31 is a flow chart representing a processing flow for initiating a program in the tenth embodiment.

A processing flow 340 for program initiation will be first explained with reference to FIG. 31. The program execution and migrate procedure means 290 requests a computer selection procedure means 298 to determine in which time limit region a program to be newly initiated is included within the computer load information (step 341). For example, assuming that a processing amount of the program is estimated at 128,000 instructions, a time limit per unit processing amount is calculated to be 0.39 milliseconds (50/128=0.39). In the computer load information tables 370, 371, the time limit region including 0.39 milliseconds falls under 0.05–1.00. Next, the computer selection procedure means 298, 299 are requested to calculate the load/performance values in a range of the time limit per unit processing amount from zero millisecond to the region determined at step 341 (step 342). The calculation is performed by reading the computer load information tables 370, 371 and the computer performance information tables 334, 335 shown in FIG. 30. FIG. 32 are tables which show the load information, load amount, load/performance value of each computer placed in the state shown in FIG. 30. The computer load information tables 370, 371 each indicate the number of executable programs on the associated computers 100, 101 for each range of time limit per unit processing amount, whereas the numbers of executable programs included in respective time limit ranges from zero millisecond to particular time limit values (0–0.05; 0–1.00; 0–3.00; 0–9.00; . . . ; 0–200) on the respective computers 100, 101 are stored in load amount tables 380, 381. The numbers of executable programs are divided by the respective computer performance (information) to derive the load/performance values stored in the table 328, 383. Since the program to be newly initiated, herein considered, is imposed a time limit of 0.39 milliseconds, the load/performance value corresponding to the minimal time limit range 0–1 millisecond, including 0.39 milliseconds, is calculated to be 1.10 for the computer 100 and 0.67 for the computer 101.

Next, the computer selection procedure means 298, 299 communicate with each other to select the computer with the smallest load/performance value as a computer which is assigned to execute the program to be initiated (step 343). Referring to FIG. 32, although tables for the computers designated 102 and subsequent reference numerals are omitted, assuming the load/performance value 0.67 of the computer 101 is the smallest, the computer 101 is selected. Finally, the program execution and migrate procedure means performs the operation for initiating the program with the selected computer (step 344). This operation is accomplished in such a manner that the program execution and migrate procedure means of the computer which has started the program initiation flow requests the program execution and migrate procedure of the selected computer to bring the program into an executable condition. In this example, the program execution and migrate procedure means 290 of the computer 100 communicates with the program execution and migrate procedure means 291 of the computer 101 to request the same to bring the program into an executable condition.

Next, a processing flow for moving an executable program will be explained. In this embodiment, program migrate determination procedure means 296, 297 are periodically initiated such that they mutually communicate to confirm loads on the respective computers associated therewith. The program migrate determination procedure means 296, 297, upon determining that the loads on the respective computers are not equally distributed in accordance with their performances, determine to migrate a program such that the respective computers are given equally distributed loads, and requests the program execution and migrate procedure means 290, 291 to migrate a program. The program execution and migrate procedure means 290, 291, in turn, request the computer selection procedure means 298, 299 to determine a destination computer, and perform the operation associated with the migrate of a program in cooperation with a program execution and migrate procedure means of the destination computer. In this embodiment, the above-mentioned load/performance values are utilized for determining whether loads on the respective computers are equally distributed in accordance with their performance.

The processing flow 350 for moving a program will be explained with reference to FIG. 33. First, the program migrate determination procedure means sets 0.05 milliseconds to a variable representing a time limit range (step 351). This value serves as an upper limit of a range in which the time limit per unit processing amount presents the smallest value in computer load information 370–371. Then, the load/performance value is calculated in the time limit range from zero to t milliseconds for each computer (step 352). As described above, the load/performance values calculated for the state illustrated in FIG. 30 are as listed in tables 382, 383 for the computers 100, 101. Next, the difference D between the largest load/performance value and the smallest load/performance value is calculated within all the load/performance values calculated for all computers (step 353). Although the information for the computers designated 102 and subsequent reference numerals is omitted in FIG. 32, assuming that the load/performance value 0.33 of the computer 101 is the largest and the load/performance value 0.30 of the computer 100 is the smallest when t is 0.05 milliseconds, the difference D is calculated to be 0.03. Then, it is examined whether this value of the difference D exceeds a threshold Dt (step 354). It is assumed in this embodiment that the threshold Dt is set to 0.3. If the difference D exceeds the threshold Dt, the flow proceeds to step 355, and otherwise to step 358. In this example, since the difference D does not exceeds the threshold Dt when n is zero, the flow proceeds to step 358, where it is determined whether the value of t is a maximum value in the time limit range (the maximum value is 200 milliseconds in the example shown in FIG. 30). If the value of t is the maximum value in the time limit range, the flow is terminated. If not, the flow proceeds to step 359, where an upper limit of the next time limit range is substituted into the variable t. In this example, since t is now set to 0.05 milliseconds, the flow proceeds to step 359, where one millisecond is substituted into t.

Then, the processing flow jumps back to step 352 to calculate the load/performance values for the respective computers, and then proceeds to step 353, where the difference D is calculated. Although the information for the computers designated 102 and subsequent reference numerals is omitted in FIG. 32, assuming that the load/performance value 1.10 of the computer 100 is the largest and the load/performance value 0.67 of the computer 101 is the smallest when t is one millisecond, the difference D is calculated to be 0.43. Thus, when t is one millisecond, the difference D exceeds the threshold Dt. With the difference D exceeding the threshold Dt, it is determined that loads are not equally distributed to the computers, so that a program to be migrated is selected (step 355). It is assumed in this embodiment that from executable programs corresponding to the time limit per unit processing amount equal to or less than t milliseconds, the program located at the last of the priority queue is selected for the purpose. As shown in FIG. 30, priority levels corresponding to the time limit range from 0.05 to 1 millisecond of the computer 100 are 2–4, and it is program K that is scheduled to be executed at the last of the priority queue (program structure 597). Thus, the program K is selected as the program to be migrated.

Once the program to be migrated is determined, the program migrate determination procedure means of the computer on which the program to be migrated is resident requests its own program execution and migrate procedure means to perform the operation associated with the migrate of the program. In this example, the program execution and migrate procedure means 290 of the computer 100 is involved in the operation. The program execution and migrate procedure means 290 requests the computer selection procedure means 298 to select a destination computer to which the selected program is to be migrated (step 356). The computer selection procedure means 298 mutually communicates with computer selection procedure means on the other computers to determine the destination computer. In this embodiment, the computer having the smallest load/performance value is assumed to be selected as the destination. Therefore, in this example, the computer 101, which presents the smallest load/performance value when t is one millisecond is selected as the destination.

Once the destination is determined, the program execution and migrate procedure means executes the program migrate operation (step 357). In this example, the program execution and migrate procedure means 290 of the computer 100 executes the program migrate operation in cooperation with the program execution and migrate procedure means 291 of the destination computer 101. After the program has been migrated to the computer 101, the load condition improved by this migrate operation is reflected to the computer load information tables 370, 371 as shown in FIG. 34. As can be seen from a comparison of FIG. 33 with FIG. 34, in the computer load information tables 370, 371, the number of executable programs in the range of the time limit per unit processing amount from 0.05 to 1 millisecond is decreased from eight to seven for the computer 100 and increased from one to two for the computer 101.

After the program has been migrated as described above, the flow again returns to step 352 to calculate the load/performance values for the respective computers. In this event, calculated load amounts and load/performance values are as shown in tables 380, 381, 382, 383 in FIG. 34. Although the information for the computers designated 102 and subsequent reference numerals is omitted in FIG. 34, if the difference D still exceeds the threshold Dt when t is one millisecond, the program migrate operation is again performed as described hereinabove. When the difference D is equal to or less than Dt, the processing flow proceeds to step 358.

Figure 33:
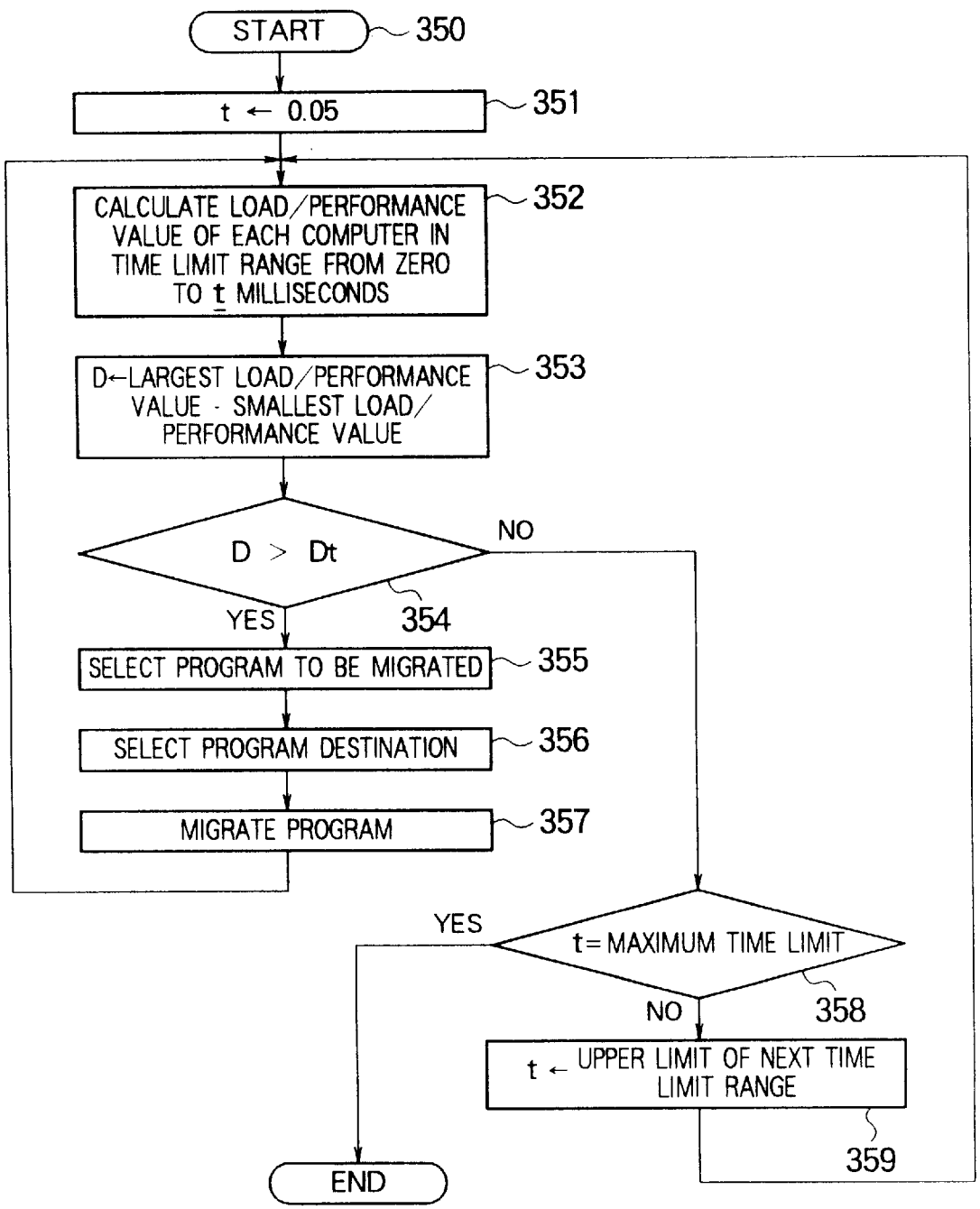
FIG. 33 is a flow chart representing a processing flow for moving a program in the tenth embodiment of the present invention.

By repeating the above processing flow shown in FIG. 33 until the maximum value of the time limit range is set to the value t, the program migrate is carried out in order to distribute an equal load to the respective computers belonging to the distributed computing system, in accordance with their respective performances, for all the time limit ranges.

The system according to the tenth embodiment of the present invention has been described. The system of the tenth embodiment has an advantage in that the load on the system, i.e., user programs to be executed thereby can be uniformly distributed to all the computers belonging thereto in accordance with their respective performances, so that the computer resources can be effectively utilized. Further advantageously, since the equality of distributed loads is evaluated in consideration of both load amounts and performances of the respective computers, variations in the performances of the computers will not affect the equal evaluation of the load.

Also, the system of this embodiment is advantageous in that user programs can be equally distributed to the computers in accordance with their respective performances in each time limit range, so that the real-time processing can be accomplished based on the uniform time limit in the whole distributed computing system. Particularly, since the load on the whole system is distributed in consideration of time limits imposed to respective programs, it is possible to prevent a number of programs with a short time limit from concentrating on a single computer, thus ensuring more strict real-time characteristics.

While the system shown in FIGS. 30–34 has the priority level conversion procedure means 572, 573, the computer selection procedure means 298, 299, and the computer information areas 330, 331 are distributively located in the respective computers 100, 101, these means may be disposed on a single computer for concentrated management thereof.

Figure 35:
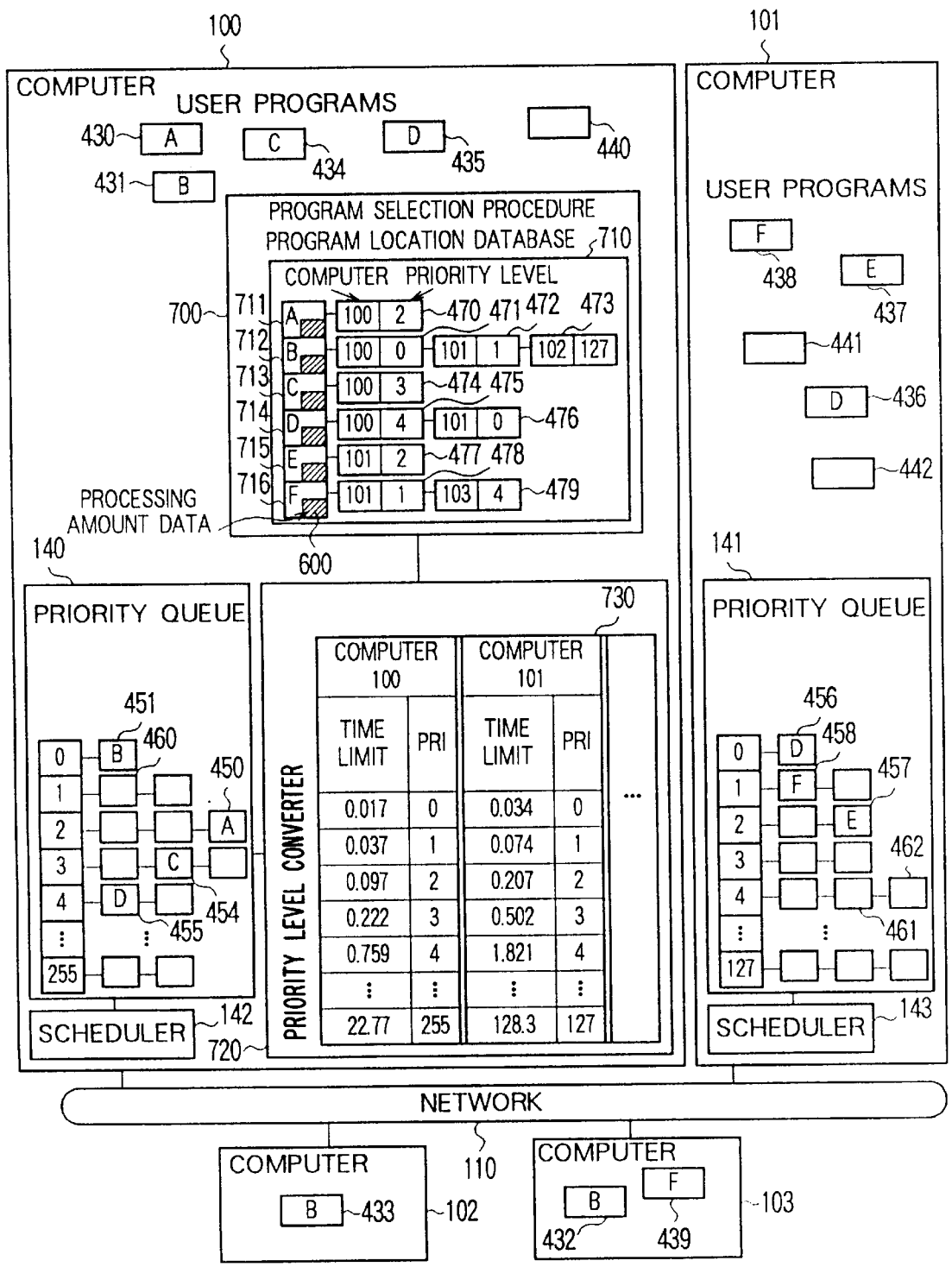
FIG. 35 is a diagram showing the configuration of an eleventh embodiment of the present invention.

The system described in FIGS. 17–21 is such that a plurality of programs performing the same operation are executed on a plurality of computers, wherein a processing request is issued specifying an urgency level to select a program having a priority level desirable to a requesting program from the programs performing the same operation. Explanation will now be given of an eleventh embodiment of the present invention for performing the program selection using the time limit instead of the urgency. FIG. 35 shows a distributed computing system according to the eleventh embodiment which has a function of distributing processing requests utilizing the time limit. Specifically, the system of FIG. 35 employs the time limit instead of the urgency as employed by the system of FIG. 17. In FIG. 35, elements 100–103, 110, and 140–143 are identical to the elements designated the same reference numerals in FIG. 1. Details on hardware of computers 100, 101 are omitted. Elements 430–443, 450, 451, 454–458, 460–462, and 470–479 in FIG. 35 are identical to the elements designated the same reference numerals in FIG. 17. A priority level conversion procedure means 720 and a priority level correspondence table 730 are such that the priority level conversion procedure means 572, 573 and the priority level correspondence tables 580, 581 in FIG. 22 are modified to form a single procedure and a single table for allowing the management with the single procedure and single data structure. The priority level conversion procedure means 720 can provide a local priority level on each computer corresponding to a specified time limit by using the conversion procedure means 620 shown in FIG. 24.

A program selection procedure means 700 selects a program optimal to a requester with a specified time limit. A program location database 710 is provided as a managing data structure for this selection. The program location database 710 manages program location information tables 470–479 for storing the identifiers of computers on which programs performing the same operation are running and the priority levels of the programs. The program location information tables 470–479 are managed as program lists 711–716 for respective sets of programs performing the same operation. It is assumed in this embodiment that the program lists 711–716 themselves store the processing amount data 600 shown in FIG. 22 of associated programs. In this way, a time limit per unit processing amount can be derived from a specified time limit and processing data amount 600 specified by a program list 711–716. Alternatively, the processing amount data 600 may be stored in the program structure such that the priority level conversion procedure means 720 reads the processing amount data 600 to derive a time limit per unit processing amount, as in the case of the system shown in FIG. 22. When the priority levels of programs registered in the program selection procedure means 700 are changed in any computer, when a program is deleted from an associated computer, or when a program to be registered is newly initiated, the program selection procedure means 700 is informed of the identifier of a computer on which a concerned program is operating and the urgency level of the program in order to modify the contents of the program location database 710.

Figure 36:
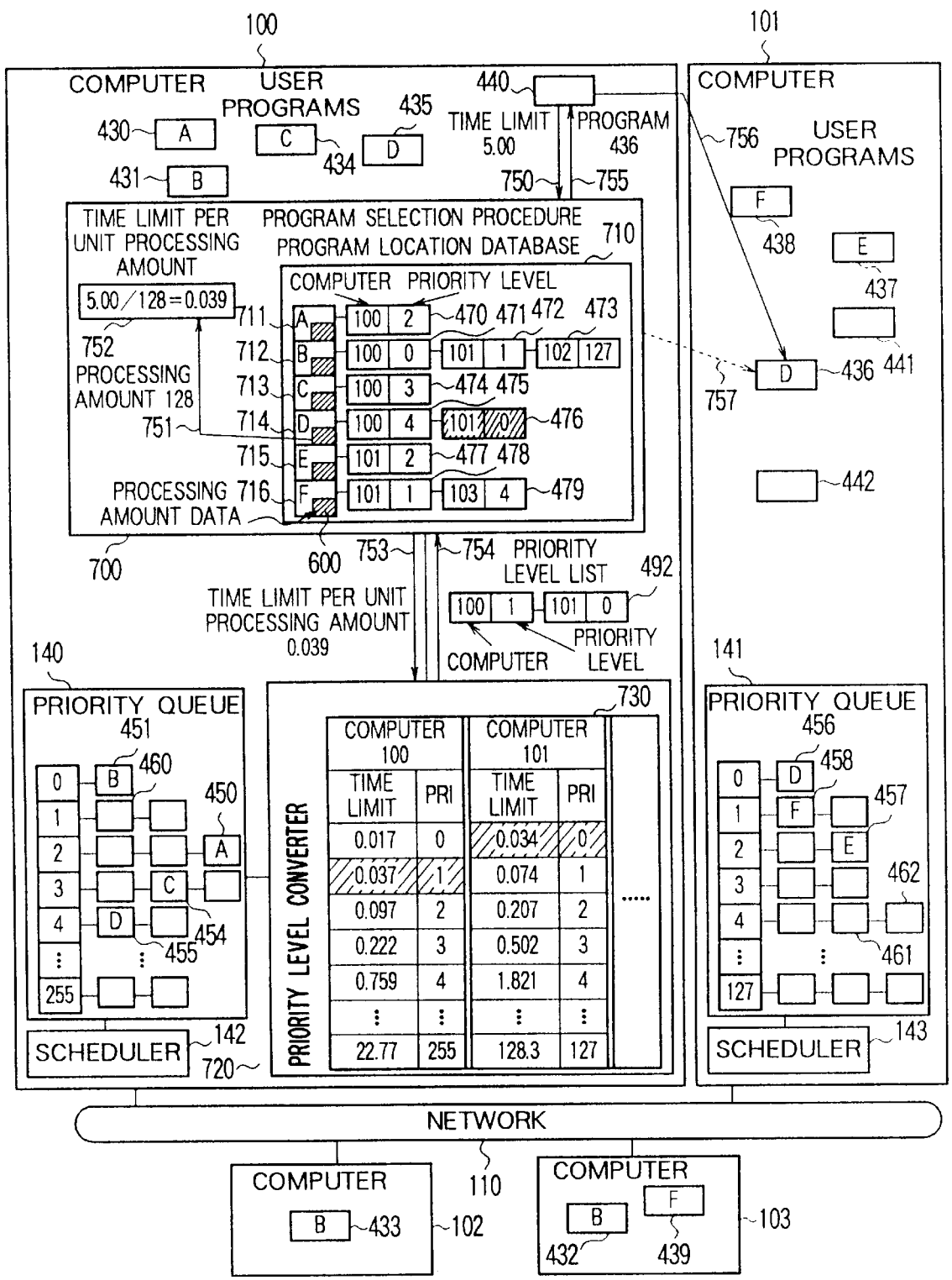
FIG. 36 shows a processing flow for selecting a program in the eleventh embodiment of the present invention.

Next, explanation will be given of a method for selecting a destination program, to which a processing request is sent, in accordance with the time limit using the priority level conversion procedure means 720 and the program selection procedure means 700. FIG. 36 shows an example of the processing flow for selecting a program. It is assumed in this embodiment that a user program 440 issues a processing request to a program in a program group D (user program 435 or 436). The user program 440 first inquires of the program selection procedure means 700 the location of a program belonging to the program group D which satisfies a time limit of five milliseconds (communication 750). The program selection procedure means 700 retrieves the processing amount data 600 related to the program in the group D from the program list 714 (step 751). Assume here that the processing amount of the program in the group D is 12,000 instructions. From the given time limit and processing amount data 600, the time limit per unit processing amount is calculated to be 0.039 milliseconds (5.00/128=0.039) (calculation 752). The program selection procedure means 700 informs the priority level conversion procedure means 720 of the result derived by calculation 752 and requests the same to convert the time limit per unit processing amount to a priority level (communication 753). The priority level conversion procedure means 720 executes the procedure 620 shown in FIG. 24 to determine local priority levels in the respective computers corresponding to the time limit of 0.039 milliseconds, and informs the program selection procedure means 700 of the determined priority levels as the priority level list 492 (communication 754). The priority level list 492 indicates the local priority levels in the respective computers corresponding to the specified time limit. In this embodiment, the program selection procedure means 700 receives in return a priority level list indicating that the time limit of 0.039 milliseconds corresponds to priority level 1 in the computer 100 and to priority level 0 in the computer 101 through communication 754. The program selection procedure means 700 compares the contents of the program location database 710 with the contents of the priority level list 492 to determine a destination program to which the processing request is sent. The processing flow 500 in FIG. 19 may be utilized for comparing the program lists 711–716 with the priority level list 492 to find a program with a priority level which lies within the specified priority level range. In the embodiment shown in FIG. 36, the program list 714 for the program group D only contains program location information 476 (corresponding to the user program 436) which corresponds to the priority level range specified by the priority level list 492. Therefore, the program selection procedure means 700 determines that the user program 436 resident on the computer 101 is suitable as the destination to which the processing request is issued, and informs the user program 440 of this determination result (communication 755). The user program 440 then issues the processing request to the user program 436 which has been retrieved by communication 755. Alternatively, it is also possible to employ a communication intervening method in which the program selection procedure means 700 transmits the communication 750 from the user program 440 directly to the user program 436 (communication 757).

The distributed computing system of the eleventh embodiment enables a plurality of programs with different priority levels, which perform the same operation, to be distributively located to computers belonging to the system, thus accomplishing the distribution of processing requests or the load in accordance with a specified time limit. Particularly, the effect of this embodiment is expected because even processing requests calling for the same contents of processing are often imposed different time limits depending on the requesters.

Further according to the eleventh embodiment, by setting different values to the priority level of the plurality of programs performing the same operation, the same contents of processing can be requested with different time limits without utilizing the priority level conversion procedure means, thereby making it possible to ensure the real-time characteristics in the same degree as the eighth embodiment.

Figure 37:
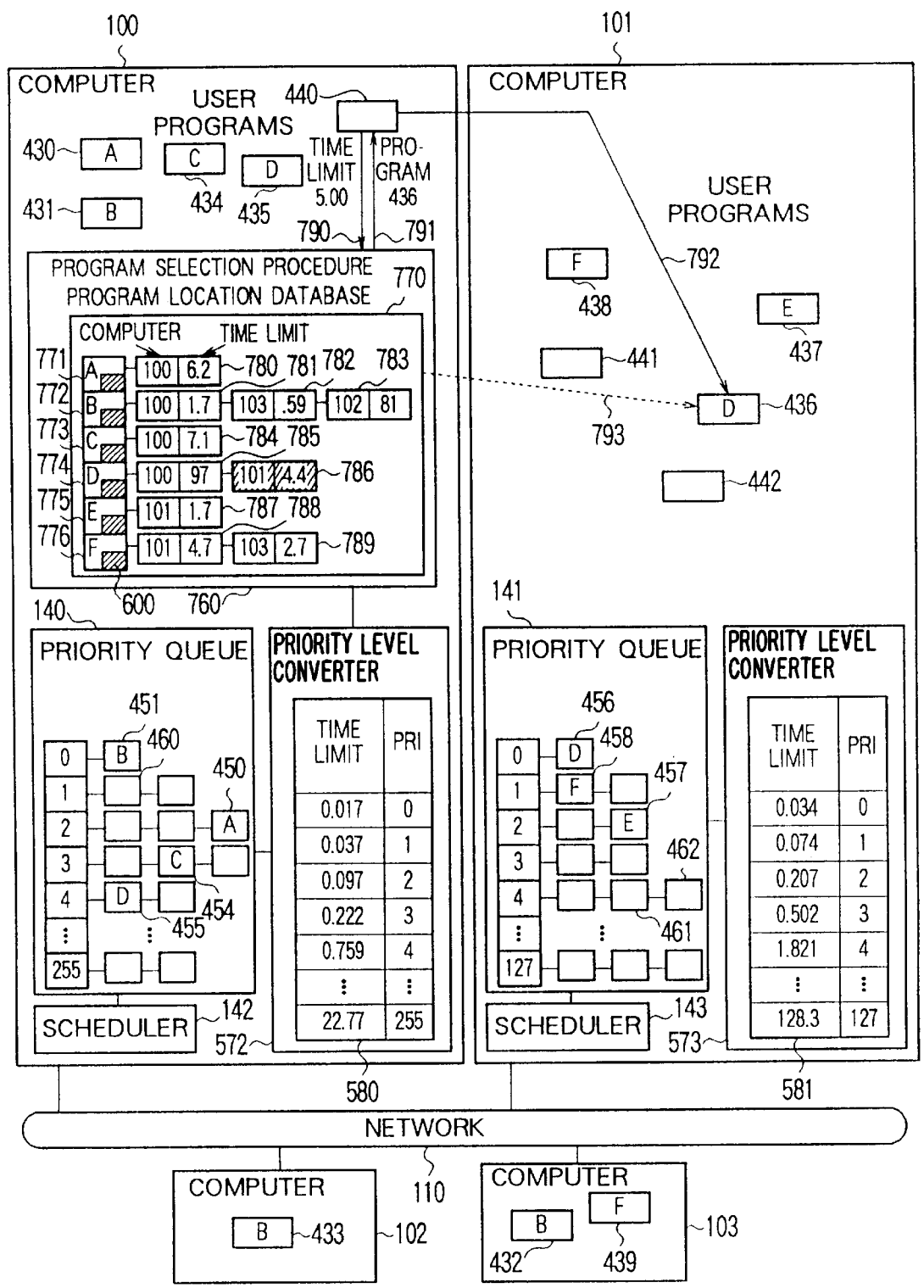
FIG. 37 is a diagram showing the configuration of a twelfth embodiment of the present invention and a processing flow for selecting a program in the twelfth embodiment.

FIG. 37 shows a twelfth embodiment which is a different distributed computing system having a program selection function as described above. The distributed computing system of FIG. 37 includes a combination of priority level conversion procedure means 572, 573 separately disposed in respective computers and a program selection procedure means 760 which stores the identifiers of computers on which programs performing the same operation are running and time limits associated with the programs for determining a destination to which a processing request is to be issued. In FIG. 37, elements 100–103, 110, and 140–143 are identical to the elements designated the same reference numerals in FIG. 1. Details on hardware of computers 100, 101 are omitted. User programs 430–442 and program structures 450–462 show the same contents as those in FIG. 17. Descriptions of program structures corresponding to the user programs 432–433 and 439 are omitted. The priority level conversion procedure means 572, 573, priority level correspondence tables 580, 581, and processing amount data 600 are respectively the same procedures and data structures as those in FIG. 22.

The program selection procedure means 700 manages computers on which these programs are running and their time limits for determining a program having an optimal time limit. A program position database 770 is provided as a managing data structure for that purpose. The program location database 770 manages program location information tables 780–789 for storing the identifiers of computers on which programs performing the same operation are running and their time limits (note that the time limit in this case rather represents a processing prediction time). The program location information tables 780–789 form program lists 771–776 such that each set of programs performing the same operation constitutes a list. While the program location information tables 470–479 in FIG. 35 store the identifiers of computers on which programs performing the same operation are running and their priority levels, the program location information tables 780–789 in FIG. 37 store time limits instead of the priority levels. The time limit can be calculated by multiplying the time limit per unit processing amount corresponding to the priority level of a program with the processing amount of the program. For example, the user program 436 (in a program group D) is running on the computer 101 with priority level 0. Assuming that the processing amount of the program in the program group D is 128,000 instructions, its time limit is calculated to be 4.35 milliseconds (0.034×128=4.35). This value is stored in the program location information area 786 (the location information area corresponding to the user program 436). When the priority level of a program registered in the program selection procedure means 760 is changed in any computer, when a program is deleted from any computer, and when a program to be registered is newly initiated, the program selection procedure means 760 is informed of the computer associated with such a program and the priority level of the program in order to modify the contents of the program lists. Also, when the correspondence relationship between the priority level and the time limit is changed on any computer, the priority level conversion procedure means 572, 573 inform the program selection procedure means 760 of such changes in the correspondence relationship for changing associated time limits stored in the program location information areas 780–789.

FIG. 37 also illustrates a method for selecting a destination program, to which a processing request is issued, in accordance with the time limit, using the priority level conversion procedure means 572, 573 and the program selection procedure means 760. Similarly to the explanation of the processing flow shown in FIG. 36, it is also assumed in this embodiment that a user program 440 issues a processing request to a program in a program group D (user program 435 or 436). The user program 440 first inquires of the program selection procedure means 760 the location of a program belonging to the program group D satisfying a time limit of five milliseconds (communication 790). Since the program selection procedure means 760 has recognized the identifiers of computers on which respective programs are running and their time limits, it can find out at this time the location of a program which satisfies the conditions defining that a program belongs to the program group D and its time limit is equal to or shorter than five milliseconds. In this embodiment, within the two user programs in the program group D, it is only the program location information 786 (corresponding to the user program 436) that satisfies the above-mentioned conditions. Therefore, the program selection procedure means 700 determines that the user program 436 resident on the computer 101 is suitable as the destination to which the processing request is issued, and informs the user program 440 of this determination (communication 791). The user program 440 then issues the processing request to the user program 436 which has been retrieved by communication 791. Alternatively, it is also possible to employ a communication intervening method in which the program selection procedure means 760 transmits communication 790 from the user program 440 directly to the user program 436 (communication 793).

In addition to having the same effect as the eleventh embodiment, the system according to the twelfth embodiment is advantageous in that since the program selection procedure means 760 does not command the priority level conversion procedure means 572, 573 to convert a time limit to a corresponding priority level, the program selection can be made faster than the system shown in FIGS. 35, 36. It should be noted however that since the program location information areas 780–789 store time limits, the time limits in the program location information areas may have to be changed if variations in load on any computer cause the correspondence relationship between the time limit and the priority level to change. Therefore, the system shown in FIGS. 35, 36 is advantageous if the loads on the respective computers vary largely with time.

Other than the system shown in FIGS. 35, 36 and the system shown in FIG. 37, it is also possible to build a system including a combination of the program selection procedure means 760 and the priority level conversion procedure means 720, or a system including the program selection procedure means 700 and the priority level conversion procedure means 572, 573. Further, although the priority level conversion procedure means 146, 147 are not described in the systems shown in FIGS. 35–37 because these systems do not suppose to initiate a program with a changed priority level, these means may be added to enable the system to change the priority level.

Figure 38:
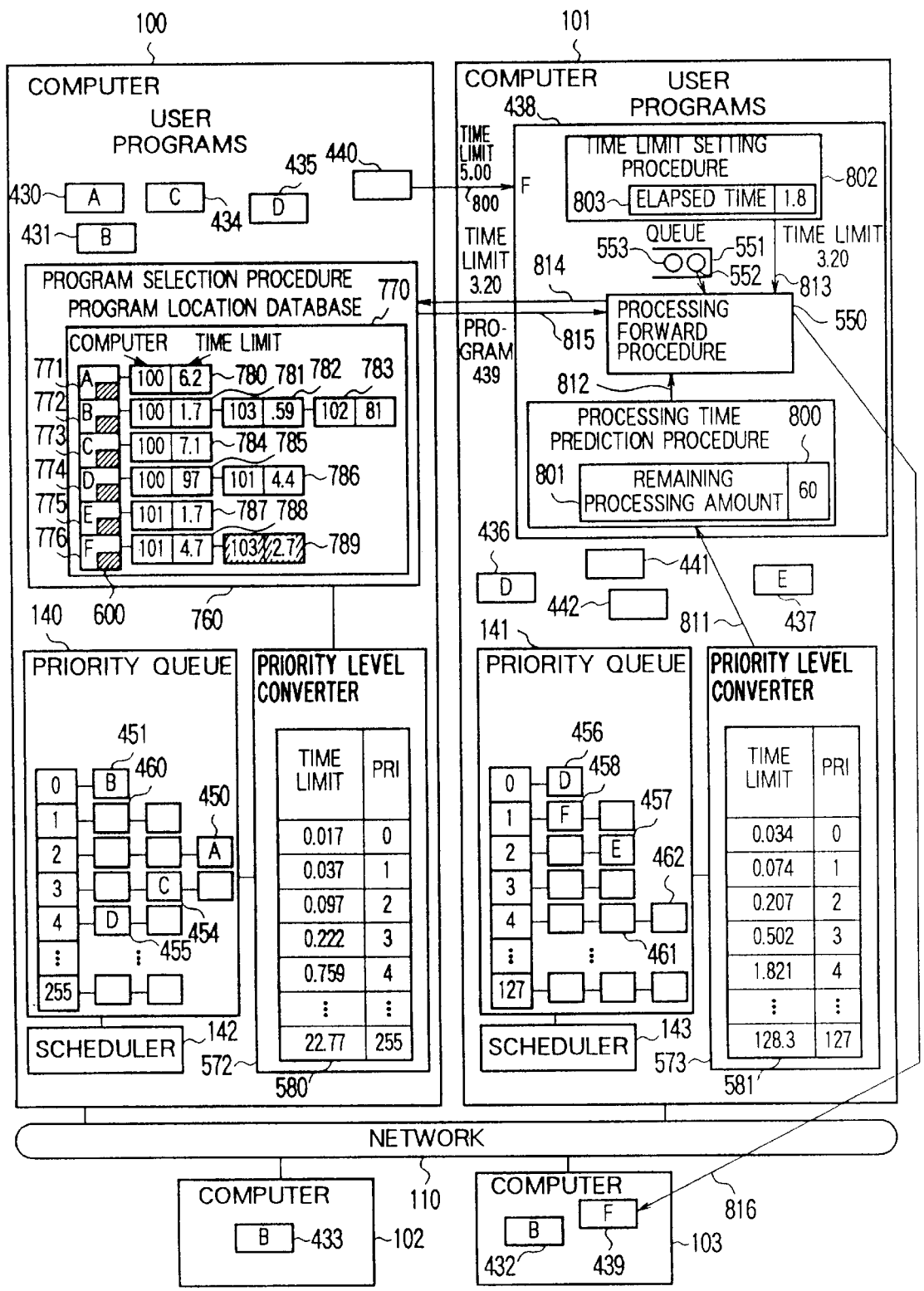
FIG. 38 is a diagram showing the configuration of a thirteenth embodiment of the present invention and a processing flow for forwarding a processing request in the thirteenth embodiment.

Finally, FIG. 38 shows a system according to a thirteenth embodiment of present invention which utilizes the time limit to forward a processing request issued to a program to another program which performs the same operation as the requesting program, similarly to the distributed computing system shown in FIG. 21. In FIG. 38, elements 100–103, 110, and 140–143 are identical to the elements designated the same reference numerals in FIG. 1. Details regarding the hardware of computers 100, 101 are omitted. Priority level conversion procedure means 572, 573 and processing amount data 600 respectively have the same procedure and data structure as those in FIG. 22. User programs 430–443 and program structures 450–462 have the same contents as those in FIG. 17. Program structures corresponding to user programs 432, 433, 439 are omitted. Also, elements 760, 770–776, and 780–789 in FIG. 38 are identical to the elements designated the same reference numerals in FIG. 37. Processing forward procedure means 550, a queue 551, and processing requests 552, 553 are identical to those in FIG. 21.

For utilizing the time limit, a condition for forwarding requested processing to another program may include the following two representative examples:

(1) A new processing request is issued to a program which is currently executing other processing; and (2) It is recognized that currently executed processing will not be completed in time.

In the former case, the processing forward procedure means 550 and the queue 551 enable a processing request to be forwarded to another program, similarly to the situation shown in FIG. 21. However, this embodiment is different in that the processing forward procedure means 550 specifies a time limit to a program selection procedure means 760.

In the latter case, the processing forward can be accomplished by providing each program with a processing time prediction procedure means 800 and a time limit setting procedure means 802. The processing time prediction procedure means 800 predicts a time required to complete currently executed processing. The prediction can be made, for example, by storing a remaining processing amount 801 of each program. For example, assuming that a user program 438 has a remaining processing amount 801 equal to 60, since a time limit per unit processing amount of the user program 438 (priority level 1 in the computer 101) is 0.074 milliseconds, the time required to complete the program 438 can be estimated at 4.44 milliseconds (0.074×60=4.44). The time limit setting procedure means 802 calculates a new time limit when the associated program newly issues a processing request to another program. This setting may be accomplished by storing an elapsed time 803 from the time the processing request is received or the like.

The flow of communications 810–816 represents how a processing request is forwarded from a program to another when the processing request is to be forwarded. The embodiment of FIG. 38 shows that the user program 440 issues a processing request to the user program 438 (a program in a program group F) with a time limit of five milliseconds (communication 810), and the processing request is forwarded from the user program 438 to another program. It is assumed that a remaining processing amount is 60,000 instructions after 1.8 milliseconds from the time the processing request 552 has been issued. The processing time prediction procedure means 800 receives a time limit per unit processing amount of 0.074 milliseconds corresponding to priority level 1 of the program 440 from the priority level conversion procedure means 573 (communication 811), and a processing prediction time is derived to be 4.44 milliseconds by the above-mentioned calculation (communication 812). The time limit setting procedure means 802 calculates a new time limit to be 3.2 milliseconds from the time limit of five milliseconds and the elapsed time of 1.8 milliseconds (communication 813). Since it is predicted that the remaining processing cannot be completed within the new time limit, this processing request is forwarded to another program. For this program forwarding, the processing forward procedure means 550 inquires of the program selection procedure means 760, specifying the newly calculated time limit of 3.2 milliseconds, whether a program which satisfies this time limit exists in the program group F (communication 814). The program selection procedure means 760 searches a program list 776 for the program group F for program location information of a program which satisfies the time limit of 3.2 milliseconds. In the example shown in FIG. 38, the program selection procedure means 760 can find program location information 789 (corresponding to a user program 439 on the computer 103). The program selection procedure means 760 informs the processing forward procedure means 550 of the location of the user program 439 corresponding to the program location information 789 (communication 815). The processing forward procedure means 550, upon receiving this information, requests the user program 439 to execute the processing 552 which has been determined not to be completed within the time limit (communication 816).

With the thirteenth embodiment, a processing request issued to a program can be forwarded to another program having the same time limit as the requested program to prevent a number of processing requests from concentrating on a single computer, thus making it possible to distribute processing requests to a plurality of programs. Further, since newly requested processing can be immediately executed without waiting for the completion of currently executed processing, improved real-time characteristics are ensured.

Further, according to this embodiment, a processing request issued to a program can be forwarded to another program capable of completing the processing faster than the requested program at the time the requested program is determined to fail to complete the processing in time, thus more strictly ensuring that the requested processing is completed within the time limit. The forward of a processing request in such a case is intended to ensure to satisfy the time limit even if any unexpected accident results in delaying the execution of a program.

While the system shown in FIG. 38 has the processing forward procedure means 550, the queue 551, the processing time prediction procedure means 800, and the time limit setting means 802 disposed in each program, these elements may be located external to the program such that they may be shared by a plurality of programs. In summary, the distributed computing system of this embodiment is composed of a combination of the program selection procedure means 760 and the priority level conversion procedure means 572, 573 shown in FIG. 37 with the additionally provided processing forward procedure means 550, queue 551, processing time prediction procedure means 800, and time limit setting means 802. Alternatively, the additional procedures and data structures may be added to the distributed computing system shown in FIG. 35 including a combination of the program selection procedure means 700 and the priority level conversion procedure means 720 for performing similar operations.

An alternative configuration may be created from the foregoing thirteenth embodiment. Specifically, while the system of the thirteenth embodiment forwards a processing request to another program when a requested program is determined to fail to satisfy a time limit imposed thereto, it is also possible to give a higher priority level to a program which is requested to execute the processing, instead of forwarding the processing, such that currently executed processing is completed more rapidly. For this alternative, in the system shown in FIG. 38, a time limit per unit processing amount is calculated to be 0.053 milliseconds from the new time limit of 3.2 milliseconds and the remaining processing amount of 60,000 instructions (3.2/60=0.053), and the priority level of the user program 438 is raised to priority level 0 to satisfy the calculated time limit per unit processing amount, whereby the user program 438 continues the processing with the raised priority level.

It should be noted that the communication time prediction procedure means 670, 671 in FIG. 29 may be introduced into the systems of FIGS. 30–38 to more strictly determine the time limit.

As will be understood from the description on the first-–thirteenth embodiments, the present invention accomplishes the uniform management of locally defined priority levels in respective computers belonging to a distributed computing system, using the urgency or time limit, to ensure more strict real-time characteristics.

According to the system of the present invention which manages the priority level with the urgency, the priority level conversion means and the priority level changing means are utilized to ensure the execution of processing having the same urgency level at substantially the same speed in any of computers different in performance and load.

Also, the computer selection means employed in the system of the present invention prevents a number of processing requests with a high urgency level from concentrating on a single computer, thus making it possible to more strictly ensuring the real-time characteristics in the respective computers.

Further, with the program selection means, a plurality of programs with different urgency levels are prepared such that a processing request is issued to the program with the most suitable urgency level, even without employing the priority level changing means, with the result that the processing can be executed at a desired speed.

Furthermore, by employing the processing forward means, processing requested to a currently running program can be forwarded to and executed by another program capable of executing at substantially the same speed without waiting for the completion of the currently executed processing, thus ensuring relization of more strict real-time characteristics.

According to the system of the present invention which manages the priority level with the time limit, the priority level conversion means and the priority level changing means are used to execute processing in accordance with a local priority level in a particular computer corresponding to a specified time limit. This enables processing with a more strict time limit to be executed prior to other processing with a looser time limit, so that the real-time characteristics can be more strictly ensured for each processing in the distributed computing system. Also, while processing with a relatively long time limit is left unexecuted in order to preferentially execute other processing with a short time limit, the elapsed time approaches to the imposed time limit. In this case, the priority level of the processing can be corrected higher in accordance with the shortened time limit, and the processing is executed with this corrected priority level.

With the communication time prediction means, the time limit can be more strictly set to processing, when communication time between computers is not negligeable.

The computer selection means prevents a number of processing with a short time limit from concentrating on a single computer, thus making it possible to more strictly ensure the real-time characteristics.

With the program selection means, a plurality of programs with different urgency levels are prepared such that a processing request is issued to the program with the most suitable urgency level, even without employing the priority level changing means, with the result that the processing can be executed at a desired speed.

Furthermore, by employing the processing forward means, processing requested to a currently running program can be forwarded to and executed by another program capable of executing at substantially the same speed without waiting for the completion of the currently executed processing, thus ensuring realization of more strict real-time characteristics.

With the processing time prediction means and the time limit setting means, it is determined whether or not a time limit imposed to certain processing is satisfied when a program is to execute this processing with a current priority level. If it is determined that the time limit is not satisfied, a shorter time limit can be set to the program. By the use of the newly set time limit, the priority level conversion means and the priority level changing means can give a higher priority level to the program, and forward the processing to another program performing the same operation, which can satisfy the new time limit, in order to request this program to execute the processing. In this way, the processing can be managed to satisfy the originally given time limit.

In summary, according to the present invention, local priority levels given to processing in respective computers can be uniformly managed in a whole distributed computing system. Additionally, more strict real-time characteristics can be ensured in a distributed computing system possibly including computers different in performance, load, and type from each other.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

We claim:

1. A distributed computer system including a plurality of computers on which a plurality of programs run, wherein each of said computers comprises:

means for defining urgency levels, said urgency levels being common in all of said plurality of computers;

means for allocating one of said urgency levels to each of said plurality of programs;

means for allocating each of said plurality of programs to respective one of said computers for execution thereof;

priority level conversion means for performing a conversion between said allocated urgency level of processing by a program and a priority level of processing by a program in accordance with performance and load of said computer, wherein the urgency level of processing execution of the program is determined with respect to all of said plurality of programs run on alL of said plurality of computers and indicates how fast the program should be executed; and priority level changing means for changing a priority level of a program, which executes the processing, in accordance with the priority level of processing by the program indicated by said priority level conversion means.

2. A distributed computer system according to claim 1, wherein said priority level conversion means includes a priority level correspondence table which indicates the correspondence between an urgency level of processing by a program and a priority level of processing by a program.

3. A distributed computing system according to claim 1, wherein said priority level conversion means modifies the correspondence relationship between the urgency level of processing a program and the priority level of processing by the program in accordance with variations in loads on the computers.

4. A distributed computing system according to claim 3, wherein said priority level conversion means changes the priority level of each program on the computers in accordance with variations in loads on the computers.

5. A distributed computing system including a plurality of computers on which a plurality of programs run, wherein each of said computers comprises:

means for defining urgency levels, said urgency levels being common in all of said plurality of computers;

means for allocating one of said urgency levels to each of said plurality of programs;

means for allocating each of said plurality of programs to a respective one of said computers for execution thereof;

priority levels conversion means for performing a conversion between said allocated urgency level of processing by a program and a priority level of processing by the program in accordance with performance and load of said computer, wherein the urgency level of processing execution of the program is determined with respect to all of said plurality of programs run on all of said plurality of computers and indicates how fast the program should be executed; and priority level changing means for changing a priority level of processing of the program, which executes the processing, in accordance with the priority level indicated by said priority level conversion means, wherein each of said plurality of programs specifies an urgency level of processing by a program when said program requests another program to perform the processing.

6. A distributed computing system including a plurality of computers on which a plurality of programs run, comprising:

means for defining urgency levels, said urgency levels being common in all of said plurality of computers;

means for allocating one of said urgency levels to each of said plurality of programs;

means for allocating each of said plurality of programs to a respective one of said computers for execution thereof;

priority level conversion means for performing a conversion between said allocated urgency level of processing executed by a program and a priority level of processing by the program on each computer in accordance with performance and load of each computer, wherein the urgency level of processing executing of the program is determined with respect to all of said plurality of programs run on all of said plurality of computers; and computer selection means for selecting a computer suitable to execute said program in consideration of a load on each computer and the priority level on each computer indicated by said priority level conversion means.

* * * * *